358-84. OR 3,078,337 SR

SEARCH ROO

Feb. 19, 1963 W. J. SHANAHAN ET AL 3,078,337

METERING SYSTEMS

Filed Dec. 17, 1958

Transponder interrogation

15 Sheets-Sheet 1

INVENTORS
WILLIAM J. SHANAHAN
VINCENT R. ZOPF
ALBERT M. LOSHIN

BY Cushman, Darby & Cushman
ATTORNEYS

T5027.

INVENTORS
WILLIAM J. SHANAHAN
VINCENT R. ZOPF
ALBERT M. LOSHIN
BY Cushman, Darby & Cushman
ATTORNEYS Feb. 19, 1963 W. J. SHANAHAN ET AL 3,078,337

METERING SYSTEMS

Filed Dec. 17, 1958 15 Sheets-Sheet 3

INVENTORS
WILLIAM J. SHANAHAN
VINCENT R. ZOPF
ALBERT M. LOSHIN

BY Cushman, Darby & Cushman
ATTORNEYS

INVENTORS
WILLIAM J. SHANAHAN
VINCENT R. ZOPF
ALBERT M. LOSHIN
BY
Cushman, Darby & Cushman
ATTORNEYS INVENTORS
WILLIAM J. SHANAHAN
VINCENT R. ZOPF
ALBERT M. LOSHIN
BY Cushman, Darby & Cushman
ATTORNEYS Feb. 19, 1963 W. J. SHANAHAN ET AL 3,078,337

METERING SYSTEMS

Filed Dec. 17, 1958 15 Sheets-Sheet 6

INVENTORS
WILLIAM J. SHANAHAN
VINCENT R. ZOPF
ALBERT M. LOSHIN

BY Cushman, Darby & Cushman
ATTORNEYS

METERING SYSTEMS

INVENTORS
WILLIAM J. SHANAHAN
VINCENT R. ZOPF
ALBERT M. LOSHIN

BY Cushman, Darby & Cushman
ATTORNEYS

INVENTORS
WILLIAM J. SHANAHAN
VINCENT R. ZOPF
ALBERT M. LOSHIN
BY Cushman, Darby & Cushman
ATTORNEYS INVENTORS
WILLIAM J. SHANAHAN
VINCENT R. ZOPF
ALBERT M. LOSHIN
BY Cushman, Darby & Cushman
ATTORNEYS Feb. 19, 1963 W. J. SHANAHAN ET AL 3,078,337

METERING SYSTEMS

Filed Dec. 17, 1958 15 Sheets-Sheet 10

INVENTORS
WILLIAM J. SHANAHAN
VINCENT R. ZOPF
ALBERT M. LOSHIN

BY Cushman, Darby & Cushman
ATTORNEYS

Feb. 19, 1963 W. J. SHANAHAN ET AL 3,078,337

METERING SYSTEMS

Filed Dec. 17, 1958 15 Sheets-Sheet 11

INVENTORS

WILLIAM J. SHANAHAN
VICENT R. ZOPF
ALBERT M. LOSHIN

BY Cushman, Darby & Cushman
ATTORNEYS

INVENTORS
WILLIAM J. SHANAHAN
VINCENT R. ZOPF
ALBERT M. LOSHIN

BY Cushman, Darby & Cushman
ATTORNEYS

INVENTORS
WILLIAM J. SHANAHAN
VINCENT R. ZOPF
ALBERT M. LOSHIN

BY Cushman, Darby & Cushman
ATTORNEYS

INVENTORS
WILLIAM J. SHANAHAN
VINCENT R. ZOPF
ALBERT M. LOSHIN
BY Cushman, Darby & Cushman
ATTORNEYS INVENTORS
WILLIAM J. SHANAHAN
VINCENT R. ZOPE
ALBERT M. LOSHIN
BY
Cushman, Darby & Cushman
ATTORNEYS United States Patent Office 3,078,337

Patented Feb. 19, 1963

3,078,337

METERING SYSTEMS

William J. Shanahan, New York, Vincent R. Zopf, Floral Park, and Albert M. Loshin, Brooklyn, N.Y., assignors to Skiatron Electronics & Television Corporation, New York, N.Y., a corporation of New York Filed Dec. 17, 1958, Ser. No. 780,978
94 Claims. (Cl. 178—5.1)

This invention relates to an interrogating and recording system, and particularly to such a system for interrogating at least one transponder as to its setting and to the recording of an indication of whether the transponder is set on at least a given one of its different possible settings.

The system has applicability to many different uses in that the transponder may be associated with any one of different types of apparatus. Broadly, the overall system is a metering system which meters, say at a remote distance, the apparatus associated with the transponder. In any event, the transponder is set to any one of a plurality of different settings in accordance with the instant condition of the apparatus associated therewith so that upon interrogation of the transponder, the transponder replies with a given reply signal related to its setting and the recording system records an indication of the reply signal returned if any. Consequently, any apparatus which can automatically change the transponder's setting may be associated therewith, as well as can any apparatus which when operated manually for the purpose of changing the condition of th apparatus changes the setting of the transponder. If the associated apparatus is of the type which changes its own condition or setting automatically or not but continually (such as a barometer), at an uneven rate (e.g., utility meter), periodically (e.g., a clock) and/or aperiodically (such as a thermometer), each transponder reply signal may need to be a complex signal, i.e., a pulse coded signal, for example, to distinguish one from another.

Although different types of apparatus may be employed with the transponder, this application generally proceeds in relation to the association of information receiving apparatus with the transponder. In general, such information receiving apparatus may be any type of program receiving apparatus such as a radio or television receiver. In particular, the invention is herein described relative to the use of a television receiver in connection with a transponder for the purpose of providing a subscription type television system, and in such case the reply signals from associated receiver-transponders need only be simple signals, for example, signals of different frequency to distinguish one from another.

Other uses are to monitor domestic gas and electric meters distributed over a city, to monitor pressure and temperature gauges in industrial plants, etc.

Prior subscription type television systems have generally been of the type wherein some sort of scrambling of the propagated signals is accomplished at the transmitter, while unscrambling of the signals is accomplished at the receivers in the system as long as the subscriber has the proper de-coding apparatus attached to his receiver.

A subscription television system embodiment of this invention is distinguished from the scrambling type of subscription television systems in that no scrambling or unscrambling whatsoever of any of the propagated signals is necessary.

Instead, the propagated signals are generated, delivered, and converted into a program in normal fashion except for the fact that transmission from the transmitting station to the receivers is via a closed circuit, for example over a coaxial distribution network. Basically, however, the distribution to the receivers needs not be over a closed circuit system, since as will be obvious from the later description, the video signals may be propagated over the air, as long as the reply signals from the transponders of the receivers are distributed back to the recording system via reply lines specifically designated for that purpose. However, if the video signals are capable of easy reception by ordinary equipment they will be sent via closed circuit to preclude reception by receivers not required to transpond.

In general, in an embodiment of the invention wherein a plurality of receivers are associated with the system, with each receiver having a transponder coupled thereto, the overall system includes at least one coded record for generating a corresponding set of interrogation tones which are propagated to the transponder-receivers along with one or more sets of program signals.

Each transponder is set to one of its different possible settings in accordance with the channel selection associated with the corresponding receiver so as to provide one or another of its possible output or reply signals upon being interrogated by a set of interrogation tones to which the transponder is responsive. When a subscriber has caused one of the subscription programs to be received, his transponder generates a particular reply signal. By virtue of a distributing network, each of the reply signals is returned to a reply detector which stores an indication of which of the reply signals is received. The stored reply signal is then caused to be recorded on a record means which is preferably associated with the record which initiated the set of interrogation tones causing the reply signal. In a preferred embodiment, the coded record for initiating the interrogating tones and the record means upon which program usage is recorded occupy different portions of the same record medium. More preferably, each such record medium is a card such as an "IBM" type card with indicia thereon (in the form of magnetic spots or more preferably apertures) indicating in one portion of the card the interrogation tone code, and with a different portion of the card being reserved for recording indicia which indicate program usage by the subscribers allocated to the card.

It is, therefore, one of the objects of this invention to provide a metering type interrogation and recording system for interrogating at least one transponder as to which of its possible settings it is in at a given time, and for recording an indication of such setting.

Another object of this invention in conjunction with the preceding object is the provision of such a system for a subscription television system.

Other objects of this invention will become apparent to those of ordinary skill in the art by reference to the following detailed description of the exemplary embodiments of the apparatus and the appended claims. The various features of the exemplary embodiments according to the invention may be best understood with reference to the accompanying drawings, wherein:

Figures 3, 4, 14:
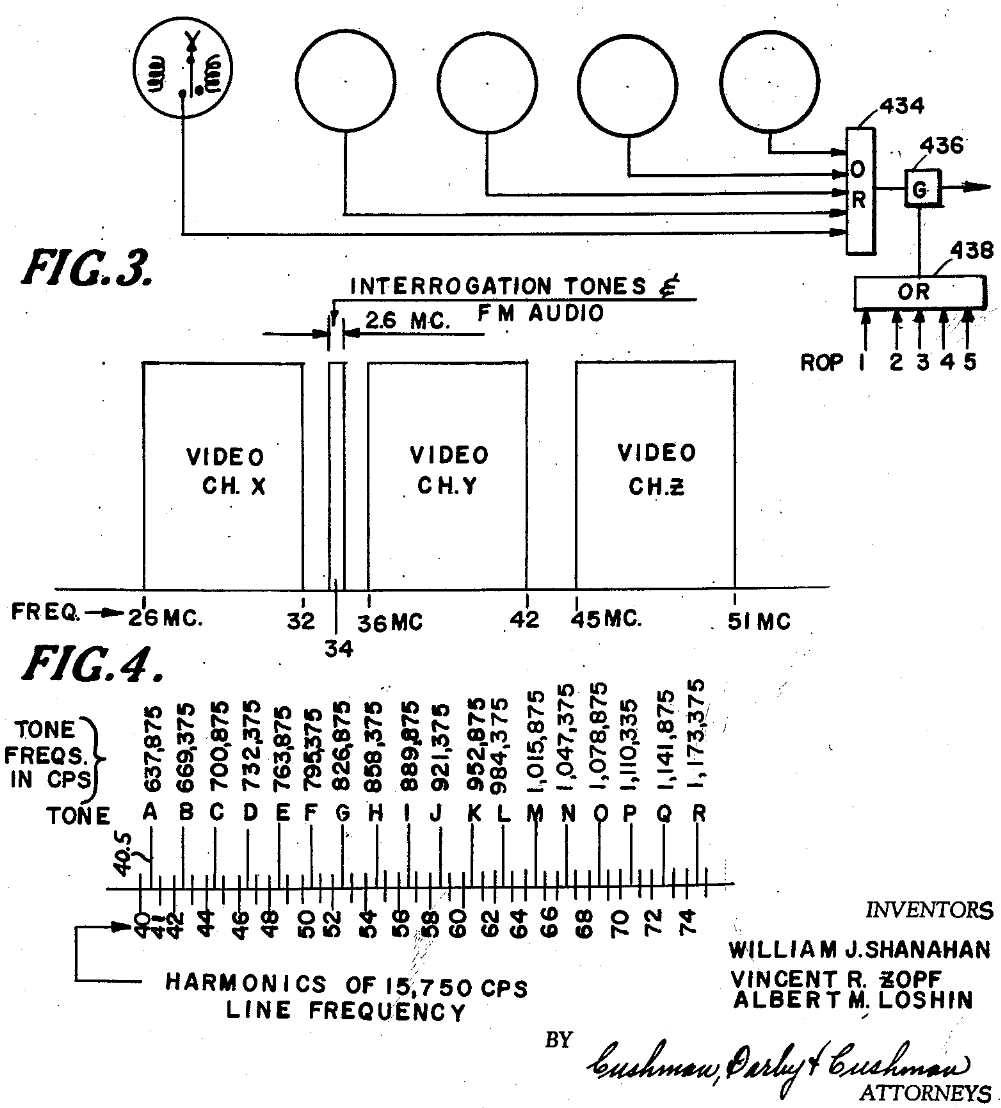
Figure 5:
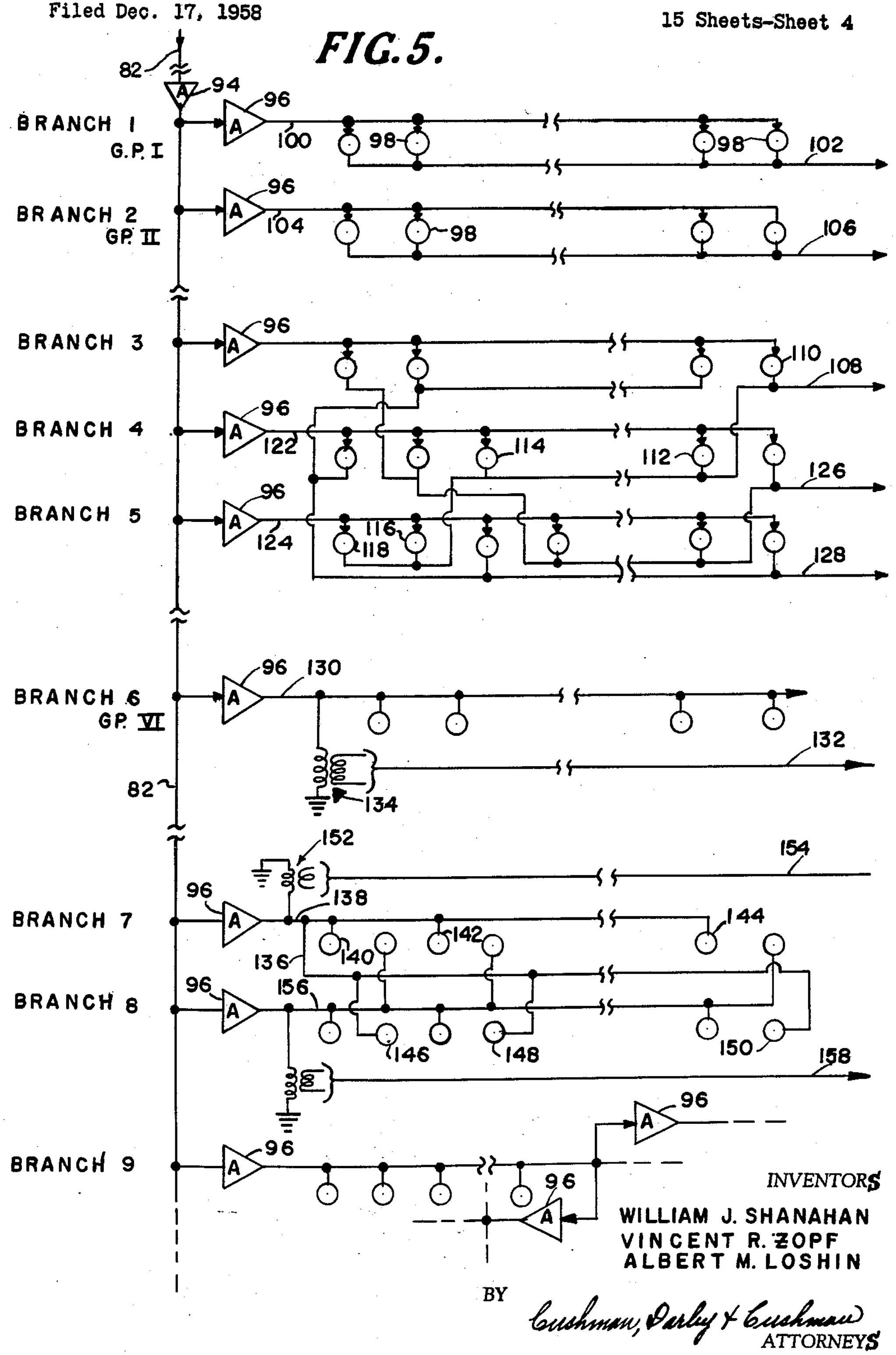
Figure 6:
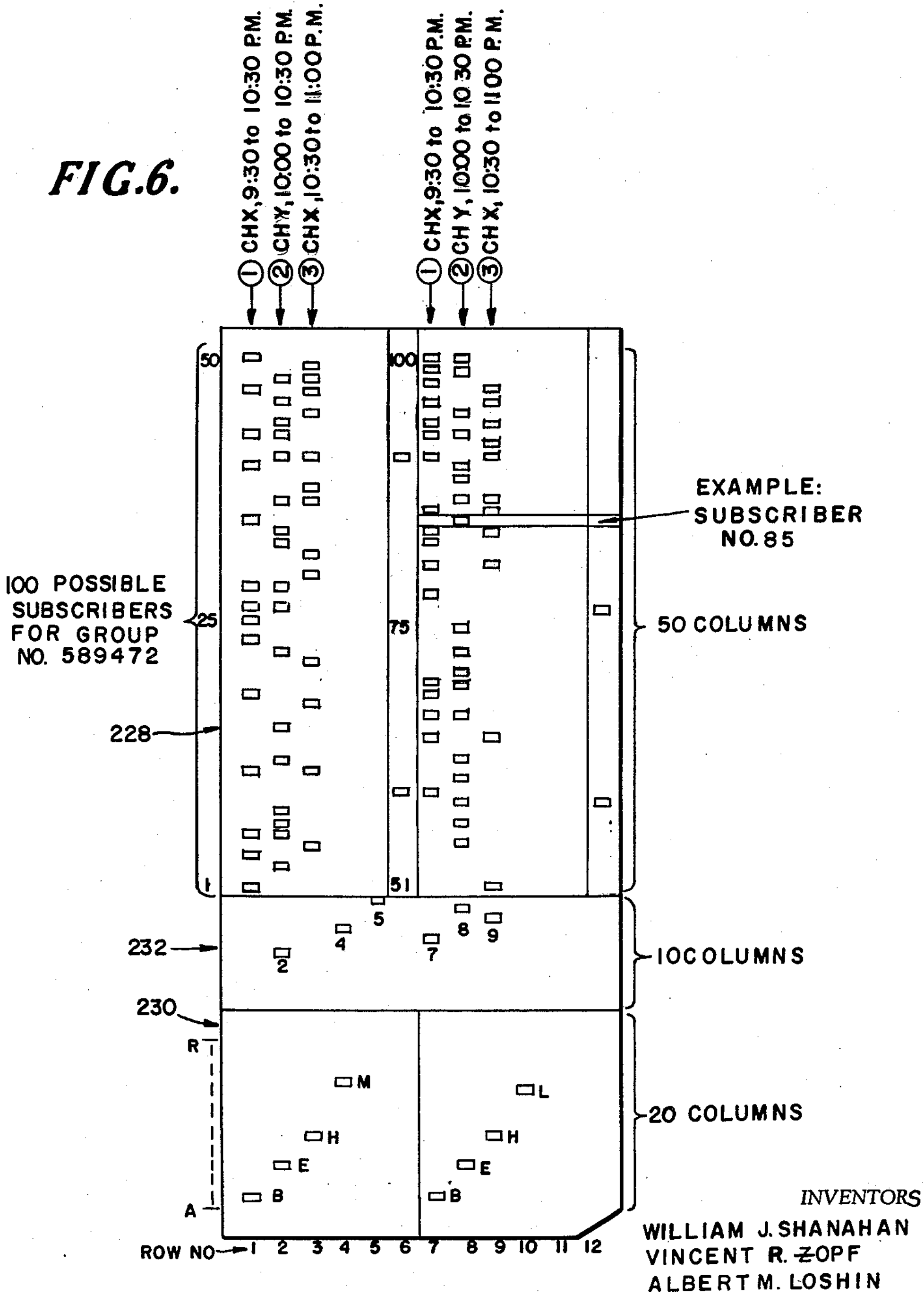
Figure 7:
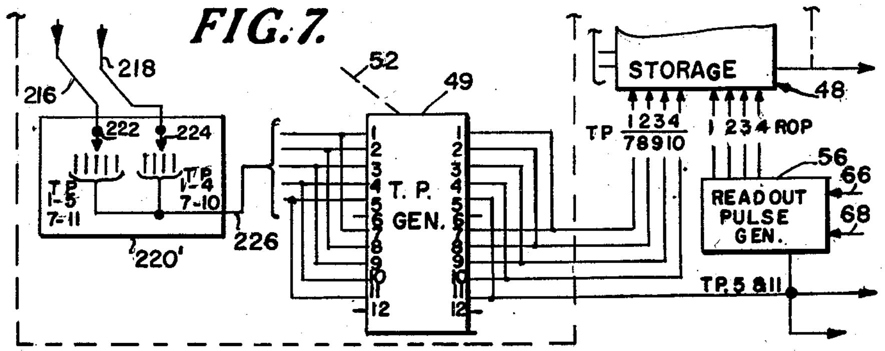

FIGURE 3 indicates the frequency limits which may be associated with each of the different video channels as well as with the interrogation tone carrier;

FIGURE 4 is a chart showing the different preferred possible interrogation tones;

FIGURE 5 illustrates several embodiments of a distribution network;

FIGURE 6 illustrates a two-section card;

FIGURE 7 indicates the changes desirable for FIG-

Figure 1:
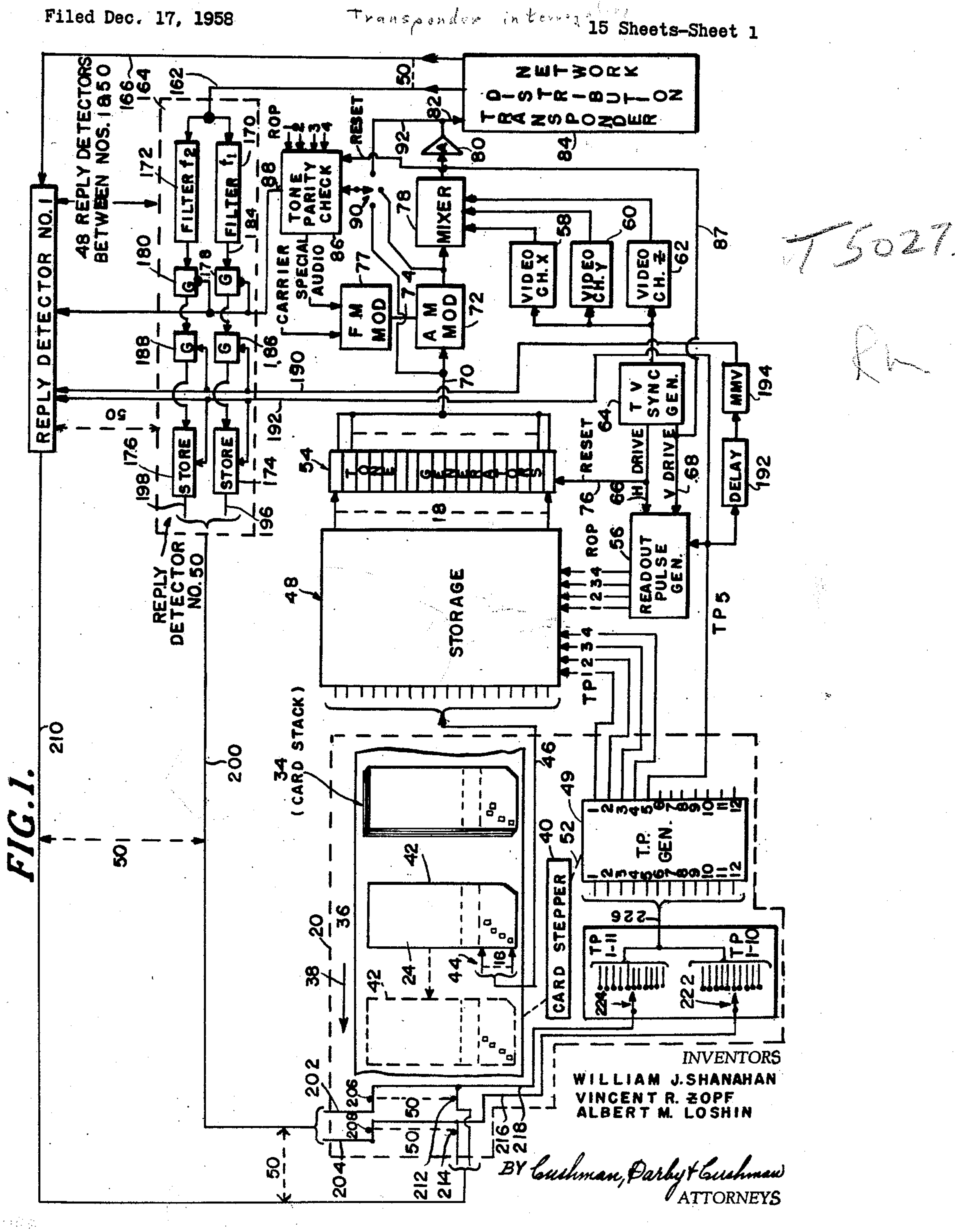
FIGURE 1 is an embodiment of the system wherein a single section card and a single reading-recording machine is employed.
Figure 2:
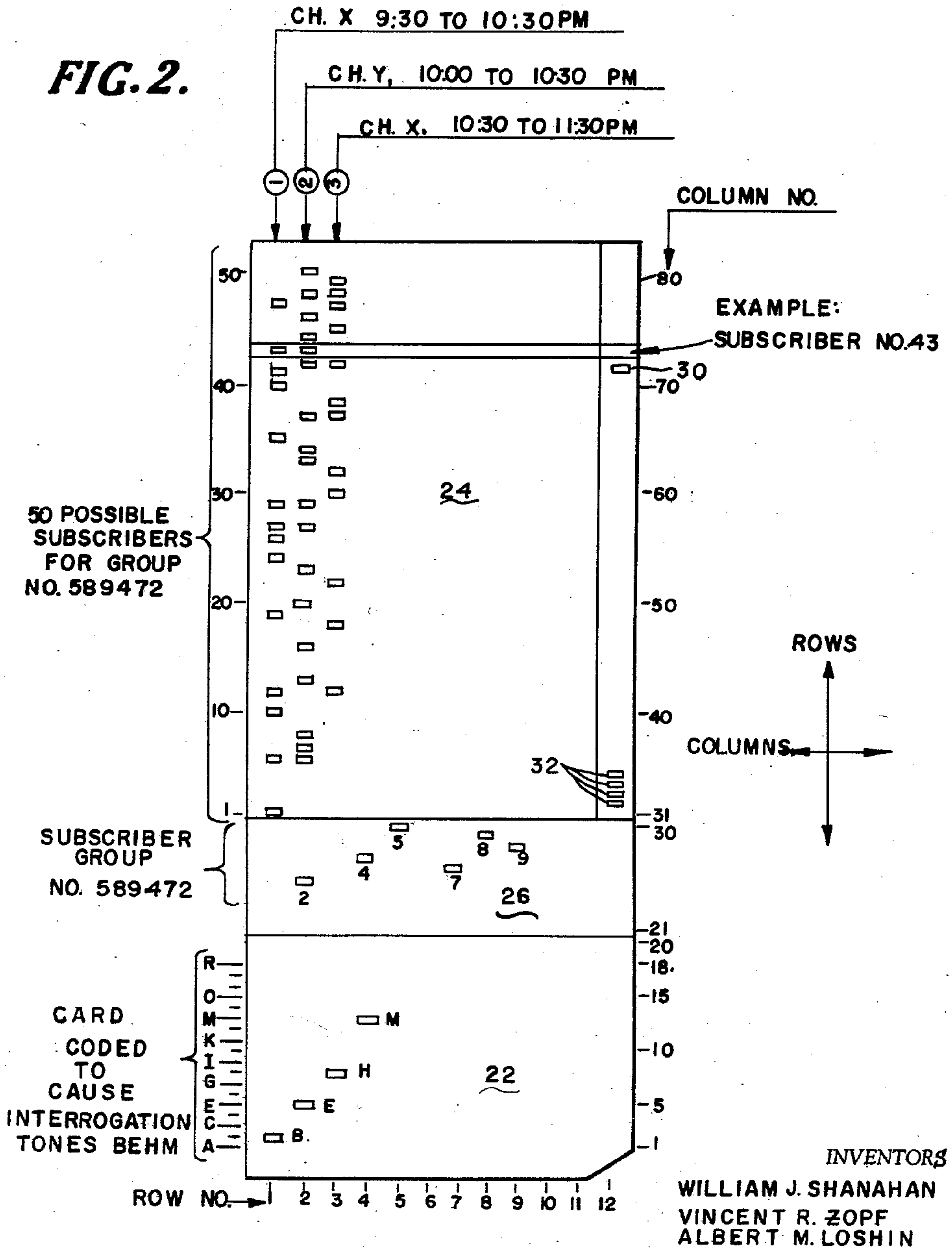
FIGURE 2 illustrates a card of the single section type for use in the system of FIGURE 1.
Figures 12, 13:
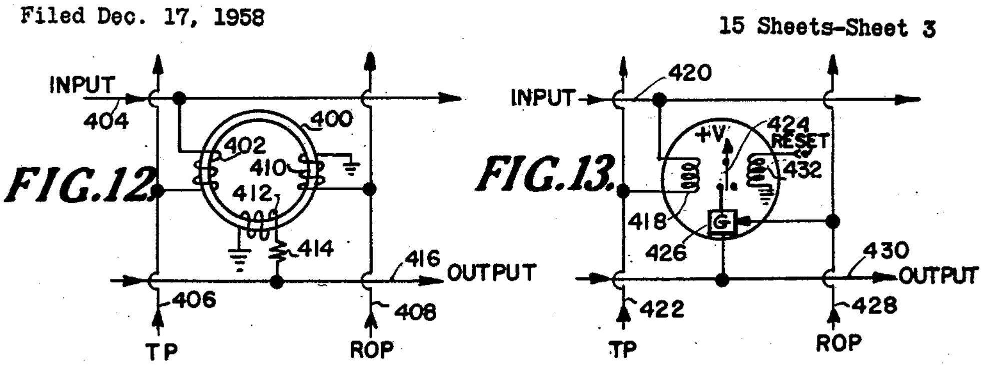
Figure 8:
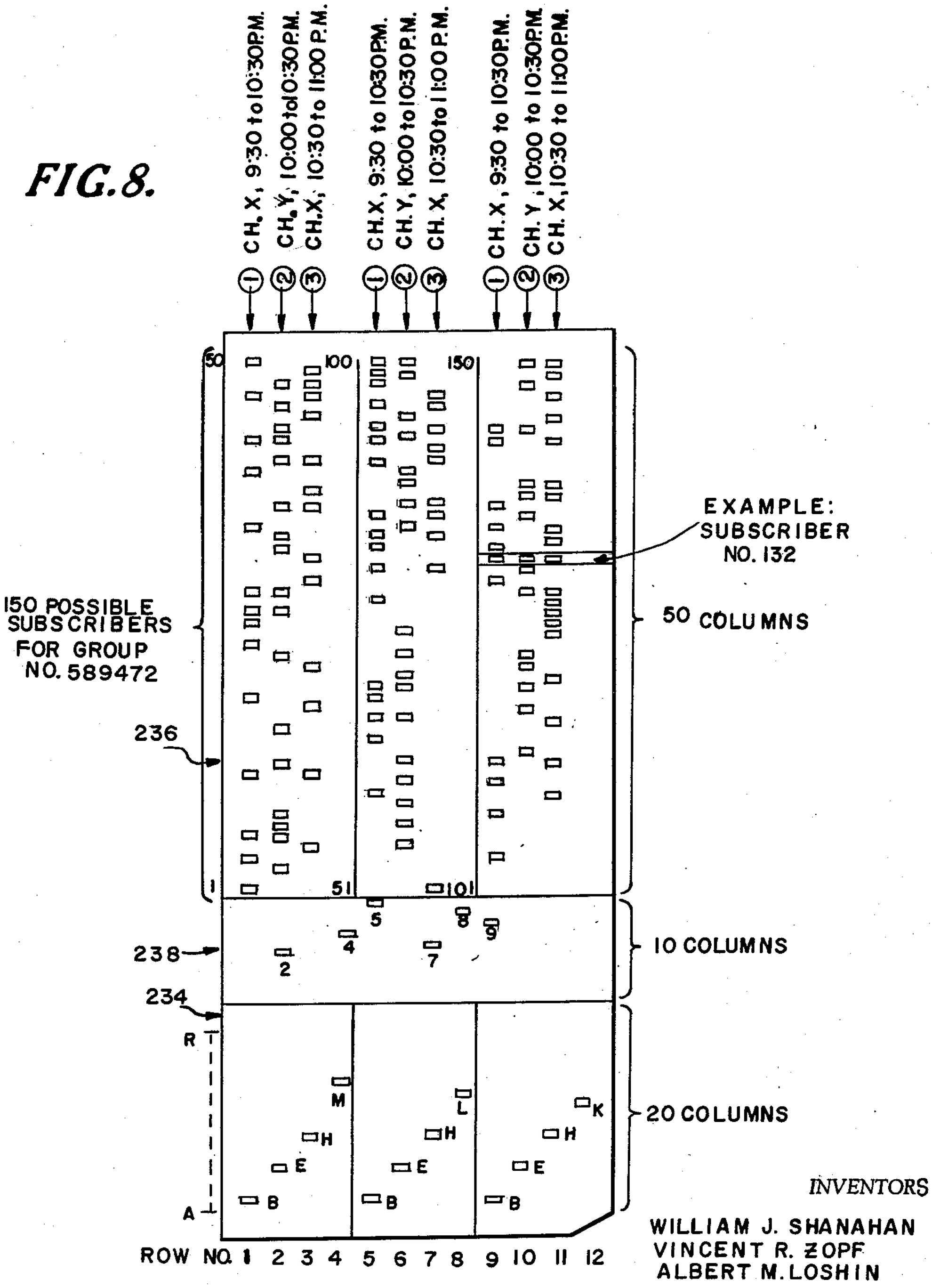
Figure 9:
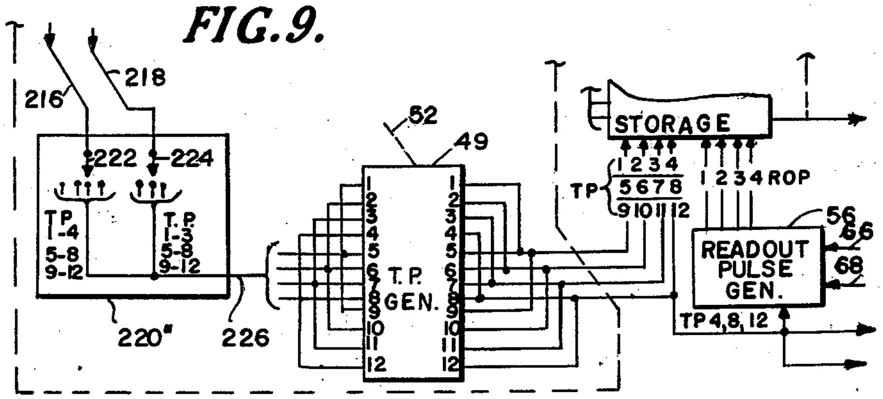
Figure 16:
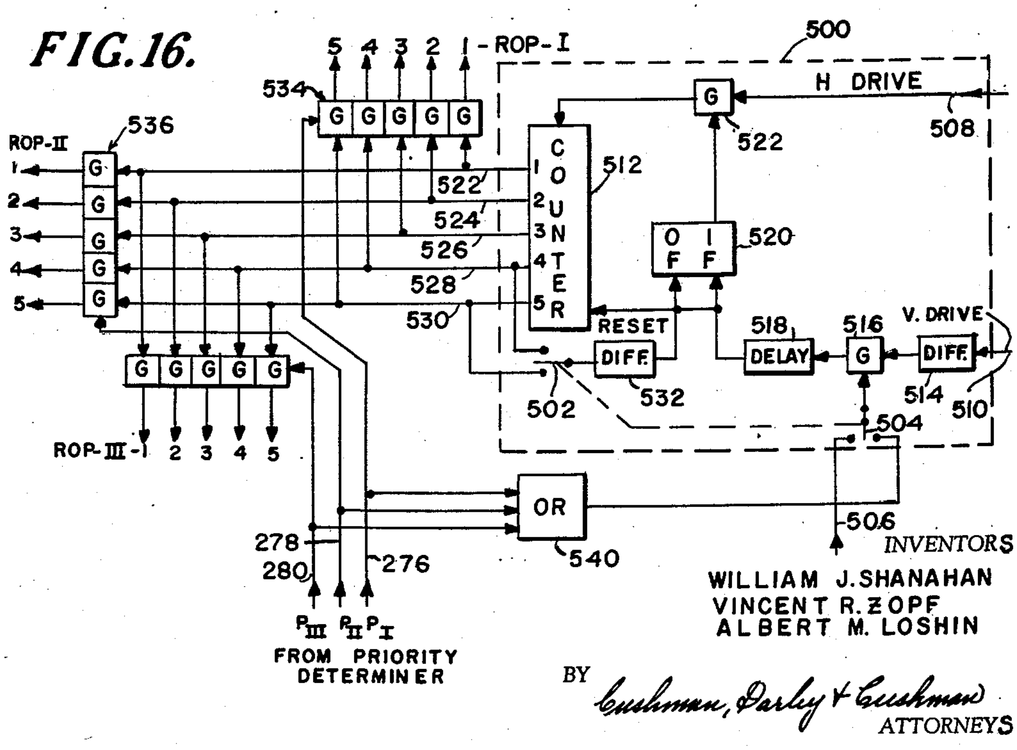
Figure 10A:
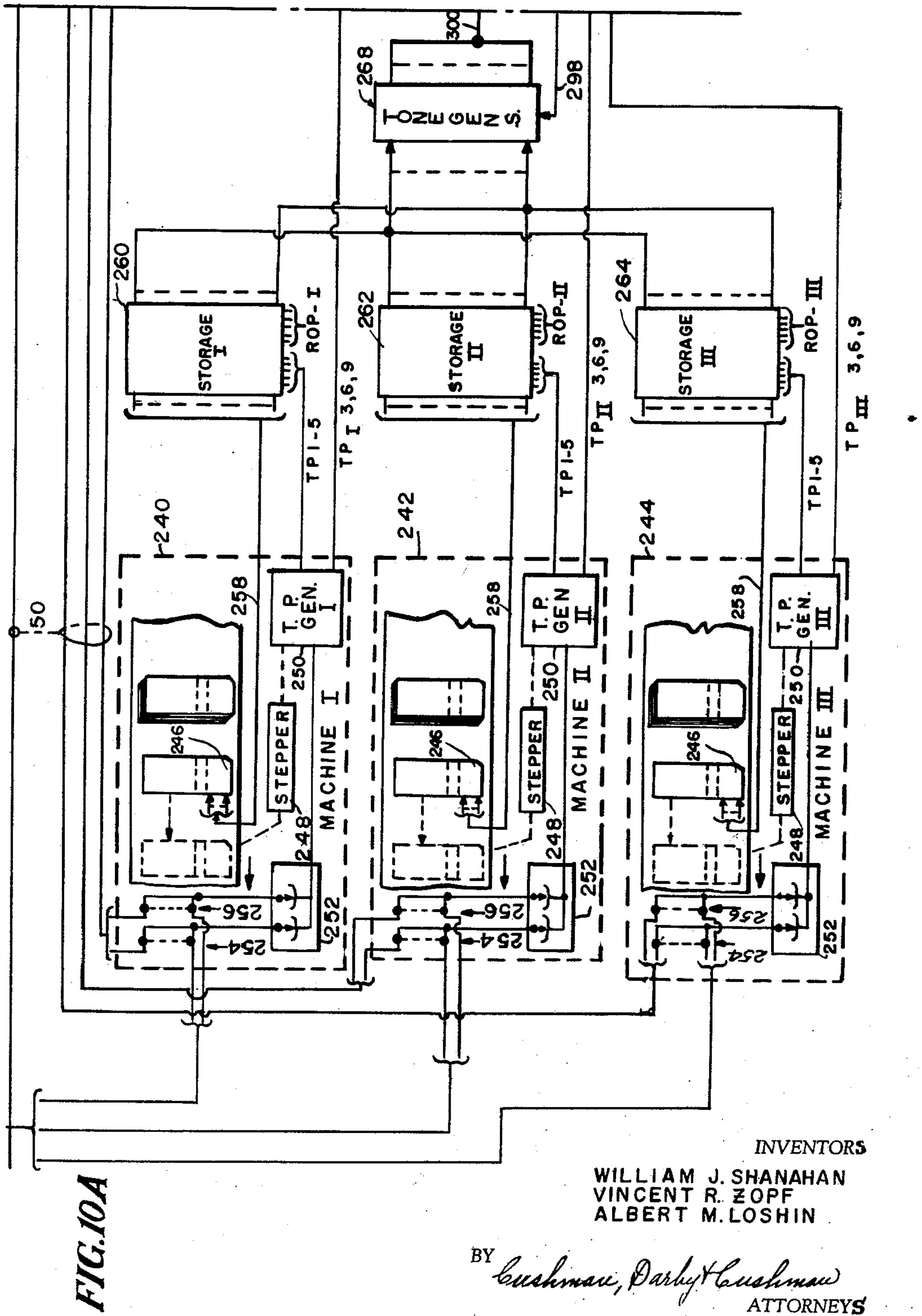
Figure 10B:
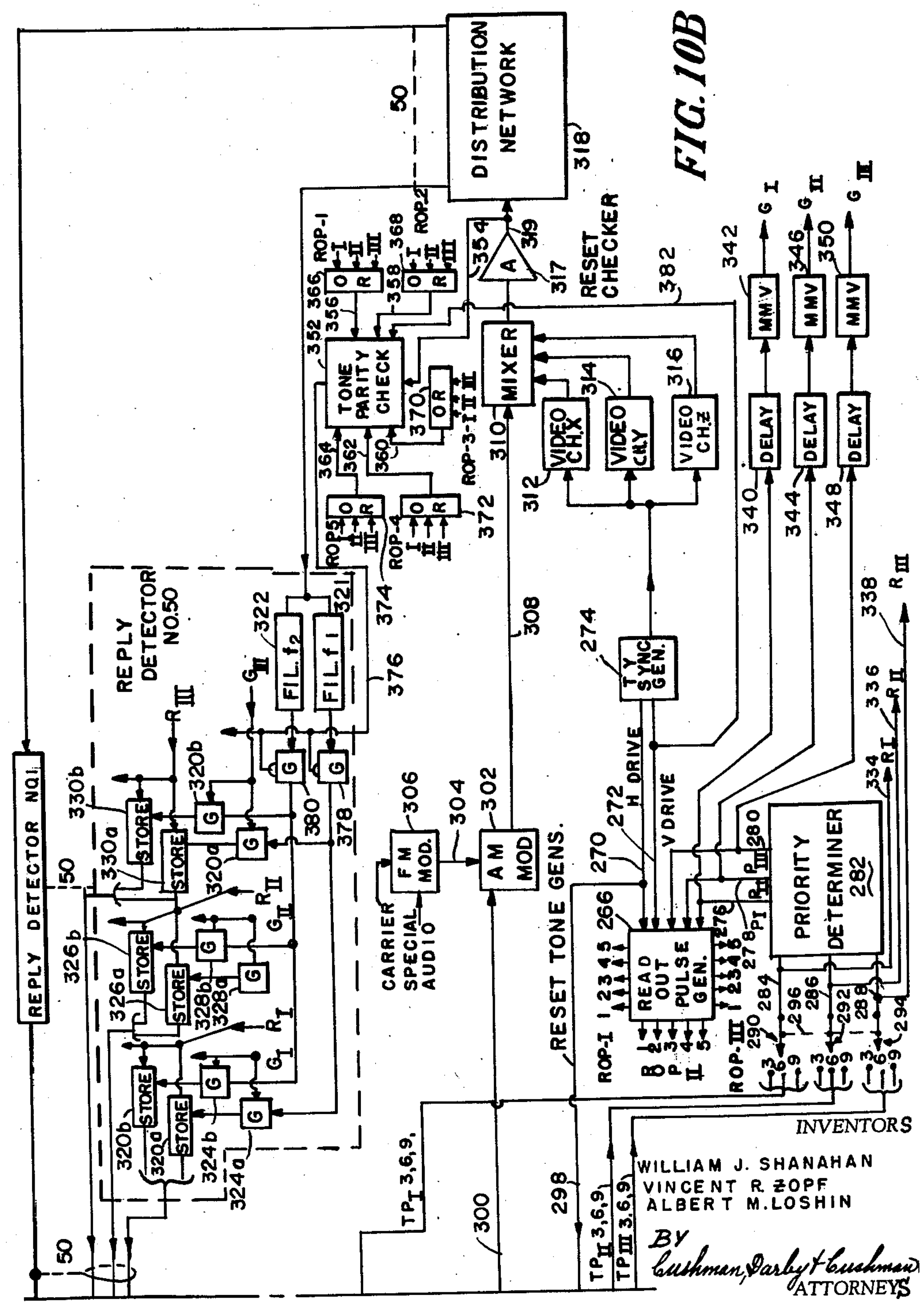
Figure 11:
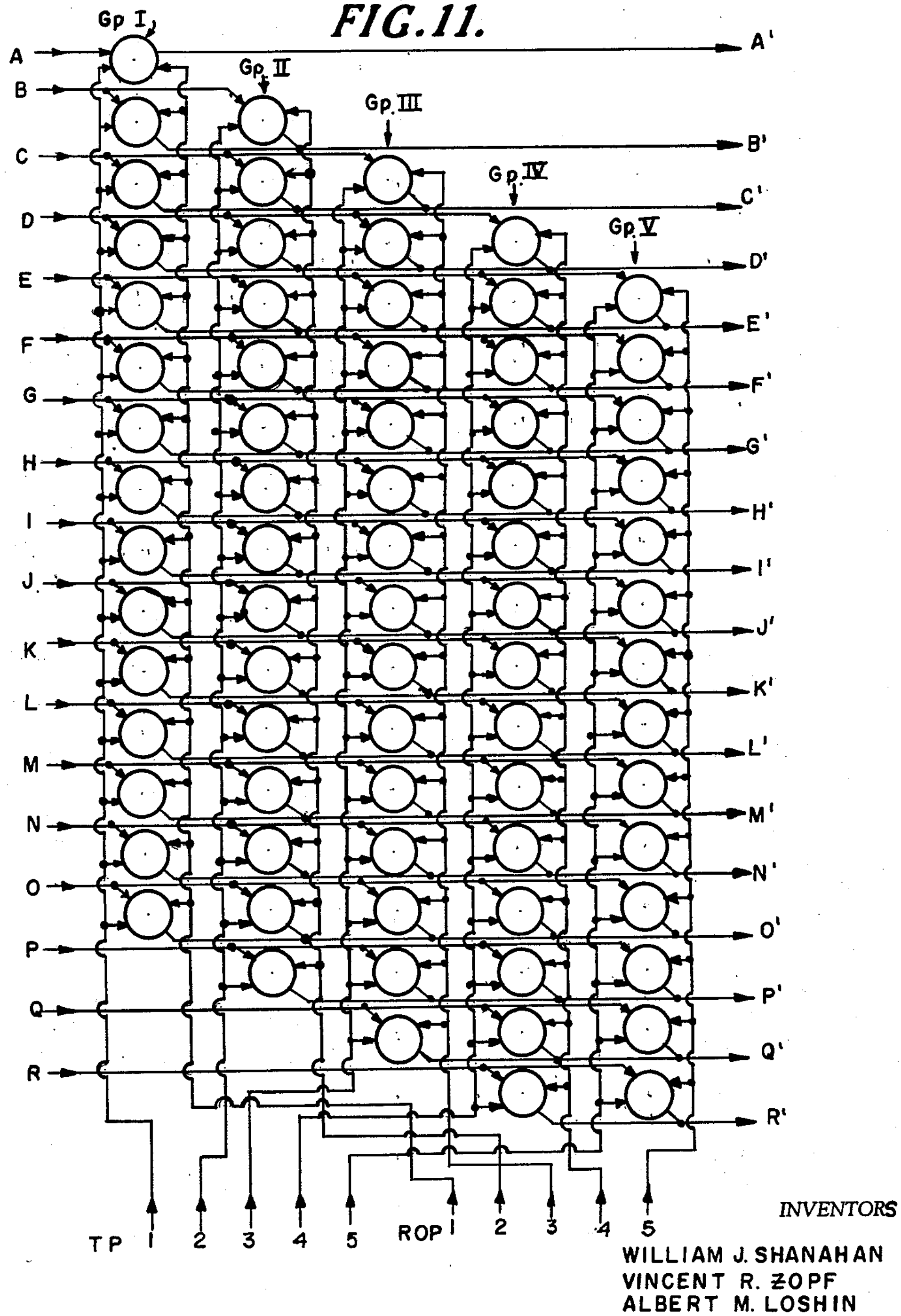
Figure 17:
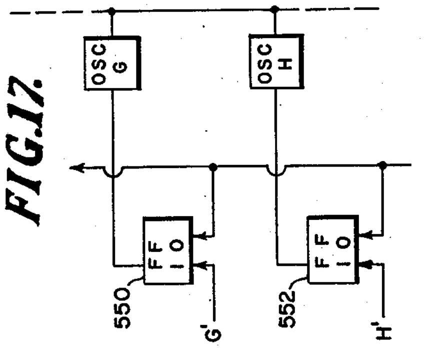
Figure 20A:
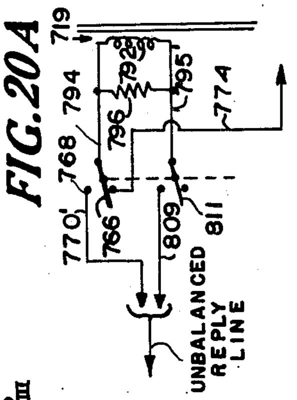
Figure 15:
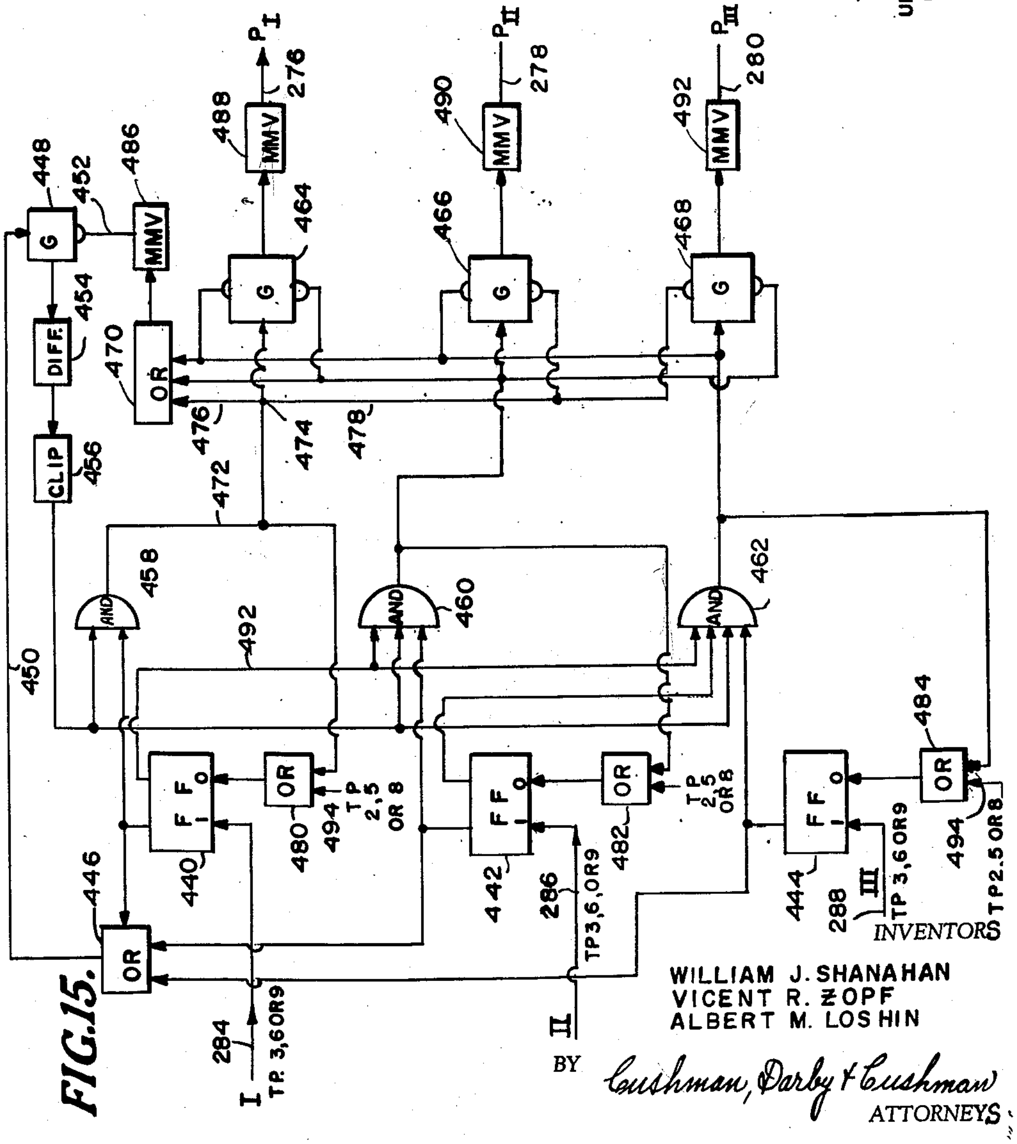
Figure 18:
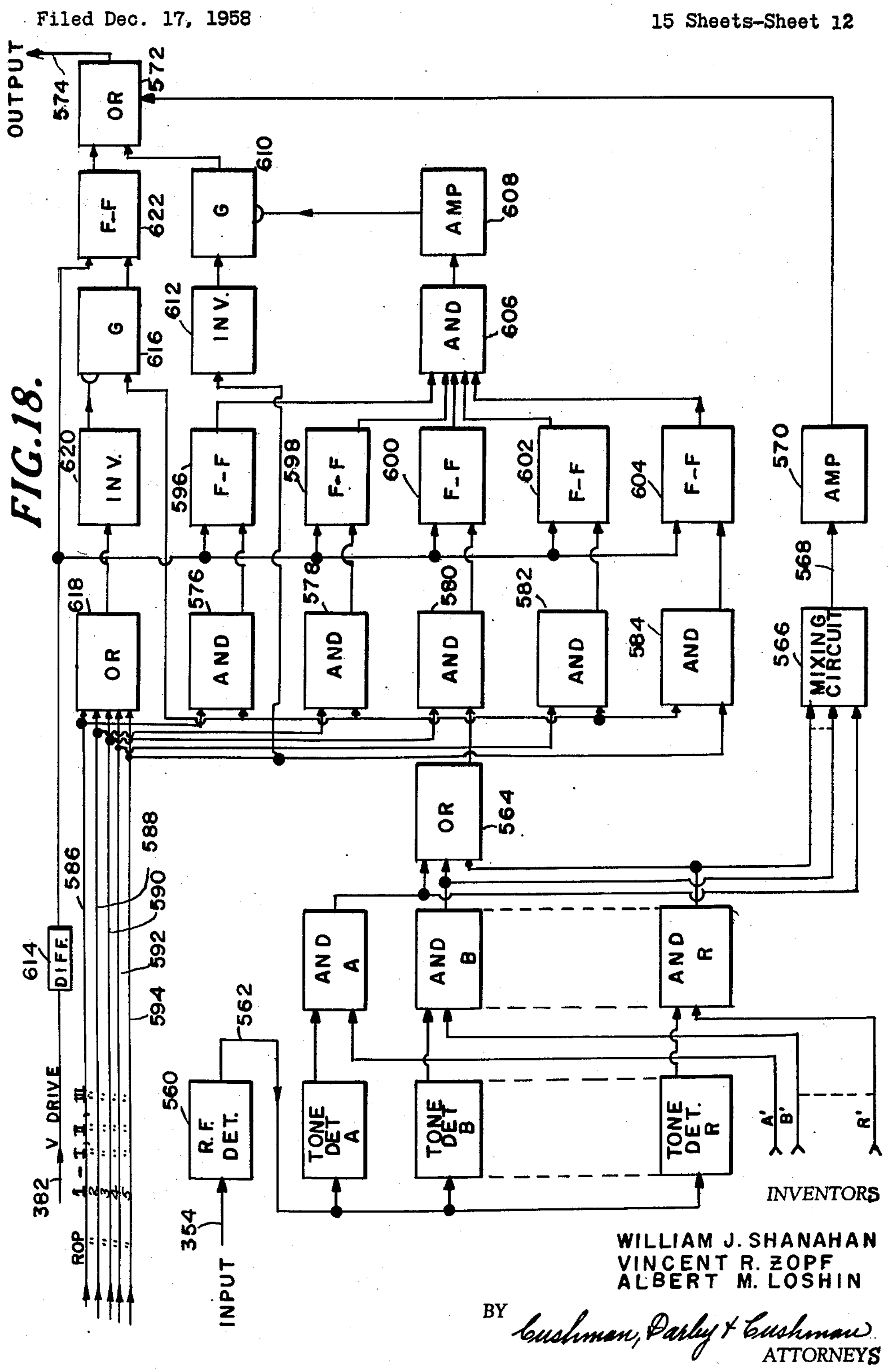
Figure 19:
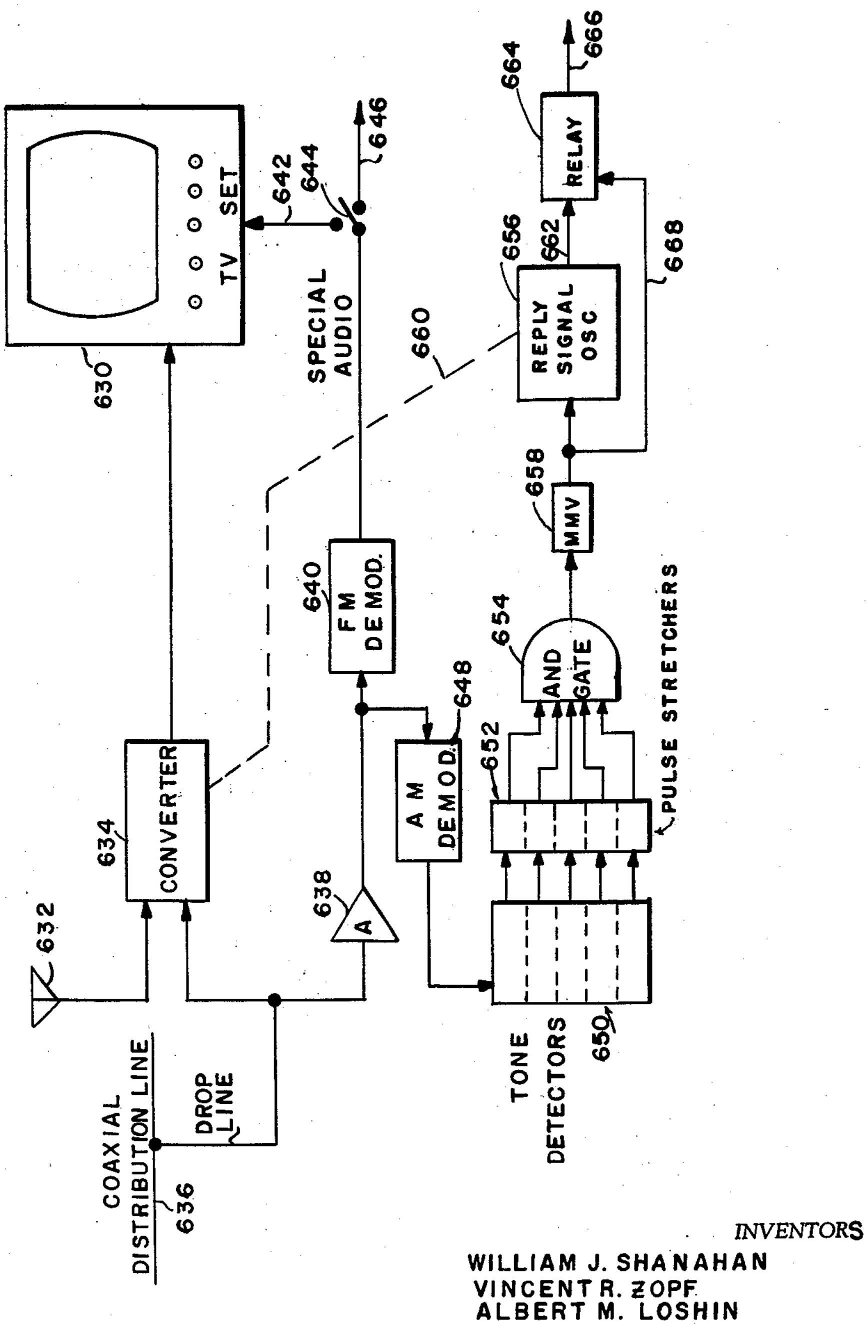
Figure 21:
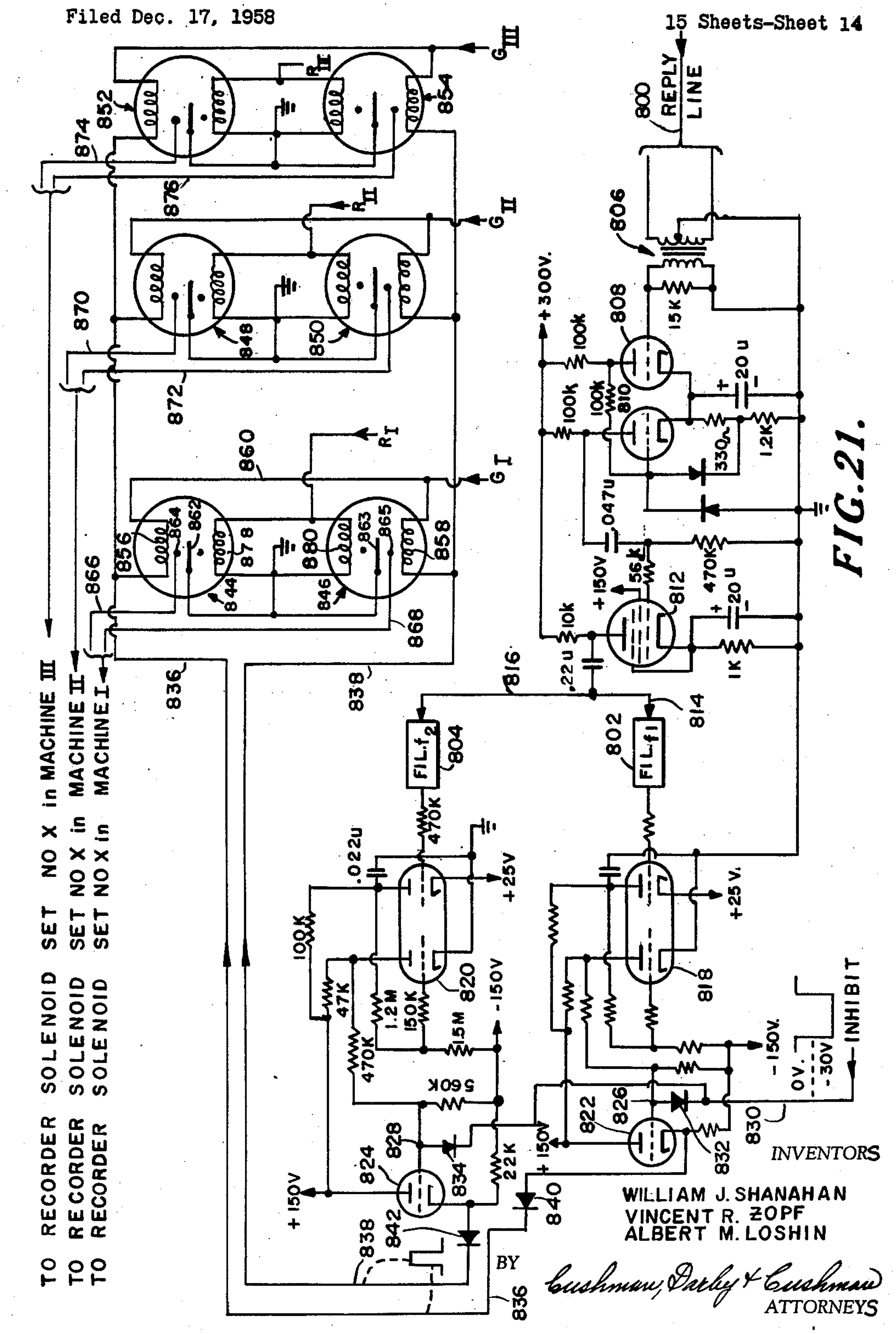
Figure 20:
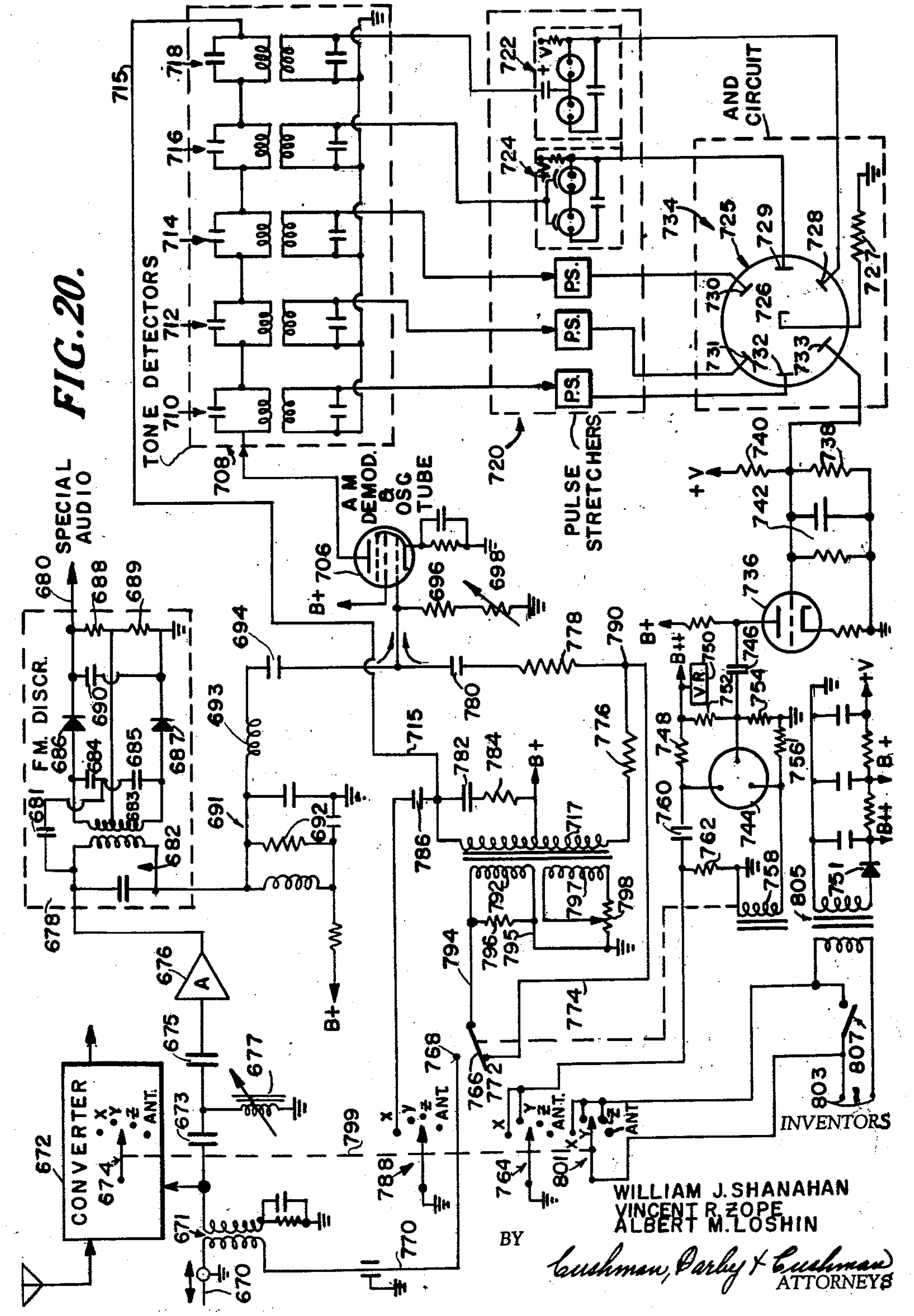

URE 1 to employ therein the two-section card of FIGURE 6;

FIGURE 8 shows a three-section card;

FIGURE 9 illustrates the changes desirable in FIGURE 1 for employing therein the three-section card of FIGURE 8;

FIGURE 10 is composed of FIGURES 10A and 10B and illustrates a multiple reading-recording machine system wherein single section cards of the type shown in FIGURE 2 may be employed;

FIGURE 11 illustrates an embodiment of one of the indicia signal storage units;

FIGURE 12 illustrates a magnetic core embodiment of one of the sub-stores in FIGURE 11;

FIGURE 13 illustrates a latching relay embodiment of one of the sub-stores in FIGURE 11;

FIGURE 14 illustrates another latching relay embodiment for a row of sub-stores in FIGURE 11;

FIGURE 15 illustrates circuitry usable for priority determining purposes as between the serving of the multiple machines in FIGURE 10;

FIGURE 16 shows the circuitry which may be embodied in a readout pulse generator;

FIGURE 17 illustrates the circuitry for two tone generators;

FIGURE 18 shows a tone parity checker in block diagram form;

FIGURE 19 illustrates the association of a television receiver, convertor, and transponder;

FIGURE 20 illustrates a convertor and associated transponder in detail;

FIGURE 20A shows an alternative for a part of the circuit in FIGURE 20 for connecting reply signals to an unbalanced line pair; and FIGURE 21 illustrates a reply detector in detail.

*Single Machine, One Section Card Interrogating System*

Detailed reference is now made to FIGURE 1 which has a single reading-recording unit included in the machine outlined by dash line 20 and with which there is employed a plurality of record mediums each similar to the record card shown in FIGURE 2. The type of card illustrated in FIGURE 2 is of the type popularly termed an "IBM" card, which is apertured or not in any of a plurality of areas to provide given information, but any other record medium such as tape or other card types, apertured, magnetized, or otherwise recordable onto, may be employed. In the specific illustration, each card has 80 transverse "columns" and 12 longitudinal "rows" both as normally termed in the art. The lower portion or part 22 may include 20 transverse columns and is employed in this invention to designate the particular interrogation code which may be any one code out of a large plurality thereof. Each code is identified by a combination of indicia comprising apertures B, E, H, and M. Each of the code indicia is disposed in a different longitudinal row, preferably the first four rows in the embodiment being first described, and each may take any one of 18 different positions within its row, thereby obviously providing a large number of possible different codes. The row positions or discrete areas in which each indicium may be located, may be referred to as areas A through R, there being 18 such areas, one for each of the first 18 transverse columns per longitudinal row. Since part 22 of the record medium is pre-punched in accordance with a given code, it forms a record of one interrogation code for use in FIGURE 1.

The reason for interrogating a plurality of transponders, with which there may be respective television receivers associated, is to determine which one of a plurality of operating positions each transponder is in at the interrogation time. Consequently, there is provided a second part or upper portion 24 on each of the record mediums. Portion 24 acts as a means on which is made a record of the particular setting of each transponder which responds to the interrogation code determined by the indicia previously recorded in lower portion 22 of the card. In accordance with a distribution network which will hereinafter be described, a plurality of different subscribers' transponders may be responsive to the same interrogation code, and for purposes of distribution it is here assumed that 50 different transponders will respond to the same interrogation code. Therefore, upper portion 24 includes 50 different transverse oclumns, columns numbered 31 through 80 on the card shown in FIGURE 2. This means that a record may be made on a single card of the programs that 50 different subscribers are receiving at any one time, each different longitudinal row in section 24 being for a different program.

The mid-portion 26 of the card in FIGURE 2 may comprise 10 columns, such as columns numbered 21 through 30, and is for the purpose of identifying the particular group of 50 subscribers whose receivers have respective transponders responsive to the interrogation code designated in lower portion 22 on the card. For example, the subscriber group identification number on the particular card shown in FIGURE 2 is 589472 reading the apertures shown in portion 26 from column 30 down through column 25. Mid-portion 26 may also include other data (not shown) such as the date(s) the card is to be used, the particular machine number, corresponding to machine 20 in FIGURE 1, in which the card is to be used, etc.

Numeral 28 on the card in FIGURE 2 designates the area in which row 12 extends from column 31 through column 80, which area is for the purpose of indicating by an aperture or other indicia, that a particular subscriber is presently inactive or that no subscriber has been assigned to a particular column during the use dates of the card. Aperture 30 indicates the former, while apertures 32 indicate the latter. Area 28 when used in either of these manners is not employed in the system described relative to FIGURE 1 for example, but is used after the upper card portion 24 has recorded in its first 11 rows (or less) the program usage by each of the 50 (or less) subscribers assigned to the card for purposes of billing such subscribers accurately. That is, once a subscriber becomes inactive, an indicium such as aperture 30 is placed in row 12 in the subscriber's column, and prevents the subscriber from receiving any further bills. Apertures 32 likewise prevent any bills from being made up for subscribers unassigned to the columns in which these apertures are located.

As above indicated, machine 20 of FIGURE 1 handles a plurality of record cards such as the one shown in FIGURE 2. Machines for handling a stack of record cards, reading information therefrom one at a time, and later punching apertures in the cards successively, are generally well known in the art, reference being made to the machine currently designated as an IBM 521 type machine. No limitation to such machine is intended, but it is employed herein for illustrative purposes. A stack of cards each similar to the card shown in FIGURE 2, but each having a different set of indicia therein is represented by numeral 34 in FIGURE 1. These cards are sequentially selected by conventional means (not shown) and are placed successively on a carrier such as plate 36 which steps continuously in the direction shown by arrow 38 by means such as card stepper 40.

Card 42 (FIG. 1) corresponds to the card illustrated in FIGURE 2 but is "raw" or "fresh," i.e., it has no recorded indications in its upper portion 24 of program usage by any subscriber. It is to be understood, however, that each of the cards may be run through the machine more than once, and during its second and subsequent runs through the machine, there may be indications in portion 24 similar to the indications shown in the first three upper portion rows in FIGURE 2.

When the card has been stepped to the reading heads diagrammatically indicated as 44, there being the same number of reading heads as possible positions or discrete areas in each longitudinal indicium row, 18 in the example being described, the lower portion indicia are read. The reading heads 44 are aligned parallel with the edge of the card as presented thereto, and consequently the indicia are read serially by their respective reading heads. The so read indicia signals are conveyed by their respective lines in cable 46 to the main temporary storage unit 48.

As will be later described in more detail, storage unit 48 includes a plurality of groups of sub-stores with each group having at least approximately the same number of stores therein as there are possible discrete area locations for the respective card indicium, there being the same number of groups of such sub-stores as there are indicia per card. In other words in the specific example being described, there are 4 columns or groups of sub-stores in storage unit 48, and for the sake of simplicity it may now be considered that each group of sub-stores includes 18 different sub-stores. The corresponding sub-stores in each group thereof, have a common input line which is one of the 18 lines in cable 46 from the respective reading heads 44.

In order to store the first read indicia signal in the first column of sub-stores, the second indicia signal in the second column of sub-stores, etc., a timing pulse generator 49 is provided to generate a timing pulse for at least each step of a card during which an indicium on a card is positioned to be read by one of the reading heads 44. The timing pulse generator may be synchronized with the card stepper as indicated by dash line 52. Since there are 12 longitudinal rows on each card and the card is stepped one by one through each of these rows, the timing pulse generator 49 is shown as having 12 different output lines on its right-hand side, but timing pulses issuing during the 6th through 12th steps of the card are not employed in this embodiment. It is to be understood that each timing pulse output line provides only a single pulse per generator cycle, the successively numbered pulses being successive in time and separated a given amount of time, with the first 4 pulses in a cycle, TP–1, 2, 3, and 4, being concurrent with the respective readings of indicia on a card.

As a representative example, no limitation intended, but as in an IBM 521, a different numbered timing pulse may occur about every 43 milliseconds (msec.) with the pulse "on" time being approximately 22 msec.

TP–1 is employed to store the firstly read indicium signal in the first column of sub-stores in storage unit 48, TP–2 causes the secondly read indicium signal to be stored in the second column of sub-stores, etc. Once any given indicia set of signals is so stored, they may be read out of storage sequentially by groups of sub-stores to their respective tone generators 54, there being one tone generator for each of the different possible 18 input signals per indicium read.

In more detail, the reading out from storage and the generation of tones is accomplished as follows. Each column or group of sub-stores in unit 48 is read out by a different readout pulse (ROP). Since there are four columns of sub-stores in the particular example now being described, a set of four serially occurring readout pulses are provided from readout pulse generator 56, ROP–1 causing readout from the first column of cores of the indicium signal stored therein by TP–1. Then ROP–2 causes readout of the second column of sub-stores of the indicium signal stored therein by TP–2, etc.

The description relative to FIGURE 1 now proceeds in relation to a transponder interrogating and recording system with the assumption that each transponder is associated with a different television receiver, each such receiver being capable of at least receiving program signals from a given frequency channel and presenting the signals as a program generally involving both video and audio presentations in the conventional manner. It may be assumed that each television receiver is conventional in that it will receive and convert program signals from a plurality of different frequency channels, but this is not a necessary condition relative to this invention since any one receiver may receive and convert program signals from only a given frequency channel in accordance with this invention. However, the invention will generally be employed with television receivers of the conventional multi-channel type, and in any given locality, one normally unused channel will be employed for receiving any one of a plurality of different sets of program signals for any of which sets, or at least predetermined ones thereof, fees may be charged when the corresponding program is viewed. For purposes of generating the programs, one or more video signal (and associated audio signal) generators may be employed. For example, FIGURE 1 shows 3 such generators 58, 60, and 62 generally referred to as "video" generators. Each of these generators has in its output video signals plus all the conventionally associated signals such as audio, blanking, and synchronizing signals, and each provides its output in a different frequency channel designated channels X, Y, and Z respectively.

For purposes of illustration, without limitation intended, reference may be made to FIGURE 3 to show representative frequency channel allocations which may be employed in a system embodying this invention. It will be noted that channel X is in the 26–32 mc. band, channel Y is in the 36–42 mc. band, while channel Z is in the 45–51 mc. band. Each of these bands has the conventional 6 mc. width and each preferably includes audio and vestigial video signals conventionally disposed frequency-wise. As will be later explained, there is preferably a converter associated with each transponder at each receiver for converting the signals in channels X, Y, and Z to a given, normally unused channel in the associated receiver. However, such conversion is not an essential to this invention, nor are channels X, Y, and Z necessarily assigned to the frequency bands indicated in FIGURE 3, since the television receivers in the network may each be capable of receiving and presenting program signals directly from the different video frequency channels without conversion other than the normal conversion to an IF frequency within the receiver itself. That is, the normal channel selector of a receiver may be employed to select between channels X, Y, and Z, assuming three such channels are available and not otherwise used for "free" reception.

For purposes of this description, it will be assumed that only the programs represented by the program signals in channels X and Y as generated in FIGURE 1, are those for which subscription fees are to be paid, generator 62 being for the purpose of generating as a public service feature video signals which may be completely received, viewed and heard as a full program free of charge. In other words, whenever a subscriber's receiver is operating on channel Z, no charge will be made therefor, but on the other hand whenever a subscriber's receiver is operating on either channel X or Y, subscription fees may be charged.

The three video generators 58, 60, and 62 are synchronized in their operations by appropriate signals emanating from a conventional studio television synchronizing generator 64. This keeps the different sets of video signals delivered by each video generator at its output, in step with one another so that, for example, the successive vertical synchronizing signal from the different video generators are in parallel so as to begin and end at exactly the same time. As is conventional also, the synchronizing generator 64 delivers horizontal (H) and vertical (V) drive pulses which are employed to drive the different video generators 58, 60, and 62. In addition, as illustrated in FIGURE 1, the H drive signals and the V drive signals are coupled by lines 66 and 68 respectively to readout pulse generator 56. As will be later described in detail, the H and V drive pulses along with TP–5 cause the readout pulses 1, 2, 3, and 4 to be generated sequentially and at a time which will cause the different tones generated in generators 54 to be timewise disposed respectively between given horizontal pulses in a evrtical retrace period following the post equalizing pulses therein. This will become more apparent as the description proceeds.

As above indicated, each ROP pulse from generator 56 causes one of the 18 different tone generators to receive an input signal which thereupon generates a tone of a given frequency, each tone generator being set to provide a different frequency tone. Since ROP pulses occur serially, the tones from generators 54 occur serially, with any one tone generator being "on" for approximately only 62 msec. at a time since all the tone generators are coupled to the H drive pulses via line 76 for purposes of gating off or resetting any "on." The outputs of all the tone generators are connected in parallel to a single line 70 which provide the modulating input to the amplitude modulator 72 whose carrier input is over line 74. Reference to FIGURE 3 shows this carrier to be of 34 mc., but any other frequency may be employed as long as it is not within the frequency of any of the channels X, Y, and Z.

As already indicated, the tones are modulated in one manner, preferably by amplitude modulation onto the carrier delivered by line 74. In addition, this carrier may be further modulated in another manner such as by frequency modulation in FM modulator 77, before or after the amplitude modulation, by audio signals for the purpose of providing an audio program free of charge to each subscriber. The audio signals just referred to are not to be confused with the video associated audio signals in channels X, Y, and Z. The former audio signals are completely independent of any video and can effect a program complete within itself such as continuous high fidelity music which a subscriber may enjoy at any time of the day or night without any charge therefor. As will be later more apparent, the FM audio signals after demodulation may be plugged into the subscriber's phonograph jack in his television receiver, or may be connected to a separate amplifier-speaker combination, and in either case may be one-half of a stereophonic set of FM audio signals.

The output of AM modulator 72 is coupled to mixer 78 along with the outputs of video generators 58, 60, and 62. The composite output of mixer 78 is coupled to a power distribution amplifier 80 and thence preferably via coaxial cable 82 to a transponder and receiver distibution network 84 which also distributes the reply signals from the different transponders in a manner to be hereinafter explained.

Although unnecessary to the basic features of this invention, use of a tone parity checker 86 is preferable for the purpose of assuring greater accuracy in the recording of transponder reply signals so as to prevent incorrect billing of subscribers. The details of such a checker are later described, it being sufficient at this time to indictae that the checker may be coupled to any one of a plurality of points following the tone generators 54, such as before the modulator 72, between modulator 72 and mixer 78, between mixer 78 and amplifier 80, or to coaxial cable 82, to determine by virtue of connection thereto of the V drive pulses over line 87 and the readout pulses 1, 2, 3, and 4, that there are no more nor no less than 4 tones (in accordance with the specific example previously described) per set of indicia, and that none of the tones are too long in duration or overlap each other, i.e., that there is one and only one tone of proper duration for each of the indicia on a record medium. When a set of tones includes more than 4 tones, less than 4 tones, one or more tones whose duration is too long, or overlapping tones, an output signal is generated on output line 88 for inhibiting purposes as will be later discussed.

Preferably, the tone input to checker 86 is from coaxial cable 82 immediately following amplifier 80 since that is the last point in the system before the distribution network, and the checker will consequently provide an output signal for any errors developed in the generation of tones not only by incorrect positioning of indicia on a card or malfunctioning of the system up through the tone generators, but also will indicate errors developed by malfunctioning of modulator 72, mixer 78, or amplifier 80. Consequently, in an operating system, switch 90 will generally be a straight through connection to line 92, but is here shown for the purpose of indicating that the tone inputs to the checker may be from any one of a plurality of points as above mentioned.

*Interrogation Tone Frequencies*

It has been previously mentioned that each of the tone generators 54 produce a different frequency tone, and reference is now made to FIGURE 4 to indicate the preferred frequencies of the different tones. In the example set forth, 18 different tone generators are employed and these may respectively be set to operate on the frequencies (tones) A through R shown in FIGURE 4. In selecting these frequencies, the criteria of desiring the lowest possible frequencies which will prevent the most interference as between themselves and each as between itself and the frequency of the horizontal synchronizing pulses or any other transmitted signal was used. So that none of the tones would be a harmonic of another nor of the horizontal synchronizing pulse frequency or possibly interfere with other transmitted signals, the tones are set to be in a frequency range which is less than one octave, with each tone frequency being an odd multiple of one-half the conventional horizontal synchronizing pulse or line frequency of 15,750 c.p.s., each tone preferably being separated from an adjacent tone by twice the line frequency.

*Distribution Network*

The distribution network 84 shown in FIGURE 1 is a network which may be employed in any given geographical area or extensions thereof, all according to the capacity of a given interrogating and recording system such as the one shown in FIGURE 1, and the lengths of coaxial cables coupled to the output of power distribution amplifier 80, along with the actual number or potential number of subscribers contemplated. In any event, the distribution network may be according to any one of several embodiments including those shown in FIGURE 5.

The main coaxial cable 82 after a long or short run thereof, as the case may be, from the power distribution amplifier 80 in FIGURE 1 may have in its length another distribution amplifier 94 as shown in FIGURE 5. Further distribution amplifiers (not shown) along the length of the main coaxial line 82 may be employed, but for purposes of brevity, only one such amplifier in the main line is illustrated in FIGURE 5. Along its length, the main coaxial line 82 has connected to it a plurality of branches each of which may be dead ended, or in turn connected to one or more sub-branches any of which may be dead ended or in turn have one or more sub sub-branches coupled thereto, etc. Generally speaking, each branch whether it be a main branch, sub-branch, etc., will be connected to the main coaxial line 82 via one or more distribution amplifiers each designated 96 in FIGURE 5. That is, such distribution amplifiers may be employed where there is a need for amplification of the input signals.

For purposes of describing the distribution network, reference is made in FIGURE 5 generally only to the branches directly connected to the main coaxial line 82, it being understood that any sub-branches may be connected similar to the main branches and to the transponder-receiver combinations in any of the manners to be described for the main branches. By legend along the left side of FIGURE 5, each of the main branches utilized in this figure for explanatory purposes is designated by a different Arabic number, while the transponder-receivers when coupled so as to be connected to the same branch line, are designated by corresponding Roman numeral groups (GP.). It is to be understood that each of the branch lines following an amplifier 96 is preferably a coaxial line, but this need not necessarily be so if the length of the branch is relatively short or other relatively small signal degradation type line is used for the branch.

The most simple and straightforward method of connecting each transponder-receiver combination 98 to a branch line and also to an output line is shown in FIGURE 5 relative to branch 1. That is, each of the transponder-receiver combinations 98 is coupled at its input to branch line 100 and its output to reply line 102. Each of the transponder-receivers 98 so connected to branch line 100 is responsive to a different set of interrogation tones, thereby precluding the possibility of more than one transponder in that group (GP. I) from providing an output signal on line 102 in response to any given set of interrogation tones coming in on the main coaxial line 82. The transponder-receiver combinations are in this manner grouped as by branch, and since each of the cards such as the card in FIGURE 2 includes space in its upper portion 24 for recording an output or reply signal from each one of the transponders for 50 different subscribers, there would need to be at least 50 different branches, main and/or sub. That is, since each transponder connected to any one branch responds to a different set of interrogation tones generated in accordance with the different interrogation codes on the different cards sequentially read by the readers 44 in FIGURE 1, and since any one card has space allocations therein for 50 different subscribers, the system when used at full capacity in this respect would require 50 different branches of any type, and in this case each such branch would have a transponder which responds to the same set of interrogation tones but still no more than one transponder per such branch must respond to any one of the different sets of tones used. It is to be understood, however, that the system need not, and very likely will not always be operated at full capacity due to various circumstances, and in this case less than 50 branches of any type may actually be employed and/or there may not be coupled to each branch, or even necessarily to more than one branch, a transponder which responds to the same set of interrogation tones. The number of transponder-receivers connected to any one branch therefor may vary as between the branches. In any case, the maximum number of transponder-receivers coupled to a branch is regulated by the capacity of the machine included in dash line 20 in FIGURE 1, i.e., by its speed of operation, and the number of different sets of interrogation code indicia per card read by the machine.

Regardless of how the transponder-receivers are coupled to their input and output lines, the capacity of the system remains the same with a given speed of operation of card reading and a given type of card. However, other methods of coupling the transponder-receivers to the branches are shown in FIGURE 5. It is to be understood that all the different distribution methods may be used in the same distribution network, or any given distribution network may include only one or more thereof. With specific reference again to FIGURE 5, it will be apparent that branch 2 including branch line 104 and output line 106 are coupled to a plurality of transponder-receivers in the same manner as before in branch 1, and therefore the group II transponder-receivers must each be responsive to a different set of interrogation tones, but any one set of interrogation tones may cause a transponder in both groups I and II to be responsive and effect substantially simultaneous output signals on their respective reply lines 102 and 106.

Branches 3, 4, and 5 as coupled to the main coaxial line 82 via their respective amplifiers 86 are each coupled to the inputs of a plurality of transponder-receivers. It will be noted, however, that the outputs of the transponders whose inputs are coupled to a given branch line, are not necessarily coupled to the same output line. For example, output line 108 is coupled to transponder-receivers 110, 112, 114, 116 and 118 with the input of transponder-receiver 110 being connected to branch line 120, the inputs of transponder-receivers 112 and 114 to branch line 122, and the inputs of transponder-receivers 116 and 118 to branch line 124. The transponder-receivers are therefore grouped in a different manner than those associated respectively with branches 1 and 2, transponder-receivers 110–118 being included in group III with each transponder in such group being responsive to a different set of interrogation tones. In a similar manner, the transponder-receivers coupled at their outputs to reply line 126 are not necessarily coupled at their inputs to the same branch line but each transponder so coupled is responsive to a different set of interrogation tones. Inspection of the transponder-receivers coupled at their output to reply line 128 will show that they are similarly arranged, no two transponders connected to any given output line being responsive to the same set of interrogation tones.

It is generally contemplated that each of the reply lines such as lines 102 or 108, for example, will be conventional telephone lines of the two conductor, unbalanced (ungrounded) type. This may be done when the different reply signals from all of the transponders have a relatively low frequency which may be accommodated by such a transmission line. Of course, if the reply signal frequencies are of relatively high frequency, coaxial cables may be used for the reply lines but at considerable expense.

In order to save a considerable length of telephone type reply line, the coaxial branch, such as branch 6 in FIGURE 5, may serve between its distribution amplifier 96 and the end of the branch as both the input line and the output line. In this instance, each of the transponder-receivers coupled to the branch line 130 has a common input-output terminal, as will later be described in more detail, and the television type reply line 132 may be inductively coupled as by a transformer 134 to the coaxial line branch 130 at any point between its amplifier 96 and the end of the branch. Consequently, the part of coaxial branch line 130 between the point thereon at which transformer 134 is connected and the length of the coaxial line 130 to each of the points of connection of the transponder-receivers serves the dual purpose of supplying the receiver and tone signals and also of returning the reply signals to the point of connecton of transformer 134. As for branches 1 and 2 the transponders coupled to branch line 130 are each responsive to a different set of interrogation tones and are therefore coupled as group VI.

Branches 7 and 8 are each similar to branch 6 except that branch 7 includes two parallel paths, lines 136 and 138, coupled together at any point along their length. Line 138 serves transponder-receivers 140, 142, and 144, while line 136 serves transponder-receivers 146, 148, and 150, all in parallel. The transponders served by lines 136 and 138 are respectively responsive to different sets of interrogation tones, and therefore transformer 152 couples each of the so served transponder-receivers to an output line 154 which never receives more than one reply signal at a time. All of the transponder-receivers 140–150 are effectively in the same group (group VII), while the transponder-receivers coupled to branch 8 via line 156 are in a different group (group VIII) although their disposition relative to transponder-receivers in group VII may be in the same area. Output line 158 coupled via transformer 160 to branch line 156 also receives only a single reply signal at a time since each transponder coupled to line 156 responds to a different set of interrogation tones.

Relative to branches 6, 7, and 8 in FIGURE 5, it is apparent that elements 96 therein must serve the purpose of a unidirectional current conducting device to prevent the reply signals from returning to the main coaxial line 82. Such devices may at the same time serve the function of amplifiication also if desired.

Branch 9 indicates the method of connecting subbranches to a main branch, and as above indicated, each of the sub-branches may be coupled to their respective transponder-receivers in any of the foregoing described manners, each sub-branch being coupled to transponders which respond to different sets, respectively, of interrogation tones.

Although not shown, this invention also includes the feature that the coaxial cable as it supplies input signals to each transponder-receiver may be also utilized for returning the reply signals past any number of given distribution amplifiers and thereby return a reply signal closer to its destination over the same input coaxial cable, by by-passing such distribution amplifiers.

Further, this invention is not limited to supplying the interrogation tones to the transponders, or even the video signals to the receivers, by a coaxial line, or any other line necessarily since especially the interrogation tones can be just as well supplied over the air and still have a good system for subscription television or any other application. Once subscription video signals are aired, however, and same are not scrambled in any manner, it becomes difficult to prevent unauthorized use thereof.

*Single Machine, One Section Card Type Transponder Reply Signal Recording System*

As will be later described in more detail, each transponder in the distribution network is capable of producing at least one given output or reply signal whenever a set of interrogation tones to which the transponder is responsive, is received thereby, if the transponder is appropriately conditioned. In the specific system being described, each transponder is associated with a different receiver which has connected thereto a converter for changing any one of the video program signal sets to a given channel frequency which may be received by the receiver. The converter therefore selects the video program to be presented, and each selecting position of the converter changes the conditions of the transponder so that it will produce a reply signal of one frequency for video programs over channel X, and another frequency reply signal for video signals over channel Y, but since the video program over channel Z is free, no reply signal is received during the presentation of the channel Z program. Therefore, in the specific embodiment now being described, each transponder will provide one of two different frequency reply signals or no reply signal at all, upon being interrogated by the set of interrogation tones to which it is responsive.

Continuing with the specific example hereinbefore set forth, particularly as to there being 50 different subscribers per record card of the type shown in FIGURE 2, or at least the possibility of potentially assigning 50 different subscribers to each such card, it is apparent that there will be 50 different output or reply lines from the distribution network 84 in FIGURE 1. Each such reply line is returned to a different reply detector. For example, as shown in FIGURE 1, reply line 166 goes to reply detector 168 (otherwise designated No. 1), while reply line 162 goes to reply detector 164 (otherwise designated No. 50). The other 48 reply lines (not shown) respectively connect to 48 other different detectors (not shown). Each of the 50 reply detectors are preferably identical one to another, but not necessarily so. As an example, each reply detector may be similar to detector 164 as shown in FIGURE 1.

Detector 164 includes two filters 170 and 172 which are respectively tuned to frequencies $f_1$ and $f_2$ corresponding respectively to the two different possible frequency signals incoming on line 162. Such frequencies are preferably separated sufficiently so that the filters 170 and 172 need not be complex or extremely sharply tuned to distinguish between the two different frequency reply signals. As an example, without limitation intended, frequencies $f_1$ and $f_2$ may be 820 and 1400 c.p.s. respectively. Each filter is designed to pass at least substantially only the reply signal whose frequency is that to which the filter is tuned. The filters are respectively coupled to stores 174 and 176 which temporarily respectively store an indication of the receipt of different ones of the two reply signals if a reply signal as received by a filter was generated in response to a set of interrogation tones which has its parity correct, assuming parity checker 86 is employed. If the parity of the set of interrogation is incorrect, an output signal occurs on line 88 from the tone parity checker as previously described, and this output signal inhibits the passage of a signal from either of the filters to their respective stores by virtue of connection of line 88 to each of inhibit gates 178 and 180 and to like gates in each of the other reply detectors. It is to be understood that the tone parity checking feature is a refinement of the invention and that gates 178 and 180 and homologues are refinements in each detector and employed only if the tone parity checking feature is employed.

Each of stores 174 and 176 store any input signal received thereby from their respective filters only for a predetermined length of time. Preferably, these stores are bistable in nature though they be monostable. When bistable, the stores are reset periodically by a reset signal on line 182 which may be connected, for example, to an output line of timing pulse generator 49, which line preferably provides the fifth timing pulse. Bistable stores are generally well known in the art, and each of stores 174, 176 may be a flip-flop or preferably a latching relay, for example.

Regardless of the disposition in the frequency spectrum of the frequencies $f_1$ and $f_2$ for the reply signals, within limits, either of filters 170 and 172 are very likely to produce an insubstantial output signal when it receives a reply signal to which it is not tuned, particularly during the initial period of the receipt of such a signal. That is, filter 170, for example, is likely to provide an insubstantial output signal on line 184 when the reply signal on line 162 is of the frequency $f_2$. This might be referred to as the "initial shock exitation" effect. During the first several cycles of such an insubstantail output signal, the amplitude thereof may reach a value sufficient to cause storage of the signal in store 174, which storage would be an erroneous indication of the receipt of a reply signal having frequency $f_1$ when actually an $f_2$ reply signal was received. This initial period during which such an insubstantial output signal might subsist is a relatively short period compared to the overall time duration of any given reply signal. As a specific example, a reply signal may be in the order of approximately 100 msec., while the initial shock exitation period and resulting insubstantial output signal from one of the filters may be only the first 10 msec. of the reply signal.

In order to prevent the stores 174 and 176 from receiving any erroneous indications of reply signals, i.e., from receiving any insubstantial filter output signal, the outputs of the filters are coupled not only by inhibit gates 178 and 180, but also by gates 186 and 188 respectively to their stores. These gates are enabled only during a predetermined time in accordance with the signals received on line 190. The timing of the signals on line 190 may be as derived from TP–5 via delay 192 and monostable multivibrator (MMV) 194. Taking into account the inherent delay between sending out of a set of interrogation tones and the time it takes for any reply signal to be returned to a reply detector, it has been determined that gates 186 and 188 may be disabled for approximately 40 msec., then enabled for approximately 60 msec., and the store 174, 176 associated by its respective filter to the correct frequency of the reply signal, will store an accurate indication thereof while the other store will store no insubstantial output signal from its respective filter. Therefore, delay 192 may effect a delay of 40 msec. in passing TP–5 to MMV 194 which when received thereby causes a pulse of 60 msec. duration.

As will be later more apparent in connection with the detailed description of readout pulse generator 56, the last tone in a set thereof will be generated by its respective tone generator 54 at a time not later than approximately 17 msec. following the beginning of the fifth timing pulse, but nevertheless a reply signal from each transponder causing an output signal in response to that set of interrogation tones will have been received for at least the initial shock exitation period (say 10 msec.) by its respective reply detectors before the end of the 40 msec. delay due to delay 192 since the remaining 23 msec. (40—17) allows for considerable inherent transmission delay of the interogation tones and reply signals.

As may be realized from the foregoing concerning detector 164, the basic elements thereof include only filters 170 and 172, or other such different signal passing means, plus the respective stores 174 and 176, assuming two different reply signals may be received by the detector. If there is only one reply signal put out by each transponder, of course there would need to be only one store and its respective filter would be unessential assuming the reply line was subject to no extraneous signal. Where there is more than one different reply signal possible on each reply line, a corresponding number of filters and respective stores are required. It is to be realized that not only inhibit gates 180 and 184 are unessential to a basic reply detector as above employed, but also that gates 186 and 188 are unessential thereto but are included as a refinement of the system.

Each of the stores in each of the 50 different reply detectors has a single output line such as output lines 196 and 198 for the respective stores in detector 164. These are respectively coupled, in a cable 200 if desired, to two input lines 202 and 204 which are in turn respectively connected to solenoids 206 and 208 in machine 20. These solenoids may directly operate two different card punchers respectively, or may indirectly operate respective punchers via an intermediary such as a draw bar (not shown) which when moved by a solenoid allows punching of a card by an associated punch. In any case, the solenoids each act as a recording means. The description of the recording means thus far is such as to indicate that any record made on a card in response to a stored indication of a reply signal is necessarily an aperture, but it is to be understood that the recordings made by means 206 and 208 may be of any other nature such as magnetic, but are preferably the same type of recordings as the interrogation code indicia on the record medium employed.

In the particular machine 20 being described, there are 50 sets of two recording means including the 50th set 206, 208. Each set of such recording means is connected to a different reply detector with each recording means in the set being connected to different detector stores. As shown, the No. 1 reply detector 168 has its stores coupled via cable 210 to recording means 212 and 214 respectively, these two recording means being the 1st set thereof for recording program usage by subscriber No. 1.

Corresponding recording means in each set are coupled not only to different reply detectors, but also are coupled at their other side to a single line. That is, all of the left group of 50 recording means including recording means 208 and 214, are coupled at their right hand terminal to line 216. In like manner all of the right hand group of 50 recording means including 206 and 212 are coupled at their right terminals to line 218. Lines 216 and 218 are further connected to switching means 220 with line 216 being connectable via switch 222 to any one of 11 different lines which respectively carry timing pulses 1 through 11 as derived from timing pulse generator 49. In like manner, line 218 is connectable by switch 224 to any one of 10 different lines which respectively carry timing pulses 1 through 10 also derived from timing pulse generator 49 via cable 226.

In an IBM 521 machine, switching means 220 is actually a plug board with several jacks for each of the different timing pulses supplied by generator 49, and consequently, either of lines 216, 218, may be connected with any one of the timing pulses so supplied. However, for purposes of this invention, all of the timing pulses are not necessary for switching means 220, and only those which may be advantageously employed with lines 216 and 218 are illustrated as being available thereto. The purpose of switching means 220 is to determine the exact time that a record of program usage may be made on a card by either group of recording means. Each group of 50 recording means may be considered as having their respective transducers aligned in a line parallel to the broad side of each card approaching them, with the two different groups of 50 recording means or actual transducers associated therewith being separated the distance between any two adjacent longitudinal card rows. Therefore, as card 42 progresses leftwardly step by step and under the respective groups of 50 recording transducers, the one of the longitudinal card rows 1 through 10 corresponding to the timing pulse connected via switch 222 may have records made therein, by the left group of 50 transducers when their respective stores are storing a detected transponder reply signal. Similarly, and at the same time during the same pass of the card under (over) the transducers, the longitudinal card row which has a number greater by 1 than the timing pulse coupled to line 218 by switch 224 may have recorded therein by the right hand group of 50 transducers, the indications stored by the respective stores of detected transponder reply signals.

To be more specific, and with reference to FIGURE 2 in conjunction with FIGURE 1, assume card 42 in FIGURE 1 has interrogation indicia coded so as to cause a set of interrogation tones B, E, H, and M, and that this is the first pass of the card through machine 20. Further assume that subscriber No. 1 (i.e., the one assigned the 31st transverse column on the card in FIGURE 2), and subscriber No. 50 are viewing the programs on channels X and Y respectively at the time their respective transponders receive the interrogation tones B, E, H, and M to which it is assumed they are responsive. In response thereto, the transponder associated with the receiver belonging to subscriber No. 1 will provide a reply signal of one frequency, say $f_1$, while the transponder associated with the receiver belonging to subscriber No. 50 will provide a reply signal of frequency $f_2$. Since both of these subscribers' transponders respond to the same set of interrogation tones, their reply signals will be on different reply lines; the $f_1$ reply signal from subscriber No. 1 will be on reply line 166, and reply signal $f_2$ from subscriber No. 50 will be on reply line 162. Reply detectors 164, 168 will detect and store a different one of the two different reply signals with store 176 in detector No. 50 storing an indication of the reply signal having frequency $f_2$, while the $f_1$ associated store in detector No. 1 stores an indication of the detection of the reply signal having frequency $f_1$. The other two stores in these two detectors will store no indications of detected reply signals. Since the $f_1$ associated store in detector No. 1 is connected to recording means 214 as previously indicated, and since store 176 in detector No. 50 is coupled to recording means 206, and assuming usage of the program in channel X is to be recorded in the first longitudinal row of card 42 as it steps to the recording means transducers, while the usage of the program in channel Y is to be recorded in the second longitudinal row of card 42, both of switches 222 and 224 will be connected to their respective terminals providing TP–1 since the program usage of both channels X and Y is to be recorded at time TP–1 though in different card rows. Therefore, since card 42 steps its first longitudinal row to the transducers associated with the left group of 50 recording means at the time TP–1 occurs, the transducer associated with recording means 214 will record an indication in that row at an area including only the 31st transverse column (the one assigned to subscriber No. 1) that subscriber No. 1 has his television set operating on channel X. At the same time, card 42 has its second longitudinal row over (under) the transducers associated with the right hand group of 50 recording means. Therefore, by virtue of switch 224 being connected to the TP–1 line, transducer 206 whose respective reply detector store 176 is storing an indication of the detected $f_2$ reply signal, will record at the intersection of the 80th transverse column and the second longitudinal row an indication of the usage by subscriber No. 50 of the program in channel Y.

On subsequent passes of card 42 through machine 20 any one of the 11 longitudinal rows of the card may be recorded into, according to the program assignment of the different rows and the connections made in switching means 220.

*Capacity Limitations of Single Machine, One Section Card System*

On the average, it is determined that each transponder-receiver combination should be interrogated once about every 10 minutes especially when any of the subscription programs are only to span a quarter hour. When such is the case, each transponder-receiver gets interrogated at least once during any given subscription program. In order to carry out the desirability of interrogating each transponder-receiver approximately every 10 minutes, the number of record cards similar to the one shown in FIGURE 2 must be limited to approximately 1,000 in number for a system of the type shown in FIGURE 1. That is, with card stepper 40 in FIGURE 1 causing the cards to step along at the rate of approximately one longitudinal row every 43 msec. and with the timing pulse generator providing a timing pulse for each such step, as hereinbefore mentioned, with the allowance of approximately two steps between cards, approximately 100 cards may be read every minute. This is the approximate speed of card reading by an IBM 521 reader-recorder. Limitation thereto, however, is not intended since other speed reading times may be employed in accordance with this invention. Being specific for the purpose of explaining the system, however, 100 cards per minute means 1,000 cards every 10 minutes as the maximum capacity of the system. Since each card of the type shown in FIGURE 2 has only 50 subscribers assigned to it, this means that the maximum capacity of the system is approximately 50,000 subscribers, it being understood that each of the subscribers for any one card has his television receiver associated with a transponder connected to a different distribution branch.

*Single Machine, Two Section Card System*

Since it is contemplated that any given locality may have more than 50,000 different television receivers whose owners or operators might wish to be subscribers, a system quite similar to that shown in FIGURE 1 may be employed to double or even triple the capacity of the system by merely changing the setup on each of the cards, along with changing the timing considerations. For example, in order to double the capacity of the system as to the number of subscribers which it will handle at the rate of interrogating each on the average of about every 10 minutes, a card such as that shown in FIGURE 6 may be employed.

This card is the same size as the card in FIGURE 2, but is divided into two longitudinal sections as to its upper portion 228 (including transverse columns 31 through 80) and as to its lower portion 230 (including transverse columns 1 through 20). The left section of the lower portion includes interrogation code indicia in the form of apertures disposed in exactly the same positions as the interrogation code for the card in FIGURE 2, i.e., indicia B, E, H, and M which are respectively located in longitudinal rows 1 through 4. The right section of the lower portion 230 of the card in FIGURE 5 begins with longitudinal row 7 and has indicia therein for generating a set of interrogation tones different from the set generated by the indicia in the left half, i.e., tones B, E, H, and L. The upper portion 228 is similarly sectioned and each one-half of a transverse column is assigned to a different set of 50 different subscribers. The card therefore will accommodate 100 subscribers all of which may be assigned to the same group number indicated in mid-portion 232 on the card. By dividing the upper portion 228 into two sections, it becomes apparent that the right section can have program usage recorded therein only in rows 7 through 11 as long as row 12 is retained for indications of inactive subscribers or subscriber unassigned transverse column halves, in the same manner as described for the row 12 area 28 on the card in FIGURE 2. Likewise, when row 12 in the right section of upper portion 228 is so reserved, row 6 in the left section is also preferably so reserved relative to the 50 possible subscribers for that section half. In other words, only five different longitudinal rows in each of the sections in upper portion 228 may be used for recording program usage. However, because of the doubling up on a card, only 1,000 cards are necessary to serve 100,000 subscribers at the individual interrogation rate averaging about once every 10 minutes, although the program usage relative to only five different programs may be recorded on the 1,000 cards. This means that at least twice as many two section cards (i.e., like the one shown in FIGURE 6) are necessary to record the same number of programs as is recordable on 1,000 one section cards (i.e., such as the one shown in FIGURE 2).

From the preceding paragraph relative to the cards shown in FIGURES 2 and 6, it is now apparent that the word "section" as used herein in reference to cards means the number of longitudinal parts into which either the lower portion or upper portion is divided into disregarding any row reservation in the upper portion for indications of inactive or unassigned subscribers. That is, a "two section" card means that the card's lower portion 232 (FIG. 6) is divided into two sections each containing different interrogation code indicia and that its upper portion is also divided into two sections for respectively having recorded therein the program usage by 2 different sub-groups of 50 subscribers whose associated transponders respectively respond to interrogation tones initiated by the sets of indicia in the two lower sections on the card. FIGURE 2, therefore, shows a one section card, FIGURE 6 a two section card, and FIGURE 8 a three section card.

The only changes necessary to the system shown in FIGURE 1, in order to use two section cards, are shown in FIGURE 7. Since the interrogation code indicia records in the lower portion 230 of the card in FIGURE 6 are in longitudinal rows 1 through 4 and 7 through 10, timing pulses 1 through 4 and 7 through 11 emanating from timing pulse generator 49 in FIGURE 7 are respectively OR'd together and presented to the storage unit 48. That is, the output lines carrying TP–1 and TP–7 are coupled together and into the first group of sub-stores in unit 48, output lines carrying TP–2 and TP–8 are coupled together and into the second group of sub-stores in unit 48, etc. The readout pulse generator 56 is the same as in FIGURE 1, but TP–11 is supplied thereto in conjunction with TP–5.

On the left side of timing pulse generator 49 in FIGURE 7, there is illustrated a similar coupling of timing pulse output lines with TP–1 and TP–7 being available on the same line in cable 226, and similarly for TP–2 and TP–8, TP–3 and TP–9, etc. Switching means 220′ differs from its corresponding switch in FIGURE 1 in that switch 222 needs only five positions so that line 216 may be connected, at any one time, to the line carrying TP–1 and 7, at another time to the line carrying TP–2 and 8, etc. Similarly, switch 224 need have only four positions so that line 218 may be connected at any one time to the line carrying TP–1 and 7, or at another time TP–2 and 8, etc. Again, since the recording means connected to line 218 can be utilized to record program usage in the 5th and 11th longitudinal rows of each card when TP–4 and TP–10 respectively occur, there is no need for the recording means connected to line 216 to be coupled to timing pulses 5 and 11.

*Single Machine, Three Section Card System*

To increase the subscriber capacity of the system of FIGURE 1 to approximately 150,000 subscribers, i.e., to triple its capacity, each card may be divided into three upper and lower sections as shown in FIGURE 8 and the system changed only to the extent shown in FIGURE 9. In FIGURE 8, there is a different interrogation code indicia record in each one-third section of the lower portion 234. That is, the left-most record section of portion 234 includes longitudinal rows 1 through 4 and has indicia therein for generating tones B, E, H, and M, while the middle record section of portion 234 includes rows 5 through 8 and contains indicia for generating tones B, E, H, and L, and the third or right-most record section of portion 234 includes columns 9 through 12 with indicia thereon for generating tones B, E, H, and K. The upper portion 236, including transverse columns 31 through 80, is also longitudinally divided into three sections each including at least three longitudinal rows with the fourth longitudinal row of each being reserved, if desired, for inactive or unassigned subscribers, as previously described relative to the row 12 area 28 on the card in FIGURE 2. Each upper one-third section therefore accommodates 50 subscribers totaling 150 different subscribers per card, and with 1,000 such cards all different in that they contain 3,000 different sets of coded interrogation indicia, the receivers of 150,000 subscribers may each be interrogated once approximately every ten minutes. Each of the possible 150 subscribers assigned to any given card may be categorized in a group designated by the indicia in mid-portion 238 in FIGURE 8. Although the subscribers assigned to a card are thereby all in the same group, it should be noted that the 50 subscribers assigned to the record means constituting the left section of upper portion 236 all have transponders associated with their receivers which respond only to tones B, E, H, and M generated in accordance with the indicia in the left record section of lower portion 234. Similiarly, the subscribers assigned to the middle record means section all have transponders which respond only to interrogation tones B, E, H, and L as generated in response to the indicia in the middle record section of lower portion 234, while the transponders associated with the subscribers assigned to the right record means section respond only to the tones initiated by the indicia in the right record section.

To employ record cards such as shown in FIGURE 8, the system of FIGURE 1 may be modified as shown in FIGURE 9. By coupling the output lines on the right side of timing pulse generator 49 together so as to group timing pulses 1, 5, and 9 onto the same input line to storage unit 48, TP–2, 6, and 10 on another input line thereto, TP–3, 7, and 11 on a third input line thereto, and TP–4, 8, and 12 on a fourth input line thereto, the sets of interrogation code indicia in the respective lower sections of the card in FIGURE 8 may be sequentially read into storage.

The reading out of storage is initiated by timing pulses TP–4, 8, and 12, there being four readout pulses for each of these timing pulses. Since the same timing pulse initiates the readout pulses and the read into of the fourth column or group of sub-stores, it becomes apparent that the fourth group of sub-stores must be read into before the fourth readout pulse occurs. If the stores in the fourth group thereof are magnetic cores as will be more fully described hereinafter for one embodiment of the storage unit 48, there is no question but that the fourth group of cores can be read into by a timing pulse which pulse also initiates the readout pulses before ROP–4 occurs since there is at least 0.8 msec. available between the beginning of the fourth, eighth, or twelfth timing pulse and the corresponding fourth readout pulse. This intervening 0.8 msec. is based on the fact that each vertical drive pulse occurs approximately every 16⅔ msec., and assuming that the TP input to the readout pulse generator 56 occurs at the very beginning thereof, the first readout pulse occurs, by virtue of a delay built into the generator 56, at approximately 0.7 msec. later with successive readout pulses occurring approximately during each of the next three 0.063 msec. periods making ROP–4 begin at approximately 0.89 msec., at the earliest, after the beginning of the input timing pulse.

Considering the connections on the left side of timing pulse generator in FIGURE 9, it will be noted that the output lines for TP–1, 5, and 9 are coupled together to a single line in cable 226, TP lines 2, 6, and 10 are similarly coupled, etc. Switch 222 consequently needs at most only four positions so that line 216 may be coupled at any one time to TP–1, 5, and 9, or at another time to TP–2, 6, and 10, etc. Similarly, switch 224 at most needs only three positions so that line 218 may be coupled to TP–1, 5, and 9 at one time, at another time, to TP–2, 6, and 10, or at a third time to TP–3, 7, and 11. With such connections available, the usage of four different programs per upper section in the card in FIGURE 8 may be recorded thereinto. If the fourth row of each upper section is reserved for inactive or unassigned subscribers, the number of positions for switches 232 and 234 in FIGURE 8 and the corresponding timing pulses may be reduced by one. That is, under such circumstances, switch 222 need not have a fourth position for coupling line 216 to TP–4, 8, and 12, and switch 224 need not have a third position for coupling line 218 to TP–3, 7, and 11.

Relative to the two section card system as described in relation to FIGURES 6 and 7, and the three section card system described in relation to FIGURES 8 and 9, it is to be understood that for maximum subscriber capacity so that each subscriber's transponder-receiver combination may be interrogated approximately once every ten minutes, only approximately 1,000 cards may be employed with the machine 20 in FIGURE 1. Nevertheless, even though the number of cards is not increased over the number needed for a one section card such as in FIGURE 2, the number of maximum possible subscribers is doubled for the two section card system and tripled for the three section card system. This, however, causes no change in the number of reply lines, detectors, or recording means, from that specified for the one section card system of FIGURE 1. That is, since there are still only 50 possible different subscribers assigned to each upper section of the respective cards in FIGURES 6 and 8, and since no more than one transponder responding to the same set of interrogation tones can be coupled to any one reply line, a maximum of 50 reply lines is necessary. The difference between the one section, two section, and three section card systems, as it concerns the number of interrogation tone combinations is that the number of different sets of interrogation tones is respectively doubled and tripled for the two and three section card systems over the one section card system of FIGURE 1. Since this is true, there can be a corresponding doubling and tripling of the number of transponders coupled to any given reply line such as reply line 102, for example, in FIGURE 5. For a one section card system of the type shown in FIGURE 1, the maximum number of transponders each responding to a different set of interrogation tones is 1,000, and consequently, only 1,000 such different transponders may be coupled to any given output line. With a two section card system, the number of maximum transponders which may be coupled to a given output line is increased to 2,000, while in a three section card system, the maximum number connectable to a given output line is 3,000.

From the foregoing it can be appreciated that each of the above different systems have their own relative advantages and disadvantages. The more longitudinal sections on a record card, the greater the number of subscribers that may be accommodated by the system. However, an increase in the number of longitudinal sections on a card has the disadvantage of reducing the number of longitudinal rows per section in which program usage may be recorded. In order to have the advantages and particularly the tripled capacity of the three section card system, and at the same time have the advantages of a one section card system, such as described relative to FIGURE 2, wherein a least 11 longitudinal rows per card are available for recording program usage, a system to be referred to as the multiple machine system, is shown in FIGURE 10.

*Multiple Machine System*

Although the multiple machine system of FIGURE 10 will be described in relation to a one section card such as that shown in FIGURE 2, it is to be realized that two or three section cards may be employed therewith to increase the capacity of the system two to three times the maximum capacity of subscribers for a one section card three machine system. The system in FIGURE 10 includes three machines I, II, and III, preferably each like machine 20 in FIGURE 1, and illustrated in FIGURE 10 respectively within dash lines 240, 242, and 244. For the sake of stressing that the number of interrogation tones in a set thereof may be more or less than the previously indicated four, the system of FIGURE 10 is set up to employ five different interrogation tones in each different set thereof. Consequently, the cards which are employed in each of machines 240, 242, and 244, each have in their lower sections 246 one set of five different indicia, one indicium per the first five longitudinal rows of the card. For example, the card of FIGURE 2 would be changed to include another indicium in its interrogation code, so as to make the apertures or other indicia used correspond respectively to interrogation tones B, E, H, M, and R, for example.

Each of the different machines 240, 242, and 244 respectively have card stepping means 248 and their own individual timing pulse generators 250 along with respective switching means 252. In addition, each such machine includes two groups 254, 256 of 50 recording means as does machine 20 in FIGURE 1. In the manner set forth relative to the description of FIGURE 1, the recording means in each machine in FIGURE 10 are divided into 50 sets, including one recording means from each group for a machine.

The indicia signals resulting from reading the cards in each of the machines I, II, and III are conveyed via the respective lines 258 to three different storage units I, II, III also designated 260, 262, and 264. Each of these storage units is similar to the storage unit 48 in FIGURE 1 in that there are 18 input lines thereto from the respective 18 card indicia readers, but each storage unit is expanded by one additional group of sub-stores so as to accommodate storage of the fifth indicia signal resulting from the added fifth indicium on each card. The timing pulses delivered to each storage unit for the purpose of causing the indicia signals to be stored therein, are from the respective timing pulse generators 250 and include timing pulses 1 through 5.

Readout pulse generator 266 may be similar to the readout pulse generator 56 of FIGURE 1, but is expanded, as will be described in greater detail later, to provide three different sets of five readout pulses which sets are designated ROP–I, ROP–II, and ROP–III which are respectively coupled to storage units I, II, and III for causing the stored indicia signals to be read out thereof.

The 18 different output lines from each of the storage units are connected in parallel respectively to 18 different input lines in the tone generating means 268 which as in FIGURE 1 includes 18 different oscillators for generating 18 different frequency tones. Since each of the storage units are so coupled to the tone generating means, the different storage units must be read out at different times so that the sets of interrogation tones will not be overlapping. This is effected by making the different sets of readout pulses from generator 266 occur sequentially, but not necessarily in any given order, particularly when the timing pulse generators for each of machines 240, 242, and 244 are unsynchronized, which is the situation contemplated in the embodiment illustrated in FIGURE 10.

In order to cause the set of indicia signals read into a storage unit to be read there out of before indicia signals later stored in either of the other two storage units are read out of their storage units, readout pulse generator 266 is supplied not only with the horizontal and vertical drive signals on lines 270 and 272 from the synchronizing generator 274, but also with priority indicating signals on lines 276, 278 and 280 from the priority determiner 282 the circuit for which is later detailed relative to FIGURE 15. The priority signals on lines 276, 278, and 280 are each just like a timing pulse as far as duration is concerned, but respectively occur in accordance with the sequence in which timing pulses are respectively received on the priority determiner's input lines 284, 286, and 288. These input lines are connected respectively to three, three position switches 290, 292, and 294. Each position of each of these switches is connected to a different one of the timing pulse generator output lines, and specifically, the switch terminals of switch 290 are respectively coupled to TP–3, 6, and 9 of timing pulse generator I, while the switch terminals of switches 292 and 294 are coupled to TP–3, 6, and 9 from the respective timing pulse generators II and III.

As indicated by dash line 296, switches 290, 292, and 294 are movable in unison so that each is coupled at any given time to like numbered timing pulses from the respective timing pulse generators. As will later be more apparent, the ability of input lines 284, 286, and 288 to be coupled at different times to TP–3, 6, or 9 provides the advantage of being able to record in any one of the longitudinal rows in the upper section of each card with some overlapping as between the rows which may be recorded into when switches 290, 292, and 294 are in a given position. That is, when the switches are connected to TP–3, longitudinal rows 1 through 5 may have recordings made in them, while when the switches are coupled to TP–6 rows 4 through 8 may be recorded into, and when the switches are connected to TP–9, recordings may be made in rows 7 through 11. Each switch position gives the possibility of recording into any one of five different program rows with rows 4 and 5 being recordable into when the switches are coupled to either TP–3 or TP–6, and rows 7 and 8 being recordable into when the switches are coupled to either TP–6 or TP–9.

As in the systems described relative to FIGURE 1, one of the 18 tone generators in the tone generating means 268 in FIGURE 10 is caused to generate a tone in response to each indicium signal read out of its respective storage unit by a respective readout pulse, and that tone generator is gated off or reset by the following H drive pulse coupled to each of the tone generators via line 298.

The resulting tones therefore occur serially within a set and serially by sets.

Each tone generator's output line is connected in common to the input line 300 for amplitude modulator 302 which receives a 34 mc. carrier on line 304, such carrier being previously frequency modulated, as previously described relative to FIGURE 1, by audio signals in FM modulator 306, if desired. The resulting modulated carrier is delivered over line 308 to mixer 310 which mixes the modulated carrier with the video sets of signals respectively emanating from the video generators 312, 314, and 316, respectively in channels X, Y, and Z as heretofore explained, and the output of the mixer is delivered to distribution network 318 via power distribution amplifier 317 and coaxial input line 319.

Distribution network 318 in FIGURE 10 may be as described relative to FIGURE 5 and the three section card system of FIGURES 8 and 9. That is, since the multiple machine system of FIGURE 10 when employing a single section card has the same maximum capacity as a single machine three section card system, at least 3,000 transponders each of which respond to a different set of interrogation tones may be connected to any one reply line, and this may be accomplished in any of the different manners heretofore described relative to FIGURE 5.

As in the systems described in relation to FIGURE 1 each of the 50 output lines is coupled to a different reply detector. However, for the multiple machine system of FIGURE 10, each reply detector includes an additional set of two stores (assuming two different frequency reply signals may be generated by each transponder) for each machine added to the system of FIGURE 1. That is, since FIGURE 10 includes three machines 240, 242, and 244, each reply detector includes three sets of two stores with the set of stores **320*a*, 320*b* being respectively coupled to passing means such as filters 321 and 322 by respective gates 324*a* and 324*b*. In like manner, the second set of stores including stores 326*a* and 326*b* are respectively coupled to filters 321 and 322 by gates 328*a* and 328*b*, while stores 330*a* and 330*b* are coupled to the respective filters by gates 332*a* and 332*b***.

Each set of stores in a given detector is reset by a timing pulse from the three different timing pulse generators respectively, each three timing pulses being of the same number, assuming all of the stores are bistable in nature rather than monostable for example. That is, the set of stores **320*a* and 320*b* are reset by a timing pulse (now termed reset pulse $R_I$) from the timing pulse generator associated with machine 240, by virtue of connection of line 334 between each of these stores and the input line 284 to priority determiner 282, stores 326*a*, and 326*b* are coupled to a reset pulse $R_{II}$ from the timing pulse generator associated with machine 242 by line 326 connecting these stores to input line 286, and stores 330*a* and 330*b* are similarly connected to the third reset pulse $R_{III}$ by line 338. The corresponding sets of stores in the other 49 reply detectors are similarly coupled respectively to lines 334, 336, and 338**. In this manner, each different set of stores in each reply detector is reset at the appropriate time following the period in which a reply signal may be received.

It may be recalled that gates 186 and 188 in reply detector 164 in the system of FIGURE 1 were provided for the purpose of eliminating any undesirable signal from being coupled to their respective stores, which undesirable signal might be produced by an insubstantial output signal from a detector filter, which is not turned to the frequency of a given reply signal but due to initial shock excitation provides an insubstantial output signal during the initial period of such a reply signal. In FIGURE 10, the different sets of gates associated respectively with the different sets of stores in each reply detector, are provided for the same purpose and additionally for gating substantial output signals from filters 321 and 322 to their associated set of stores only. That is, since any reply signal is generated by a transponder in response to the indicia on a card passing through a given one of the machines I, II, and III, it is desirable to record on that same card, rather than a card in either of the other two machines, an indication of the occurrence of that reply signal.

It may be noted that the set of stores **320*a*, 320*b*, which are in detector No. 50 are coupled to the top or 50th set of reading means associated with machine I, the set of detector No. 50 stores 326*a*, 326*b* are coupled to the corresponding 50th set of reading means in machine II, while the set of stores 330*a*, 330*b* is coupled to the corresponding 50th set of reading means in machine III. Therefore, in order to assure that a reply signal substantially passed by one of filters 321, 322 is temporarily stored in one of the stores in the set thereof which is coupled to the machine whose card initiated the reply signal, the respective sets of store gates are enabled sequentially in accordance with the priority determiner 282. The timing pulse type priority signal $P_I$ on line 276 indicates that a card in machine I initiated a set of interrogation tones which may cause a transponder reply signal the occurrence of which is to be recorded on that same card in machine I. Therefore, the priority signal on line 276 is appropriately delayed, say 40 msec., to obviate the effect of any initial shock exitation of any of the reply detector filters, by delay unit 340, then appropriately lengthened in time duration by means such as monostable multivibrator 342 to effect a gating signal $G_I$ which is coupled to both of gates 324*a* and 324*b*. In like manner priority signal $P_{II}$ on line 278 is changed by delay unit 344 and monostable multivibrator 346 to a gating signal $G_{II}$ which is coupled to both of gates 328*a* and 328*b*, while priority signal $P_{III}$ on line 280 is similarly delayed in unit 348 and timed in duration by monostable multivibrator 350 into a gating signal $G_{III}$ which is coupled to gates 332*a* and 332*b*. Corresponding sets of gates in the 50 different reply detectors are coupled in parallel to their respective gating signals. In this manner, the correct one of the reading means in each group thereof in the correct machine is fed with a detected reply signal. In order to cause the recording to be in desired ones of the longitudinal program rows on the cards, switching means 252 for each of the different machines in FIGURE 10 may be set up exactly as shown in FIGURE 1 for switching means 220**.

If it is desired to employ the tone parity checker 352 in FIGURE 10, its tone input line 354 may be connected to coaxial line 319 or to any of the other positions heretofore mentioned relative to FIGURE 1. Since the purpose of checker 352 is the same as set forth for checker 86 in FIGURE 1 but must check the parity of five tones in this embodiment, five different readout pulse input lines 356, 358, 360, 362, and 364 are necessary instead of the four shown for checker 86 in FIGURE 1. Since it makes no difference to the parity checker 352 in FIGURE 10 whether a readout pulse on any one of these input lines is coupled to storage unit 260, 262, or 264, each of the like numbered pulses in each set of readout pulses may be coupled to one of these input lines via an OR circuit. For example, ROP–I–1, ROP–II–1, and ROP–III–1 are each coupled to line 356 via OR circuit 366. OR circuits 368, 370, 372, and 374 respectively couple the 3rd through 5th readout pulses in each set thereof to the respective input lines 358 through 364. Whenever checker 352 notes an error in any set of interrogation tones, an output signal is generated on line 376 for the purpose of inhibiting gates 378 and 380 along with corresponding gates in each of the other detectors, from passing any reply signal generated in response to an incorrect set of interrogation tones. As in FIGURE 1, the parity checker 352 in FIGURE 10 may be reset by a vertical drive pulse occurring on line 382.

Although the multiple machine system described relative to FIGURE 10 is illustrated as having three different machines I, II, and III each of which includes the same number of components, it is to be understood that a multiple machine system, for example a three machine system, need not include three different card steppers 248, three different timing pulse generators 250, or three different switching means 252, but may instead include only one card stepper which operates to step the cards in each machine in synchronism, only one timing pulse generator which operates to provide a set of timing pulses which may be used for all three storage units, and only one switching means 252 which may be used with the different groups of recording means in each machine and be coupled to the single timing pulse generator. With a system of this sort, the three sets of readout pulses may be sequentially generated in generator 266 in a given order such as respectively by timing pulses 6, 7, and 8, for example, so as to cause the indicia signals in the respective storage units to be sequentially presented by sets to the tone generating means 268. The timing pulses from a single timing pulse generator system may also be employed to time the gating of the different sets of gates in each reply detector so that each reply signal is recorded on the card whose interrogation indicia in effect caused the reply signal.

Numerous different systems having been hereinabove described, this specification now proceeds with the description of some of the component parts of such systems. In general, the component parts hereinafter described are related to the multiple machine systems of FIGURE 10, but when it is not particularly obvious how the use of any given component part can be modified to be employed in any of the single machine systems related to FIGURE 1, the changes, which are mainly deletions, are indicated.

*Storage Unit*

The storage unit illustrated in FIGURE 11 is representative of any one of the storage units 260, 262, or 264 in FIGURE 10, and is also a representative of the storage unit 48 in FIGURE 1 as long as TP–5 and/or ROP–5 in FIGURE 11 is not connected to the right-hand group or column of sub-stores each of which is indicated by a circle, or as long as this group of sub-stores is deleted from the storage unit. Each of the left-hand input lines designated A through R represents one of the 18 different input lines to the storage unit, while each of the 18 different output lines A′ through R′ is one of the output lines connected to a respective one of the tone generators in FIGURE 1 or 10. Each circularly represented sub-store is in a column of such sub-stores and the different columns of sub-stores are designated groups I through V respectively. Each sub-store in any group has one of its inputs coupled to a given timing pulse and another of its inputs coupled to the like numbered readout pulses, each group of cores being coupled to different like numbered timing and readout pulses. That is, for example, the sub-stores in group I each have two inputs respectively coupled to TP–1 and ROP–1, while the sub-stores in group II each have two inputs respectively coupled to TP–1 and ROP–2, etc. Each of the sub-stores in each group thereof also has a 3rd input which is coupled to one of the input lines A through R, with each sub-store in a row thereof being coupled to the same input line. That is, corresponding sub-stores in the different groups are coupled in parallel to a given input line. In like manner, each of the outputs of corresponding sub-stores in the different groups thereof are coupled in parallel to a single output line. For example, input line H is coupled to each sub-store in the associated row thereof, while output line H′ is similarly coupled to the same row of sub-stores.

It will be noted that each column of sub-stores does not contain, in FIGURE 11, a full complement (18) of sub-stores. This is not to say that each column or group of sub-stores may not include 18 sub-stores, but that it has been found more efficient to arrange the sub-stores as shown in FIGURE 11. Such an arrangement decreases the number of necessary sub-stores, and does not substantially decrease the number of possible sets of interrogation tones.

Relating the number of sub-stores in any row thereof in FIGURE 11 to a card, say the card in FIGURE 2, it becomes apparent that if a set of interrogation tones is to include tone A, this tone can only be the first tone in a set since there is only one sub-store in FIGURE 11 which has an A input line. This means that each card which has an indicium for initiating the generation of tone A can have that indicium only in the first longitudinal row of the card but in any of the 18 different discrete areas in that row.

Likewise, any set of interrogation tones which is to include tone B must have that tone occurring during either the first or second tone periods within the set of tones since there are only two sub-stores in FIGURE 11 which have a B input line. Relative to the card in FIGURE 2, this means that the indicium for tone B can be located in only longitudinal rows 1 and 2 of the card, but in any of the 18 different discrete areas in each of these rows. Similarly, for any set of tones to include tone C, it must do so during the first three tone periods of the set, and the indicium on the card for tone C can be in only any one of the first three transverse rows, but again in any one of the 18 discrete areas in each of these rows. A similar situation exists for tone D in that it must occur in any set of tones in which it is to occur during the first four tone periods of the set, and the card indicium therefore can only be located in any one of the 18 possible discrete areas in each of the first four longitudinal rows of a card. As to tones E through O, these may occur in any one of the five tone periods in a set of tones, and the respective indicia therefore may occur in any of the 18 discrete areas in any one of the first five longitudinal rows on a card. For tones P, Q, and R, because of the configuration of sub-stores in FIGURE 11, the situation is the converse of that for tones D, C, and B, respectively, and their respective indicia.

In any event when there are $n$ possible different tones which are used $k$ at a time in each set of interrogation tones, at least approximately $n$ different sub-stores are included in each group thereof in FIGURE 11. When any sub-store group has $x$ number of sub-stores less than $n$, that group can store only $(n-x)$ of the different tone indicia signals, but when the groups are arranged as in FIGURE 11, each of the $n$ indicia signals can be stored in at least one of the different groups of sub-stores. The actual number of sub-store groups in which any one of the $n$ indicia signals can be stored may be represented by $(k-y)$ where $y$ is a variable and represents the number of group corresponding sub-stores, i.e., those in any horizontal row in FIGURE 11. Correlating this to the possible interrogation code indicia locations on the card of FIGURE 2, means that $k$ different indicia can be used per lower card section and that each of the $k$ indicia can be in $(k-y)$ different longitudinal rows where $y$ varies as above in correspondence with the row of sub-stores with which the particular $k$ indicia is associated, but that each of the $k$ indicia may be disposed in any one of $n$ discrete areas in each of its possible $(k-y)$ rows.

Each of the sub-stores as represented by a circle in FIGURE 11 may include the circuitry shown in either FIGURES 12 or 13. In FIGURE 12, magnetic core 400 comprises a bistable store which has an input winding 402 connected at one end to the indicia signal input line 404 and at the other end to the timing pulse line 406. When an indicia signal and timing pulse signal are coincident in winding 402, core 400 changes from a reset state to a set state. When the core is to be read out, the ROP on line 408 causes the core to change from its set state back to a reset state by virtue of the direction of flux created in winding 410 relative to that created in winding 402 when the core was set. The changing of the core from a set state to a reset state induces an output signal in winding 412 which is coupled via isolating resistor 414 to the output line 416.

In FIGURE 13 the sub-store bistable element includes a latching relay which has an input winding 418 connected at opposite ends respectively to the indicia input signal line 420 and the timing pulse line 422. When these two signals are coincident, armature 424 closes against its left terminal to provide an input to gate 426 from the source of voltage connected to the armature. During readout time, the ROP on line 428 as coupled to gate 426 causes an output signal on line 430 which output signal may be coupled not only to a tone generator, but also back to the reset winding 432 to move armature 424 to its rightward position. Any other desired reset signal may be used for the purpose, and even the ROP which is gated through gate 426 may be connected to winding 432 since the relay operation is normally slow enough to allow all of a readout pulse to be passed through gate 426 before the relay is actually unlatched by that readout pulse.

Alternative to latching relays which include gates as shown in FIGURE 13, the arrangement in FIGURE 14 may be employed. In this arrangement, each row of sub-stores includes a latching relay similar to the one shown in FIGURE 13 but without there being gates respectively associated with each latching relay. Instead, the plus V voltage connected to the relay armature is delivered directly to a common OR circuit 434 so that the relay which is latched enables gate 436 to pass one of the readout pulses 1 through 5 resulting from OR circuit 438.

*Priority Determiner*

The circuit now to be described with relation to FIGURE 15, is the priority determining circuit shown in block form in FIGURE 10, and therein used to receive like numbered timing pulses of the three different input lines 284, 286, and 288 respectively from the timing pulse generators in machines 240, 242, and 244 for providing priority signals $P_I$, $P_{II}$, and $P_{III}$ respectively on output lines 276, 278, and 280 in the order determined by the circuit in FIGURE 15. Input lines 284, 286, and 288 are respectively coupled to the "1" inputs of flip-flops 440, 442, and 444. The outputs of each of these flip-flops are coupled to an inhibiting gate 448 via line 450. When no signal is coupled to the gate on inhibit line 452, any signal on line 450 is passed through the gate to differentiating circuit 454 and clipping circuit 456 which passes only the first occurring differentiated spike in the resulting set thereof.

The output of clipper 456 is then coupled in parallel to three different AND circuits 458, 460, and 462, as one input to each such circuit. Each of these AND circuits has a second input which is derived from the "1" output of the associated flip-flop. That is, the "1" output from flip-flop 440 is connected not only to OR circuit 446, but also to AND circuit 458. In like manner, the "1" outputs of flip-flops 442 and 444 are respectively coupled to AND circuits 460 and 462. In addition, each of AND circuits 460 and 462 have a third input from the "0" output side of flip-flop 440, while AND circuit 464 has a fourth input from the "0" output side of flip-flop 442. The outputs of AND circuits 458, 460, and 462 are respectively coupled to the signal passing input of doubly inhibited gates 464, 466, and 468 with any one of such outputs being also coupled to an inhibit input of the other two gates, plus being further coupled to OR circuit 470. That is, the output of AND circuit 458 is coupled via line 472 as an enabling input to gate 464, and from junction 474 the output is also coupled via line 476 to OR circuit 470 and via line 478 to an inhibiting input to each of gates 466 and 468. Further, the output of AND circuits 458, 460, and 462 are respectively coupled via OR circuits 480, 482, and 484 to the "0" input sides of flip-flop 440, 442, and 444 in such a manner that the trailing edge of the outputs of the AND circuits is operative to reset the respective flip-flops. OR circuit 470 is coupled to the inhibiting input of gate 448 through a monostable multivibrator 486 which may effect an inhibit pulse "on" time of say 140 msec. The output of each doubly inhibited gate is coupled to the respective output lines 276, 278, and 280 through a pulse lengthening circuit such as monostable multivibrators 488, 290, and 492 respectively.

In operation, the circuitry in FIGURE 15 effects an output signal on the particular one of the output lines which corresponds to the input line first receiving an input signal. For example, if input line 284 receives timing pulse TP–6 before either input lines 286 or 288 receive their respective sixth timing pulses, output line 276 will provide an output signal before either of lines 278 or 280. The same may be said whether the first input signal is on line 284, 286, or 288. At the same time, however, the secondly and thirdly received input timing pulses will be effectively held so as to cause output signals on their respective output lines in the order in which these input signals were received.

Tracing the operation of the circuitry in FIGURE 15, it may be noted that when the input signal on line 284 occurs in a cycle before the like numbered timing pulses are delivered to input lines 286 and 288, flip-flop 440 is set to its "1" side, and by virtue of line 492 coupling the "0" side of that flip-flop to AND circuits 460 and 462, both of these AND circuits are disabled. Therefore, the "1" output from flip-flop 440 as it proceeds through OR circuit 446, gate 448, differentiator 454 and clipper 462 to AND circuit 458 which also receives the "1" output directly from flip-flop 444, causes an output signal to be delivered over line 472. Since neither of AND circuits 460 and 462 are delivering an output, neither of the inhibits of gate 464 are operative, and consequently, monostable multivibrator 488 is triggered to cause a $P_I$ output signal on line 276. Since junction 472 is coupled by line 476 through OR circuit 470 to MMV 486, gate 448 is disabled by an inhibit input from line 452 during the "on" time of MMV 486. As above mentioned, this time is preferably of the order of about 140 msec., and this is for the purpose of allowing for sufficient time for the generation of a set of interrogation tones, the resulting reply signals, and the recordation thereof, all before the next input signal on either of lines 286 or 288 is served even though stored in the respective flip-flops 442 and 444.

When the inhibit signal is removed from gate 448 in FIGURE 15, the secondly received input timing pulse may then be served. If this pulse has been received before the inhibit is removed, the storage of the pulse in its respective flip-flop means that the pulse is still available for passage through gate 448. Assuming that the secondly received timing pulse was on input line 286, then AND circuit 460 will have each of its inputs enabled and will provide an output signal $P_{II}$ through gate 466 and multivibrator 490 to output line 278. The same may be said for the receipt of a timing pulse on line 288 regardless of whether the other timing pulse inputs to lines 284 and 286 have been received before or after the one on input line 288. That is, when flip-flop 444 is storing an input pulse, as soon as the inhibit to gate 448 is removed, AND circuit 462 becomes fully enabled and passes an output signal through gate 468 and multivibrator 492 to output line 280.

Although the outputs of AND circuits 458, 460, and 462 respectively cause flip-flops 440, 442, and 444 to be set to their "0" side, each of OR circuits 480, 482, and 484 may alternatively have a second input line 494 which is coupled directly to a timing pulse for purposes of assuring no overlap between the serving of the differently received timing pulses on input lines 284, 286, and 288. As explained in connection with FIGURE 10, the input signals on lines 284, 286, and 288 may be either timing pulses 3, 6, or 9 and in like manner the particular timing pulse to be utilized on lines 494 to the respective OR circuits 480, 482, and 484, are the corresponding timing pulse generator's pulses TP–2, 5, or 8 according to whether TP–3, 6, or 9 provides the input pulses to lines 284, 286, and 288. Instead of using timing pulses on lines 494, a delay circuit with an inherent delay of approximately 500 msec. may be coupled between the input line and line 494. That is, such a delay may be concerted between line 284 and line 494 connected to OR circuit 480, with another similar delay circuit being coupled between input line 286 and OR circuit 482, and still another between input line 288 and OR circuit 484. The use of timing pulses 2, 5, or 8, or the use of such delay circuits provides a safety factor and prevents more than one output signal at a time. Since each of the input signals to lines 284, 286, and 288 are timing pulses which have a given duration, the output signals are made of the same duration, for example, 22 msec., by the monostable multivibrators 488, 490, and 492.

*Readout Pulse Generators*

Readout pulse generators are utilized in all of the embodiments referred to FIGURES 1 and 10, but since the multiple machine embodiments require multiple sets of readout pulses, the generator in FIGURE 10 is more extensive than that in FIGURE 1, although both may be basically the same. In FIGURE 16 the circuitry enclosed in dash line 500 is suitable for the readout pulse generator 56 in FIGURE 1, while all of FIGURE 16 may be employed as the readout pulse generator 266 in FIGURE 10. Switches 502 and 504 are shown in FIGURE 16, but would not normally be present in the circuitry, their showing being manually for the purpose of indicating how the connections are made for the different embodiments of the readout pulse generator. When only the circuitry within dash line 500 is to be employed, each of switches 502 and 504 would be in their clockwise position, while when all of FIGURE 16 is to be employed, for example in FIGURE 10, switches 502 and 504 would be in their counterclockwise positions. Input line 506 represents the timing pulse input line for readout pulse generators 56 in FIGURES 1, 7, and 9, and switch 504 is connected thereto when the generator is used in any of these embodiments. However, line 506 is not employed when the readout pulse generator is employed as per FIGURE 10 with input lines 276, 278, and 280 from the priority determiner.

In FIGURE 16, lines 508 and 510 respectively carry the horizontal and vertical drive pulses from the TV synchronizing generator either in FIGURE 1 or FIGURE 10. Since the idea of timing the readout pulses so as to occur at the times which will effect generation of a set of tones between the times successive horizontal synchronizing pulses occur following the post-equalizing pulses in the synchronized video vertical retrace periods, it is necessary to start counter 512 counting through its successive stages in response to successive H drive pulses at the appropriate times. This may be accomplished in any number of given manners, but the circuit in FIGURE 16 specifically indicates that the V drive pulses are differentiated in circuit 514 and applied to gate 516. Therefore, when this gate is being enabled by a pulse from switch 504, the leading edge spike of the differentiated V drive pulse is passed to delay circuit 518. Because the first generated tone may be desirably timed to occur between the second and third horizontal synchronizing pulses following the post equalizing pulses in the video vertical retrace periods, the delay inherent in circuit 518 may be approximately 0.7 msec.

The output of delay circuit 518 operates to reset counter 512 and to set flip-flop 520 to its "1" side, thereby enabling gate 522 to pass H drive pulses to counter 512. The counter then proceeds to step through its stages in response to successive H drive pulses so as to successively provide output pules on lines 522, 524, 526, and 530. Either the fourth or fifth stage of the counter, according to whether the circuit is being utilized in the embodiments referred to in FIGURES 1 or 10, is coupled to a differentiating circuit 532 and the trailing edge of the differentiated signal is applied to the "0" side of flip-flop 520 to reset same. The counter therefore stops counting until the flip-flop is again set to its "1" side. For the embodiments of the system referred to in FIGURES 1, 7, or 9, the output signals on lines 522, 524, 526, and 528 are respectively readout pulses 1, 2, 3, and 4.

However, for the readout pulse generator 266 in FIGURE 10, the circuitry in FIGURE 16 includes three sets of gates 534, 536, and 538 with each set including five gates respectively coupled to counter output lines 522—530. Each set of gates is enabled by a different output signal from the priority determiner outputs. That is, each gate in set 534 is enabled by priority signal $P_I$ on line 276, each gate in set 536 is enabled by priority signal $P_{II}$ on line 278, and each gate in set 538 is enabled by priority signal $P_{III}$ on line 280. In order to provide the input signal to gate 516 for the purpose of gating the leading edge of a V drive pulse, the priority determining output lines 276, 278, and 280 are each coupled to OR circuit 540, the output of which is connected to switch 504. In this manner, three different sets of readout pulses may be generated in accordance with which priority signal is present. That is, when the priority signal on line 276 is present, gates 534 effect a set of five different readout pulses ROP–1–1, 2, 3, 4, and 5. In like manner, the other two sets of readout pulses ROP–II–1, 2, 3, 4, and 5 and ROP–III–1, 2, 3, 4, and 5 are generated only when their respective priority signals are present on lines 278 and 280.

*Tone Generators*

Each of the tone generators for any of the embodiments related to FIGURES 1 and 10 may be exactly the same as one another, and each may be similar to either of the two shown in FIGURE 17. Assuming the storage unit output lines G′ and H′ of FIGURE 11 are associated with the two tone generators to be described, these output lines are respectively coupled to the "1" input sides of flip-flops 550, 552. Tone oscillators G and H are coupled to the respective "1" output sides of flip-flops 550 and 552, and the reset line 554, which carries the successive horizontal drive signals from the TV synchronizing generators in FIGURES 1 and 10, is coupled to the "0" input side of each of the flip-flops. Therefore, whenever a storage unit provides an output signal on its G′ line, oscillator G generates a tone which is coupled to a modulator as shown in FIGURES 1 and 10. Likewise, whenever a storage unit provides an output signal on its H′ line, oscillator H generates a tone which is also coupled to the modulator as shown in FIGURES 1 and 10. Since a horizontal drive pulse occurs between any two output signals from a storage unit, all of the flip-flops associated with the tone generating oscillators are set to their "0" side, thereby causing each tone to be gated off before a next tone begins.

*Tone Parity Checker*

The tone parity checker shown in FIGURE 18 corresponds to checker 352 in FIGURE 10, i.e. to a checker which may be used with a 5 tone set system, as distinguished from the 4 tone set system in FIGURE 1. To change the circuitry of FIGURE 18 to a comparable checker for FIGURE 1 will be apparent from the following description.

Input line 354 as shown in FIGURE 10 is coupled to receive the tones as modulated on a carrier. Consequently, FIGURE 18 employs a detector 560 which may also be an RF preamplifier. The tones as removed from their carrier are present then on output line 562 which is coupled in parallel to each of 18 different tone detectors (assuming 18 possible different frequency tones). Only three of such detectors are illustrated, these being the detectors for tones A, B, and R. Each such detector may be a tuned circuit similar to the ones described later in connection with the tone detectors in a transponder (see FIGURE 20). For each tone detector in FIGURE 18, there is an associated AND circuit, the three illustrated being designated A, B, and R. Each such AND circuit has two inputs one of which is from its respective tone detector and the other of which is from the respective tone gating signal as present from the corresponding output line of a storage unit. For example, the second inputs to the three AND circuits shown are lines A′, B′, and R′ from FIGURE 11. The outputs of AND circuits A through R are each coupled to OR circuit 564 and also in parallel to an 18 input mixing circuit 566. Mixing circuit 566 is such that it provides a given level of output signal on line 568 to amplifier 570 when only one of the tones occurs at a time. However, if two or more tones overlap in duration, the output level of mixing circuit 566 increases and causes amplifier 570 to provide an output signal to OR circuit 572 which in turn causes an output signal on line 574, the checker's inhibit signal output line corresponding to line 376 in FIGURE 10.

The output of OR circuit 564 is coupled to one of the inputs of each of five different AND circuits 576, 578, 580, 582, and 584. The other inputs to these AND circuits are respectively from lines 586, 588, 590, 592, and 594 which respectively carry the same readout pulses as do the five input lines 356–364 to parity checker 352 in FIGURE 10. That is, for example, input line 586 carries ROP-1-I, II, III. Therefore, readout pulses within a set thereof successively occur on lines 586–594. Whenever an output signal from OR circuit 564 coincides in time in one of the AND circuits 576–584 with the readout pulse connected thereto, an output is delivered from that AND circuit to its associated flip-flop 596, 598, 600, 602, or 604 or similar pulse holding circuits. Since for any given set of readout pulses, there should be five tones detected, each of the five AND circuits 576–584 should provide an output, and correspondingly each of the five flip-flops 596–604 should provide an output to AND circuit 606 whose consequent output through amplifier 608 is employed as an inhibit to gate 610. However, when there are less than five tones per set detected, or when the tones do not coincide at all with the respective readout pulses, AND circuit 606 provides no output, and allows the fifth readout pulse as inverted in circuit 612 to be gated through the then uninhibited gate 610 to OR circuit 572, thereby providing an inhibit output signal on line 574. Following each set of detected tones and corresponding readout pulses, each of flip-flops 596–604 is reset by the vertical drive pulse coming in on line 382, and in particular the differentiated trailing edge thereof as effected in differentiating circuit 614.

Besides the foregoing determinations, the parity checker of FIGURE 18 determines whether there are at least effectively more than five tones in any set thereof, and in particular whether any tone of the five has a duration longer than should be or is timewise displaced from its respective readout pulse. This is accomplished by coupling the output of OR circuit 564 to the passing input of inhibit gate 616, the inhibit input of which is the output of OR circuit 618 as inverted in circuit 620. As will be noted, each of the readout pulses in each set thereof is coupled to OR circuit 618, and consequently during the occurrence of each readout pulse, gate 616 is unable to pass any signal presented thereto from OR circuit 564. However, if the duration of a tone is longer than the duration of a corresponding readout pulse, gate 616 will pass an output signal to flip-flop 622, and further to OR circuit 572 to cause an inhibit signal on line 574. A differentiated trailing edge of the vertical drive pulse from differentiator 614 is employed to reset flip-flop 622 also.

From the foregoing, it is apparent then that the parity checker in FIGURE 18 determines three different things: (1) whether two or more tones overlap, (2) whether there are at least five tones per set, and (3) whether each of the tones in a set is no longer in duration than its corresponding readout pulse or is timewise displaced therefrom.

*Transponder*

As previously indicated, each of the transponders within either of the distribution networks referred to in relation to any of the foregoing embodiments, may be associated with a receiver such as a television set. This is illustrated in FIGURE 19. Also, according to one embodiment of this invention, there may be connected between a conventional television receiver 630 and its antenna system 632 a converter 634. When a subscriber wishes to receive a "free" television program through the usual antenna system, he does so in the normal manner of selecting that channel by the conventional channel selector means on his television set. In addition, converter 634 has a similar selection means, and to allow the antenna 632 to be employed with the television set, the converter selector is set to a position for connecting the antenna directly to the television set, say to a position designated "ANT." For a subscriber to receive one of the programs distributed by the distribution line 636 from one of the systems heretofore described, he changes his television set selector to a predesignated channel, say channel 6, which is unused in his locality for receipt of programs via the antenna 632. Then, when the subscriber changes his converter selector to any one of channels X, Y, and Z corresponding respectively to the programs initiated in the video signal generating means in FIGURES 1 and 10, this causes the converter to change the frequency of the selected program to the normally unused channel frequency predesignated as above indicated. That is, when channel X is selected, its channel frequency of 26–32 mc. is converted to the normal frequency of channel 6, while, when one of channels Y or Z is selected, its frequency band is likewise changed to that for channel 6. This provides the subscriber with the particular program which he desires to receive.

Also coupled to distribution line 636 is a transponder which may include an amplifier 638 tuned to the carrier on which the interrogation tones and FM audio have been modulated, assuming such separate audio modulation of the carrier. When the carrier is so modulated, the additional or special audio program signals may be separated out from the carrier by an FM demodulator 640 and these audio signals may be coupled into the conventional phonograph input jack in the subscriber's television set via line 642, or by means of switch 644 may be coupled by line 646 to a separate amplifier and speaker system for separate listening of the audio signals which may or may not be part of a stereophonic system as previously described. The special audio signals here referred to, it will be recalled, form no part of the video program but are a separate program within themselves which may be heard without charge therefor to the subscriber.

The output of amplifier 638 also carries the sequential sets of interrogation tones which are coupled by an AM demodulator 648 to five tone detectors 650 (assuming five tones per set). The five tone detectors 650 are specifically tuned to five different frequencies so that each tone detector provides an output signal to five pulse stretchers 652 whenever a set of interrogation tones includes five tones having the frequencies to which the five tone detectors are respectively tuned. When this is the case, the tone detectors provide output signals serially since the tones in a set thereof are received serially, but pulse stretcher 652 lengthens the detected output signals a time sufficient to allow AND circuit 654 to be completely enabled by a set of tones. The output of AND circuit 654 is used to gate on the reply tone oscillator 656, monostable multivibrator 658 (or like functioning means including a condenser, for example) being interposed to cause the gating signal to be of a given duration, say 100 msec., so that the output of oscillator 656 will be on for a corresponding time.

As indicated by dash line 660, oscillator 656 is mechanically coupled to converter 634. The purpose of this mechanical coupling is to cause the oscillator to be set to provide either an output signal of frequency $f_1$ or $f_2$, or to cause no output signal at all, all according to the setting of the channel selector in converter 634. That is, when the channel selector in converter 634 is set to "ANT." or to channel Z for the free program distributed by the system, oscillator 656 will provide no output signal; while when converter 634 is set to channel X, oscillator 656 will cause an output signal of frequency $f_1$, and when set to channel Y, will cause an output signal of frequency $f_2$. Each output or reply signal is coupled via line 662 to relay 664 and then passes into a reply distribution line 666 when the relay is enabled by a signal on line 668.

A preferred but exemplary converter-transponder system is shown in detail in FIGURE 20. There, the input coaxial line 670 is coupled via transformer 671 to converter 672 which has a channel selecting switch 674 movable to at least four positions to select either channels X, Y, Z or the antenna. Coaxial input line 670 is also coupled via transformer 671 and condensers 673, 675 to amplifier 676 which is effectively an IF amplifier for the carrier frequency 34 mc., in keeping with the previous example set forth. The inductor 677 serves as a trap to prevent amplifier 676 from receiving undesirable signals. The output of amplifier 676 is in turn coupled to an FM demodulating circuit 678 which may be of any known type but is preferably a modified Foster-Seely FM discriminator for providing the special audio program signals on output line 680. The input L-C tank circuit 682 of the FM discriminator 678 is tuned to the carrier frequency of 34 mc. ± say 100 kc., for accommodating a 75 kc. modulation. The discriminator is modified from the conventional Foster-Seely circuit in that tank circuit 682 is coupled by a condenser 681 not to the center tap of the secondary transformer winding 683 but to the mid-point between condensers 684 and 685 the opposite ends of which are coupled across winding 683 for purposes of improving balance in the discriminator. The ends of winding 683 are further coupled by diodes 686 and 687 to one end of resistors 688 and 689 with the common junction of these resistors being directly connected to the center tap of winding 683. In addition, there is a condenser 690 coupling the cathode ends of diodes 686 and 687. The operation of FM discriminator 678 will be fully apparent to those skilled in the art.

Besides the output of amplifier 676 being coupled to the FM discriminator tank circuit 682 it is further coupled via that tank circuit to another tank circuit 691. This latter tank circuit is for the purpose of selecting one of the interrogation tone sidebands. With the representative example of the possible different interrogation tones with frequencies as indicated in FIGURE 4, tank circuit 691 is tuned to pass, say, the upper sideband including frequencies 34,637,875 to 35,173,375 cycles at least, and is preferably tuned 75 kc. above and below this range to accommodate the carrier shift due to FM modulation. In other words, tank circuit 691 rejects the lower sideband and passes the upper sideband preferably from 34,562,875 to 35,248,375 cycles, resistor 692 being included in the tank circuit to lower the Q thereof and consequently broaden its passing range to accommodate such frequencies.

The output of tank circuit 691 is coupled by an RF choke 693 in series with condenser 694 to the control grid input of tube 706 with the control grid being biased to ground by resistors 676 and 678. Tube 706 has a dual function, as will later be more apparent, in that it acts at different times as an AM demodulator and as an oscillating tube. When a carrier with interrogation tones is received on its control grid, grid detection of the tones is accomplished by the tube so as to provide only the interrogation tones to its plate output lead.

The output of tube 706 is presented to tone detecting circuit 708 which includes five tone detectors 710, 712, 714, 716, and 718. Each of these tone detectors basically includes only an L-C tuned circuit but in order to obtain output signals therefrom the inductances as shunted by a condenser are made the primary winding of a transformer, and each of the transformer's secondary windings is preferably shunted by another condenser thereby improving tone detection. The primary circuits are connected to the output of tube 706 in series, with the last primary tuned circuit being connected by line 715 to B+ via the upper half of primary winding 717 of transformer 719, while the secondary circuits of the tone detectors are respectively coupled to the pulse stretching circuit 720. The pulse stretching circuit includes five individual pulse stretchers, each of which may be similar to either the pulse stretcher shown in detail within dash line 722 or dash line 724. In either case, two neon bulbs are connected in series to a source of voltage +V and the bulbs are paralleled by a condenser. Coupling from a tone detector may be via a condenser to the mid-point between the neon bulbs, as shown for pulse stretcher 722, or may be by association of foil wrapped around at least part of the neon bulbs as shown for pulse stretcher 724. The actual pulse stretching is accomplished by the condenser in each stretcher in accordance with the time constant associated with the condenser, while each set of neon bulbs themselves actually act as a pulse generator in response to the associated tone detector output.

The outputs of the pulse stretchers are applied to an AND circuit preferably of the diode resistor type and more preferably including a multi-diode tube 725 commonly referred to as a Lansdale type tube. Tube 725 has a common cathode 726 coupled to ground by resistor 727, and six diode plates 728–733. The first five diode plates are respectively connected to the pulse stretchers 720, while diode plate 733 provides the output from AND circuit 734. The output of AND circuit 734 is coupled to the control grid of tube 736 at a predetermined potential determined by resistors 738 and 740, the latter of which is connected to a voltage +V by the parallel R-C circuit 742. Coupling from the plate of tube 736 to a three terminal neon bulb 744, of the NE–77 type for example, is accomplished by condenser 746. The upper terminal of neon bulb 734 is coupled via resistors 748 to B++, i.e., the unfiltered rectified voltage as obtained from diode 751 in the rectifying section. This voltage is regulated by voltage regulator 750, and is also employed across a potential dividing circuit including resistors 752 and 754 to regulate the static potential of the center terminal of neon bulb 744. The lower terminal of bulb 744 is coupled to ground via resistor 756, and is also coupled to ground via the relay winding 758. The upper terminal of bulb 744 is further coupled to condenser 760 and thence to ground by resistor 762 and to the "X" and "Y" terminals of switch 764.

Neon bulb 744 is caused to fire only when a set of interrogation tones to which the tone detectors 710–718 are respectively tuned is received thereby, if at the same time switch 764 is set in an "X" or "Y" position so as to ground condenser 760 directly. When this occurs, relay winding 758 is energized so as to cause its armature switch arm 766 to move upwardly thereby making contact with its upper terminal 768. This as will be later apparent applies an oscillator output or reply signal to line 770 and thence to the primary of transformer 671 and back over the coaxial distribution line 670 in the manner described relative to branches 6, 7, or 8 in FIGURE 5. However, when switch 764 is in either of its other two positions, condenser 760 is again connected to ground but via resistor 762, and this prevents neon bulb 744 from firing even if the transponder receives a set of interrogation tones to which its tone detectors are respectively tuned. Under such conditions, the relay will not be energized and switch arm 766 will consequently be in its downward position so as to contact terminal 772. This terminal is connected by line 774 to the junction between resistors 776 and 778, and when the armature switch 766 is downward, the oscillation circuit to be presently described is prevented from operating, i.e., oscillations are completely damped.

As above indicated, tube 706 not only performs the function of AM demodulation but also the function of an active element in an oscillating circuit. Besides tube 706, the oscillator circuit includes the primary winding 717 of transformer 719 the upper end of which is connected to the plate of tube 706 by line 715, and the lower end of which is coupled to the control grid of tube 706 via resistors 776, 778 and condenser 780. Coupled across the upper half of the primary winding 717 are condenser 782 and resistor 784 for purposes of determining one of the two possible frequencies at which the oscillator circuit will oscillate. In order to change the frequency of oscillation, condenser 786 is coupled between the upper end of primary winding 717 and terminal "X" of switch 788. Therefore, when the arm of switch 788 is positioned to its terminal "X," condenser 786 is connected to ground to cause an oscillation frequency $f_1$, while when switch 788 is in any of its other three positions, the oscillator can oscillate only at frequency $f_2$. However, since relay winding 768 can never be energized when switch 764 (and consequently switches 788 and 674) is in its "Z" or "ANT." positions, the $f_2$ oscillator signal will be produced only when the switches are connected to their respective "Y" terminals. That is, as above explained, the relay switch arm 766 is in its downward position so as to tend to feed back to junction 790 any oscillation signal, and therefore will cut off all oscillation of the circuit. The oscillation signal is coupled to switch arm 766 via the secondary transformer winding 792 and its upper lead 794 with its lower lead 795 being connected to ground. Resistor 796 shunts secondary winding 792. Transformer 719 preferably also has a second secondary winding 797 which is shorted by a predetermined amount of resistance in potentiometer 798 for purposes of setting a compromise between oscillation amplitude and frequency.

As shown by dash line 799, switches 674, 788, 764, and 801 are ganged together for movement between their respective terminals in unison. When the switches are in their "X," "Y," and "Z" positions, it will be noted that the alternating current input to terminals 803 is connected to transformer 805, but that this is not true when the switches are in their "ANT." position. When in the latter position, conventional television reception may be had through the normal antenna system if desired. If such is not desired, or even if it is and simultaneously therewith, the special FM demodulated audio signals may be heard merely by closing switch 807 since such closure provides the necessary D.C. voltages for the transponder circuitry.

Terminals "X," "Y," and "Z" on the ganged switches respectively refer to selection thereby of the program signals in channels X, Y, and Z as received over the coaxial distribution network connected to the input line 670. When these switches are set to receive channel X, and a set of interrogation tones to which each of the tone detectors is tuned, is received, AND circuit 734 provides a gating "on" signal for the oscillator circuit by energizing relay winding 768 to cause switch arm 766 to move from its oscillation damping terminal to its terminal 768. The oscillator will then provide an output or reply signal of frequency $f_1$ to the input-output line 670 for a time duration determined by the time constant associated with condenser 760, i.e., until neon bulb 744 extinguishes and de-energizes relay winding 758. Similarly, when the program in channel Y is being received, the oscillator is gated "on" by the output of AND circuit 734 to provide a reply signal of frequency $f_2$ for a predetermined time to input-output line 670 following receipt thereby of a proper set of interrogation tones. When either channel Z or the conventional antenna system is being employed, no reply signal will be returned to input-output line 670.

Since both the incoming signals and the outgoing signals are effective through the primary winding of transformer 671, this winding may be referred to as the common input-output terminal of the transponder. This type of coupling to the distribution network utilizes a balanced or grounded line (coaxial), but as described above in connection with FIGURE 5, the distribution network may employ unbalanced (ungrounded) reply lines for the transponder output signals. That is, a two conductor line such as the conventional telephone line may be employed to return the reply signals.

When this is the case, the secondary winding 792 of the oscillation output transformer 719 may be connected as shown in FIGURE 20A. The upper secondary winding lead 794 is connected to the relay switch arm 766 as in FIGURE 20, but the upper terminal 768 is connected to line 770' which may be one of the lines in the two conductor unbalanced pair thereof. The other line 809 in such pair is connectable to the secondary winding 792 via line 795' which in this case is not grounded as is its counterpart in FIGURE 20, but is connected to a second armature switch arm 811. Therefore, when the relay winding of FIGURE 20 is energized, both switch arms 766 and 811 in FIGURE 20A move to their upper terminals to connect the oscillation outputs to the unbalanced reply line.

*Reply Detector*

The reply detector detailed in FIGURE 21 is one which may be used in the circuit of FIGURE 10, but by obvious changes may also be employed with the embodiments related to FIGURE 1. FIGURE 21 not only details a reply detector for use in FIGURE 10, but also illustrates some further improvements over the detector described relative thereto. In particular, FIGURE 21 includes the further improvement of a circuit for obtaining a constant level of input signal to the two tuned circuits 802, 804 regardless of the level of input signal received on line 800, at least within predetermined limits. According to many different factors, the input signal on line 800 may vary, between 100 millivolts and 2 volts, for example. Obviously, such a voltage variation might cause incorrect outputs from the filters 802 and 804. A circuit for obtaining a constant level output is illustrated with its input being coupled to transformer 806. The circuitry including triodes 808 and 810 is similar to the "speech clipper" described in the RCA publication "Radiotron Designer's Handbook" at page 694. In particular, triode 808 acts as an amplifier with automatic volume control, while triode 810 circuitry clips off the input to triode 812 below 0 volts and above a predetermined voltage, say +8 volts. Triode 812 circuitry causes amplification of the so limited signal and is coupled at its output to the inputs of both filters 802 and 804, which are respectively tuned to frequencies $f_1$ and $f_2$.

The filters have output lines 814 and 816 respectively coupled to the double triodes 818 and 820. The circuitry associated with these double triodes has as its main purpose the removal of the respective input signal voltages below a given level. That is, and for example, the output signals from the circuitry associated with double triodes 818 and 820 causes the filter output signals to be delivered to the respective grids of cathode followers 822 and 824 at a level which is upwardly of +25 volts. This is an improvement over the detectors heretofore mentioned in that in effect any filter output signal which is 25 volts or less in amplitude is prevented from being coupled to any store.

In particular, it may be noted that the right half of each of double triodes 818 and 820 have their respective cathodes biased to +25 volts. This prevents the right half of each of these tubes from conducting on a low level output (less than 25 volts) from their respective filters 802, 804. The left half of each of these tubes operates as an inverter, amplifier, and pulse shaper. With the parameters as shown in FIGURE 21, junctions 826 and 828 are normally at a negative voltage, say —40 volts, but when filters 802 and 804 provide an output which is greater than 25 volts, junctions 826 and 828 increase to 0 volts, unless at the same time an inhibit signal is present on line 830. As will be recalled with relation to FIGURES 10 and 18, the tone parity checker provides an inhibiting output signal when lack of parity of any set of interrogation tones is discerned by the checker. Line 830 in FIGURE 21 therefore correspnds to line 376 in FIGURE 10 or line 574 in FIGURE 18. Diodes 832 and 834 respectively comprise the inhibit gates 378 and 380 in FIGURE 10.

Triodes 822 and 824 are cathode followers with the output lines 836 and 838 therefrom being coupled to the respective triode cathodes by diodes 840 and 842. Lines 836 and 838 are normally biased therefore to approximately —40 volts but rise to 0 volts when an output above 25 volts is received from the associated filter 802, 804. Each of these lines is coupled to three latching relays with relays 844 and 846 being one set thereof, relays 848 and 850 being another set, and relays 852 and 854 being a third set. Each of these relays functions as a storage means, and in addition, as a gate or AND circuit. Relating this to FIGURE 10, it will be noted that relay 844 comprises store 320*a* and gate 324*a*, while relays 844 and 846 function as stores 320*a*, 320*b*, with their respective gates 324*a*, 324*b*. In addition, it may be realized that the set of latching relays 844, 846 correspond to the stores 174, 176 in FIGURE 1, along with their respective gates 186, 188. Since latching relay sets 848, 850, and 852, 854 operate similarly to the latching relay set 844, 846, only the operation of the latter set will be described.

Line 836 is coupled to one terminal of winding 856 in latching relay 844, and line 838 is coupled to the corresponding terminal of winding 858 in latching relay 846. The other terminals of windings 856 and 858 are connected in parallel to line 860 which carries signal $G_I$, the timing gate signal issuing from monostable multivibrator 342 in FIGURE 10, for example, or the similar type signal issuing from monostable multivibrator 194 in FIGURE 1. Gating signal $G_I$ as obtained from such a source may move, for example, from 0 volts to —30 volts during the presence of the gating pulse. Therefore, when lines 836 and 838 are at their normal (no filter output signal) level of —40 volts, neither of the two levels of the timing gate $G_I$ allows current to flow in either of windings 856, 858. However, when either of lines 836, 838 changes to a 0 voltage level because of a filter output signal, gating signal $G_I$ when at —30 volts, allows current to flow from the line 836, 838 which has a 0 level through its respective coil 856, 858 to line 860. This energizes the latching relay whose winding is so traversed by current, and causes its armature to move. That is, when a pulse is present on line 836 (but not line 838 since only one of the filters provides a substantial output at a time) in conjunction with a timing gate signal on line 860, current through winding 856 will cause armature 862 to move against terminal 864. Likewise, the coincidence of a substantial filter output pulse on line 838 and a timing gate on line 860 will cause current through winding 858 to effect movement of armature 863 in relay 846 to move against its terminal 865. In this manner, information of the receipt of a substantial reply signal on the reply line 800 in FIGURE 21 is stored in either of latching relays 844 or 846 according to whether the reply signal's frequency is $f_1$ or $f_2$.

The armature of each of latching relays 844 and 846 are connected to ground, and their respective terminals 864, 865 are coupled to output lines 866 and 868 respectively. Referring this to FIGURES 1 and 10, the output lines are respectively coupled to a set of recording means. For example, when latching relays 844 and 846 in FIGURE 21 correspond to stores 320*a* and 320*b* in the 50th reply detector of FIGURE 10, the respective output lines 866, 868 of the latching relays connect respectively to the upper or 50th set of reading means including the upper one of reading means in group 254 and the upper one of reading means in group 256 both for machine I. Output lines 870 and 872 for the set of latching relays 848, 850 in FIGURE 21 are connected respectively to the upper set of reading means for machine I, while the output lines 874 and 876 for the set of latching relays 852, 854 are connected to the upper set of reading means in machine III of FIGURE 10.

Each of the latching relays includes another winding for reset purposes. That is, latching relay 844 includes a second winding 878 and latching relay 846 includes a second winding 880. These windings are coupled in parallel with one like terminal of each being connected to ground, while the other terminals thereof are connected to a reset line 882. Reset line 882 of FIGURE 21 corresponds to the FIGURE 10 line 336 which carries the reset pulse $R_I$. Each of the other sets of latching relays in FIGURE 21 is similarly reset by reset pulses $R_2$ and $R_3$ respectively.

With several different embodiments having been set forth for this invention, along with a detailed description of component parts thereof, it is now apparent that there is provided by this invention, systems is which the various objects and advantages herein set forth are successively achieved.

The foregoing description has generally been directed toward recording program usage of two channels X and Y. However, it is to be realized that the transponders, reply detectors, and recording means may be changed in number up or down so as to accommodate recordation of more or less than two types of information which, in the specific example set forth relative to subscription television, means recordation of usage of more or less than two different programs at a time. For example, usage of the program in channel Z may be recorded in the upper section on a card along with program usage of channels X and Y, or usage of just one of such programs may be so recorded merely by correspondingly changing the number of the different type reply signals, the number of recording means per set, and the number of filter-storage units in each reply detector. Of course usage of the special FM audio may also be recorded by proper connection of, say, switch 644 in FIGURE 19 with the reply signal oscillator. By such means it becomes an easy task to determine whether channel Z or the FM audio is being utilized even though no fee is charged therefor. In like manner, the system herein described may be employed as a metering or poll means in that by connecting the transponders directly to the associated receivers' own conventional channel selection means, a poll may be made of the frequency of use of a given channel or of the number of sets tuned to a given program; and as previously indicated, the system may well be employed to meter any other type apparatus which may be advantageously employed with a transponder. All such variations are meant to be encompassed by this invention.

Modifications of this invention not described herein will become apparent to those of ordinary skill in the art after reading this disclosure. Therefore, it is intended that the matter contained in the foregoing description and accompanying drawings be interpreted as illustrative and not limitative, the scope of the invention being defined in the appended claims.

What is claimed is:

1. An interrogating and recording system comprising at least one transponder for generating an output signal upon being interrogated by a given input signal, means for generating said input signal including a record having given indicia thereon, means for reading said indicia to produce indicia signals corresponding thereto, and means responsive to the indicia signals for producing said given input signal, means for conveying the input signal to said transponder, means coupled to the output of said transponder for detecting the occurrence of said output signal, record means, and recording means coupled to the detecting means for making a record on said record means of the detected output signal.

2. A system, as in claim 1, and further including means coupled to said conveying means for generating at least one set of program signals including video signals and at least horizontal synchronizing signals, a television receiver coupler to said conveying means for converting said program signals into a program, said given input signal producing means being operative to produce said given input signal as a set of interrogation tones respectively of different frequencies each of which is an odd multiple of one-half the frequency of said horizontal synchronizing signals, said receiver and transponder being operatively connected together so as to cause said transponder to generate said output signal upon receipt of said set of interrogation tones only when said receiver is converting said program signals as aforesaid.

3. A system, as in claim 2, wherein the given input signal producing means further operates to cause tones each two adjacent ones of which are separated by twice the horizontal synchronizing frequencies with the overall possible tone frequency range being less than one octave.

4. A system as in claim 1 wherein said transponder includes oscillation means changeable between at least two settings at least one of which causes said output signal to be of a given frequency, a plurality of tone detectors respectively tuned to different frequencies, said given input signal being a plurality of tones respectively of said different frequencies, and means coupling the tone detectors to said oscillation means for allowing oscillation thereof when the tone detectors receive said given input signal.

5. A system as in claim 1 wherein said transponder output signal is of a given frequency, and wherein said transponder output signal detecting means includes means responsive to said given frequency for passing at least substantially only said output signal, and storage means coupled between said passing means and said recording means for temporarily storing any output signal substantially passed by said passing means.

6. A system as in claim 5 wherein said storage means is coupled to said passing means by gating means for precluding passage from the latter of an output signal at least initially passed by the passing means only to an insubstantial extent.

7. A system as in claim 1 wherein the given input signal producing means produces said given input signal as a set of interrogation tones which set is supposed to include $k$ and only $k$ number of tones which are supposed to occur serially without any overlap, and further including parity checking means coupled to the output of the input signal producing means for providing an indicative signal if any set of interrogation tones is not as it is supported to be.

8. A system as in claim 7 and further including means responsive to said indicative signal for inhibiting recording by said recording means onto said record means of any transponder output signal generated in response to a set of interrogation tones which causes an indicative signal.

9. An interrogating and recording system comprising at least one transponder for generating any one of a plurality of output signals according to the setting of the transponder upon being interrogated by a given input signal, means for generating said input signal including a record having given indicia thereon, means for reading said indicia to produce indicia signals corresponding thereto, means responsive to the indicia signals for producing said given input signal, means for conveying the input signal to said transponder, means coupled to said transponder for detecting which of siad output signals is generated thereby, record means, and a plurality of recording means coupled to the detecting means, said recording means corresponding in number to the number of said output signals and being disposed in different positions relative to said record means for making a record on the record means of the detected output signal in a unique position corresponding to the setting of said transponder.

10. A system as in claim 9 wherein the record with indicia thereon and said record means are different portions of the same record medium.

11. A system as in claim 10 wherein said record medium is a card.

12. A system as in claim 11, wherein the indicia on said card are apertures therein.

13. A system as in claim 9 wherein the means responsive to the indicia signals includes means for temporarily storing the indicia signals, means for reading out the stored signals, and means for generating a plurality of interrogation signals in response to the reading of the stored signals, said interrogating signals comprising said given input signal.

14. An interrogating and recording system comprising a plurality of transponders each capable of transmitting any one of a plurality of different output signals in accordance with its setting upon being interrogated by a given input signal, the given input signals for the different transponders being respectively different, means for generating said input signals including a plurality of first records each with a different set of coded indicia thereon corresponding respectively to said different given input signals, indicia reading means, means for presenting said first records sequentially to said reading means for producing respective sets of indicia signals corresponding to the indicia read, means responsive to the indicia signals including means for temporarily storing sets thereof for producing said different given input signals sequentially, means for conveying the input signals to each of said transponders, an output signal detector, means for coupling said detector to each of the transponders for conveying said ouput signals to the detector, a plurality of record means associated respectively with the first records, recording means coupled to the detector, said recording means corresponding in number to the number of possible different output signals from any given transponder, means for sequentially presenting said record means to the recording means, the recording means being disposed in different positions relative to a presented record means, said recording means operating to make a record of any detected output signals on said record means respectively, which records when made correspond in position on the respective record means to the setting of the respective transponders.

15. A system as in claim 14 wherein a predetermined number of said first records respectively comprise different parts of a first portion of a given record medium, said record medium otherwise including in different parts of a second portion thereof the respectively associated record means.

16. A system as in claim 14 wherein each of said first records comprises a first portion of a different record medium, each record medium further including in a second portion thereof the record means which is respectively associated with its first record.

17. An interrogating and recording system comprising a plurality of transponders each capable of transmitting any one of a plurality of different output signals in accordance with its setting upon being interrogated by an input signal which is the same for each of said transponders, means for generating said input signal including a first record having indicia thereon, indicia reading means for producing a set of indicia signals corresponding to said indicia, means responsive to the indicia signals for producing said input signal, means for conveying the input signal to each of said transponders, a plurality of output signal detectors respectively coupled to the outputs of said transponders, record means, a plurality of sets of recording means respectively coupled to said detectors, the number of recording means in each set thereof corresponding to the number of possible different output signals from any given transponder, each of the recording means of all sets thereof being disposed in different relative positions to said record means for recording in different areas thereof and each set operating to make a record on said record means of the detected output signals, if any, from the respective transponders, which records when made correspond in position to the setting of the respective transponders.

18. An interrogating and recording system comprising a plurality of transponders each capable of generating an output signal when interrogated by a given combination of input signals, there being variations among the transponders as to the input signal combination required to cause the transponders to generate their output signals, means for generating a plurality of different input signal combinations including a plurality of first records each having given indicia thereon, means for reading said indicia, means for presenting said records sequentially to the reading means to produce a set of indicia signals for each of said records, and means responsive to each set of indicia signals for producing a given input signal combination, means for conveying the input signal combinations to each of said transponders, means coupled to each of said transponders for detecting an output signal therefrom, a plurality of record means corresponding respectively to said first records, and recording means coupled to the detecting means for recording the detected output signals on the record means and thereby making a record of which of the transponders generated an output signal in response to an input signal combination derived from the indicia on a first record corresponding to the record means on which the detected output signals are recorded.

19. An interrogating and recording system for determining whether any one of a plurality of receivers in said system is presenting a given program at a given time comprising a plurality of receivers each capable of at least receiving a set of program signals in at least a given frequency channel and presenting said signals as a program, means for generating a set of program signals, means for conveying said program signals to said receivers in a given channel, means at each receiver for selecting said set of program signals, a plurality of transponders respectively associated with said receivers, means at each receiver coupled to its said program selecting means for changing its associated transponder to at least "on" and "off" settings, the "on" setting corresponding to the setting of the receiver selecting means by which said set of program signals is received, said transponder being capable of causing generation of a given output signal when in its "on" setting in response to interrogation by a given set of interrogation tones, means for generating a plurality of different sets of interrogation tones including a plurality of first records each having a different set of coded indicia corresponding respectively to said different sets of interrogation tones, indicia reading means, means for presenting said first records sequentially to said reading means for producing sets of indicia signals corresponding respectively to the indicia sets read, a plurality of tone generators coupled respectively to said indicia reading means for respectively generating a different tone for each different indicia signal in a set thereof, means for conveying the interrogation tones to said transponders in a channel different from that for said set of program signals, there being at least variations among the transponders as to the sets of interrogation tones which cause the different transponders to respond so as to generate said given output signal, a plurality of output signal detectors, means for coupling said transponders to the detectors, each transponder connected to any one detector being responsive to a different set of interrogation tones, a plurality of record means associated respectively with said first records, a plurality of recording means coupled to said detectors, and means for sequentially presenting said record means to said recording means, the recording means operating to make a record on a record means of any detected output signal generated by a transponder responsive to the interrogation tones produced in accordance with the indicia on the first record, a record so made being indicative of operation of a given receiver on said set of program signals.

20. An interrogating and recording system for determining whether any one of a plurality of receivers in said system is presenting at a given time any one of a plurality of different programs comprising a plurality of receivers each capable of receiving program signals in at least a given frequency channel and presenting said signals as a program, means for generating a first set of program signals in a first frequency channel, means for generating a second set of program signals in a second frequency channel, means for synchronizing said first and second program signals, means for mixing said first and second sets of program signals, means for conveying the mixed program signals to said receivers, means at each receiver for selecting at least either one of said sets of program signals, a plurality of transponders respectively associated with said receivers, means at each receiver coupled to its said program selecting means for changing its associated transponder to at least two different settings corresponding respectively to the different sets of program signals for respectively causing generation of different output signals in response to interrogation by a given set of interrogation tones, means for generating a plurality of different sets of interrogation tones including a plurality of first records each having a different set of coded indicia corresponding respectively to said different sets of interrogation tones, indicia reading means, means for presenting said first records sequentially to said reading means for producing sets of indicia signals corresponding respectively to the indicia sets read, means for temporarily storing each set of indicia signals, means coupled to said synchronizing means for reading out the so-stored signals a set at a time, a plurality of tone generators coupled to the respective outputs of the storing means for generating a tone for each different indicia signal read out of storage, means for modulating the tones so generated onto a carrier in a third frequency channel, means coupling the modulated carrier to said mixing means whereby each set of tones is conveyed by said conveying means to each of said transponders, there being variations and duplications among the transponders as to the sets of interrogation tones which cause the different transponders to respond so as to generate an output signal, a plurality of output signal detectors, means for coupling said transponders to the detectors, each transponder connected to any one detector being responsive to a different set of interrogation tones, a plurality of record means corresponding respectively to said first records, a plurality of recording means, at least one different set of two of said recording means being coupled to each of said detectors, means for sequentially presenting said record means to said sets of recording means simultaneously, the recording means of said sets being all disposed in different positions relative to a presented record means for recording on different areas thereof, each set of said recording means operating to make a record on a record means of any detected output signals generated by a transponder responsive to the tones produced in accordance with the indicia on the corresponding first record, any record when made by a given set of recording means being on the corresponding record means in only one of two possible areas according to which of the two sets of program signals is selected at the receiver associated with the transponder producinng the detected output signal for the said given set of recording means.

21. A system as in claim 20 including a plurality of record mediums each comprised of at least one of said first records in a first portion thereof and at least the corresponding one of said record means in a second portion thereof.

22. A system as in claim 21 wherein each record medium has only one of said first records and the corresponding one of said record means, said means for presenting said first records sequentially to the reading means including means for stepping each record medium at least $k$ steps one record medium after another, a timing pulse generator for producinng a plurality of timing pulses concurrent respectively to at least each of the $k$ steps of each record medium, there being $n$ reading means and $k$ of said indicia per record medium respectively disposed in $k$ rows in one of $n$ possible discrete areas per row, the relative arrangement between the indicia on each record medium and said reading means being such that the indicia are read serially one for each of said $k$ steps per record medium, said temporary storing means including a plurality of stores divided into $k$ groups with the respective groups having at least approximately $n$ stores, said reading means being respectively coupled to each of the corresponding stores in the groups thereof, the indicia signals developd sequentially by the indicia in each record medium being stored sequentially in said groups of stores by the corresponding timing pulses, the means for reading out the so stored signals includnig an interrogation pulse generator for delivering $k$ readout pulses sequentially to the respective groups of stores, each store having an output with the outputs of corresponding stores of each group being commonly coupled thereby providing a total of $n$ storing means outputs, there being $n$ tone generators respectively coupled to $n$ outputs of said storing means, each tone generator including an oscillator gated by said synchronizing means with the outputs of the oscillators being connected in common to said modulating means, the arrangement being such that the reading out of any group of stores by the corresponding readout pulse operates to cause the corresponding one of the $n$ oscillators to generate a tone which tone is ended by the synchronizing means gating before the next readout pulse occurs, thereby providing the tones caused by the indicia in any given record medium to be serially presented to said modulation means, each output signal detector having a single input line included in the means coupling the respective detectors to certain of the transponders, each detector comprising two means each responsive to a different one of said different output signals and two storage means respectively coupled to the last-mentioned means for temporarily storing the respective output signals when occurring, the two storage means in each detector being respectively coupled at their outputs to the two recording means in a given set thereof, each two detector storage means being so coupled to a different set of recording means, said stepping means including the means for sequentially presenting the record means to the sets of recording means simultaneously and operating (in addition to causing said $k$ steps per second medium) to step each record medium a plurality of steps from the reading means, and two means coupled respectively to corresponding ones of the two recording means in each set thereof for determining during which of said plurality of steps and consequently the associated area that any given stored detected output signal is to be recorded on the second portion of the record medium containing in its first portion the indicia set which initiated the interrogation tones causing said given output signal.

23. A system as in claim 20 including a plurality of record mediums each comprising at least two of said first records in a first portion thereof and at least the corresponding two record means in a second portion thereof.

24. A system as in claim 22 wherein each record medium has thereon only two of said first records which are in different parts of said first portion and only the corresponding two of said record means which are in different parts of said second portion, said means for presenting said first records sequentially to the reading means including means for stepping each record medium at least $k$ steps for each of said first portion parts one record medium after another, a timing pulse generator for producing a plurality of timing pulses concurrent respectively to at least each of the $2k$ steps of each record medium, there being $n$ reading means and $k$ of said indicia in each of said parts of the first portion of each record medium respectively disposed in $k$ rows in one of $n$ possible discrete areas per row, the relative arrangement between the indicia on each record medium and said reading means being such that the indicia are read serially one for each of said $k$ steps per first portion part, said temporary storing means including a plurality of stores divided into $k$ groups with the respective groups having at least approximately $n$ stores, said reading means being respectively coupled to each of the corresponding stores in the groups thereof, the indicia signals developed sequentially by each set of indicia being stored sequentially in said groups of stores in response to the respective concurrent timing pulses, the means for reading out the so stored signals including a readout pulse generator for delivering $k$ readout pulses sequentially to the respective groups of stores, each group of stores being so read out before the next read signal for that group of stores is stored by its concurrent timing pulse, each store having an output with the outputs of corresponding stores of each group being commonly coupled thereby providing a total of $n$ storing means outputs, there being $n$ tone generators respectively coupled to the $n$ outputs of said storing means, each tone generator including an oscillator gated by said synchronizing means with the outputs of the oscillators being connected in common to said modulating means, the arrangement being such that the reading out of any group of stores by a read out pulse operates to cause the corresponding one of the $n$ oscillators to generate a tone which tone is ended by the synchronizing means gating before the next readout pulse occurs, thereby causing the tones in each set thereof as well as the respective sets of tones to be serially presented to said modulation means, each output signal detector having a single input line which comprises the means coupling the detector to certain of the transponders, each detector comprising two means each responsive to a different one of said output signals and two storage means respectively coupled to the last mentioned means for temporarily storing the respective output signals when occurring, the two storage means in each detector being respectively coupled at their outputs to the two recording means in a given set thereof, each two detector storage means being so coupled to a different set of recording means, said stepping means including the means for sequentially presenting the record means to the sets of recording means simultaneously and operating (in addition to causing said $2k$ steps per record medium) to step each record medium a plurality of steps from the reading means, and two means coupled respectively to corresponding ones of the two recording means in each set thereof for determining during which of said plurality of steps, and consequently the associated area, that any given stored detected output signal is to be recorded on the second portion part of the record medium containing the associated first portion part whose indicia set initiated the interrogation tones causing said given output signal.

25. A system as in claim 20 including a plurality of record mediums each comprising three of said first records in a first portion thereof and the corresponding three of said record means in a second portion thereof.

26. A system as in claim 25 wherein each record medium has only three of said first records which are in different sections of said first portion and only the corresponding three of said record means which are in different sections of each second portion, each second portion section of a record medium being associated with a different first portion section of the same record medium, said means for presenting the first record sequentially to the reading means including means for stepping each record medium at least $k$ steps for each first portion section one record medium after another, a timing pulse generator for producing a plurality of timing pulses concurrent respectively to at least each of the $3k$ steps of each record medium, there being $n$ reading means and $k$ of said indicia in each first portion section of each record medium respectively disposed in $k$ rows in one of $n$ possible discrete areas per row, the relative arrangement of each set of indicia on each record medium and said reading means being such that all of said indicia in each record medium are read serially by the respective reading means, said temporary storing means including a plurality of stores divided into $k$ groups with the respective groups having at least approximately $n$ stores, said reading means being respectively coupled to each of the corresponding stores in the groups thereof, the indicia signals developed sequentially by any set of said indicia being stored sequentially in said groups of stores in response to the respective concurrent timing pulses, the means for reading out the so stored signals including a readout pulse generator for delivering $k$ readout pulses sequentially to the respective groups of stores, each group of stores being so read out before the next indicia signal is read therein by its concurrent timing pulse, each store having an output with the outputs of corresponding stores of each group being commonly coupled thereby providing a total of $n$ storing means outputs, there being $n$ tone generators respective coupled to the $n$ outputs of said storing means, each tone generator including an oscillator gated by said synchronizing means with the outputs of the oscillators being connected in common to said modulating means, the arrangement being such that the reading out of any group of stores by the corresponding readout pulse operates to cause the corresponding one of the $n$ oscillators to generate a tone which tone is ended by the synchronizing means gating before the next readout pulse occurs, thereby causing the tones generated in response to the respective indicium in any one set thereof and in response to succeeding sets of indicia to be serially presented to said modulation means, each output signal detector having a single input line included in the means coupling the respective detector to certain of the transponders, each detector comprising two means each responsive to a different one of said different output signals and two storage means respectively coupled to the last mentioned means for temporarily storing the respective output signals when occurring, the two storage means in each detector being respectively coupled at their outputs to the two recording means in a given set thereof, each two detector storage means being so coupled to a different set of recording means, said stepping means including the means for sequentially presenting the record means to the sets of recording means simultaneously and operating (in addition to causing said $3k$ steps per record medium) to step each record medium a plurality of steps from the reading means, and two means coupled respectively to corresponding ones of the two recording means in each set thereof for determining during which of said plurality of steps and consequently the associated area that any given stored detected output signal is to be recorded on the second portion section of the record medium containing the associated first portion section whose indicia set initiated the interrogation tones causing said given output signal.

27. A system as in claim 20 including a plurality of record mediums each having at least one of said first records in a first section thereof and at least the corresponding one of said record means in a second section thereof, said plurality of record mediums being divided into $x$ number of groups, said reading means being divided into $x$ groups respectively associated with the record medium groups, each group of reading means including $n$ reading means, said means for presenting said first records sequentially to the reading means including means for stepping the record mediums thereto, timing pulse generating means for generating a timing pulse concurrent with at least certain steppings by the stepping means including the steppings during which an indicium is read, each record medium including $k$ indicia respectively disposed in $k$ rows in one of $n$ possible discrete areas per row, the relative arrangement of the indicia on each record medium in a group thereof and the associated group of reading means being such that the indicia are read serially, said temporary storing means including $x$ storage units each having a plurality of stores divided into $k$ groups, said groups of reading means being respectively coupled to said storage units with each different reading means in any group thereof being coupled to each of the corresponding group stores of the associated storage unit, each group of stores including at least approximately $n$ stores, the indicia signals developed sequentially by the indicia in each record medium in the respective groups thereof being stored sequentially in the respective group of stores in the associated storage unit in response respectively to the concurrent timing pulses, the means for reading out the so stored signals including a readout pulse generator for sequentially delivering a plurality of sets of $k$ serially occurring readout pulses to the storage units respectively with each different readout pulse in a set thereof being delivered to a different group of stores in a storage unit, each of said storage units having $n$ outputs, there being $n$ tone generators respectively coupled to corresponding outputs of each storage unit, each tone generator including a gated oscillator with the outputs of the oscillators being connected in common to said modulating means, each output signal detector having a single input line included in the means coupling the detectors to certain of the transponders, each detector comprising two means each responsive to and for substantially passing a different one of said different output signals and a plurality of sets of two storage means respectively coupled to said passing means for temporarily storing the respective output signals, the sets of recording means being also divided into $x$ groups respectively associated with said $x$ groups of record mediums, the two storage means in each set thereof in each detector being respectively coupled at their outputs to the recording means in a given set thereof in different groups thereof, the corresponding set of two storage means in the different detectors being so coupled to a different set of recording means in the same group of recording means, said stepping means including the means for sequentially presenting the record means as grouped to the respective grouped sets of recording means, and means coupled to each of the recording means for determining the time and consequently the associated areas that the stored detected output signals are recorded on the respective second sections of the recording mediums containing the indicia sets which initiated the interrogation tones causing the respectively recorded output signals.

28. A system as in claim 20 including a plurality of record mediums each having at least one of said first records in a first section thereof and at least the corresponding one of said record means in a second section thereof, said plurality of record mediums being divided into a given number of groups, said reading means being also divided into said given number of groups with each group including $n$ reading means, said record medium and reading means groups being respectively associated, said means for presenting said first records sequentially to the reading means including a plurality of means equal in number to said given number for respectively stepping each record medium in the associated group thereof at least $k$ steps one record medium after another, a plurality of timing pulse generators associated respectively with said stepping means, each timing pulse generator being arranged to produce a plurality of timing pulses concurrent respectively to at least each of the $k$ steps of each record medium in the associated group thereof, each record medium including $k$ indicia respectively disposed in $k$ rows of one of $n$ possible discrete areas per row, the relative arrangement of the indicia on each record medium in a group thereof and the associated group of reading means being such that the indicia are read serially, said temporary storing means including a plurality of storage units each having a plurality of stores divided into $k$ groups, said groups of reading means being respectively coupled to said storage units with the respective reading means in each group being coupled to each of the corresponding stores in the different groups of the respective storage units, the respective groups of stores having at least approximately $n$ stores, the indicia signals developed sequentially by the indicia in each record medium in the different groups thereof being stored sequentially in the respective group of stores in the associated storage unit in response respectively to the concurrent timing pulses from the respectively associated timing pulse generators, the means for reading out the so stored signals including a readout pulse generator for delivering a plurality of sets equal in number to said given number, of $k$ serially occurring readout pulses sequentially to the storage units respectively with each different readout pulse in a set thereof being delivered to a different group of stores, each store having an output with the outputs of corresponding stores of each group thereof within each storage unit being commonly coupled thereby providing a total of $n$ outputs per storage unit, there being $n$ tone generators respectively coupled to corresponding outputs of each storage unit, each tone generator including an oscillator gated by said synchronizing means with the outputs of the oscillators being connected in common to said modulating means, the arrangement being such that the reading out of any group of stores by the corresponding readout pulse operates to cause the corresponding one of the $n$ oscillators to generate a tone which tone is ended by the synchronizing means gating before the next readout pulse in the same set thereof occurs, thereby causing the tones generated in response to the indicia in any given record medium in a group to be presented serially to said modulation means before the tones generated in response to the indicia on another record medium in another group thereof is serially presented to the modulation means, each output signal detector having a single input line included in the means coupling the detectors to certain of the transponders, each detector comprising two means each responsive to and for substantially passing a different one of said different output signals and a plurality of sets of two storage means respectively coupled to the last mentioned means for temporarily storing the respective output signals when occurring, the sets of recording means being divided into a plurality of groups respectively associated with the different groups of record mediums, the two storage means in each set thereof in each detector being respectively coupled at their outputs to the recording means in a given set thereof in different groups thereof, the corresponding set of two storage means in the different detectors being so coupled to a different set of recording means in the same group of recording means, said stepping means respectively including the means for sequentially presenting the record means as grouped to the respective grouped sets of recording means, and two means for each group of recording means coupled respectively to corresponding ones of the two recording means in each set thereof in the associated group for determining the time and consequently the associated areas that each of the stored detected output signals is recorded on the respective second section of a record medium containing the indicia set which initiated the interrogation tones causing a detected output signal.

29. A system as in claim 28 wherein the timing pulse generators are unsynchronized relative to each other, and further including means coupled to each of the timing pulse generators to receive a timing pulse from each which timing pulses are the same numbered pulse from each timing pulse generator relative to each generator's respective pulse cycle for causing said sets of readout pulses from the interrogation pulse generator to be generated sequentially in the order in which said timing pulse generators cause their respective said same numbered pulses to occur.

30. A system as in claim 28 wherein each of the storage means in each of said detectors is coupled to one of the two passing means in the respective detector by gating means, each of said passing means being subject to producing an insubstantial output signal to any gating means coupled thereto during the initial period of a received transponder output signal other than the one which it substantially passes, and including means for each different set of gating means in a detector and commonly coupled to corresponding sets of gating means in each detector for enabling and disabling the corresponding sets of gating means at different times, any particular gating means being disabled during the initial period of any transponder output signal generated in response to the indicia on a given record medium when said particular gating means is coupled to a storage means which in turn is coupled to a reading means associated with said given record medium to preclude passing of said insubstantial output signal to its storage means, but being enabled for a predetermined time after said initial period to gate any substantially passed input signal to its storage means.

31. A system as in claim 20 wherein the means at each receiver for selecting at least either one of the said sets of program signals includes means for selectively converting either of said first and second frequency channels to said given frequency channel at least one receiver.

32. A system as in claim 20 wherein the means for conveying the mixed program signals and the tone modulated carrier includes a coaxial cable distribution network divided into branches each feeding a different plurality of transponders, the transponders connected to any one branch being each responsive to a different set of interrogation tones, the beginning of each said branches including unidirectional current conducting means, said means for coupling said transponders to the detectors including the part of the coaxial cable in each of said branches between the transponders connected furthest and closest to the unidirectional means for the respective branches, each of said transponders having a single terminal acting as an input from its respective coaxial cable branch and also acting as an output to the same coaxial cable branch.

33. A system as in claim 32 wherein each of said unidirectional current conducting means is a branch distribution amplifier.

34. A system as in claim 20 wherein each of the transponders comprises oscillation means changeable to a plurality of settings by said transponder changing means for producing said different output signals at different frequencies, a plurality of interrogation tone detectors respectively tuned to different interrogation tones, and means coupling the tone detectors to said oscillation means for allowing oscillation thereof at one of the different frequency output signals when the transponder receives a set of interrogation tones to each of which a different one of the tone detectors is tuned.

35. A system as in claim 20 wherein each of the transponders includes oscillation means changeable at least between two different frequencies by said transponder changing means for causing said different output signals to be of different frequencies respectively, and means including tone detection means responsive only to a predetermined set of said interrogation tones for gating said oscillation means "on" only when said predetermined set of interrogation tones is received, thereby causing said oscillation means to generate one of its different frequency output signals.

36. A system as in claim 35, wherein the tone detection means includes a plurality of tone detectors each responsive only to a different frequency tone, and the means for gating the oscillation means "on" only when the predetermined set of interrogation tones is present includes an AND circuit coupling the outputs of the tone detectors to said oscillation means.

37. A system as in claim 20, wherein at least one of said output signal detectors is connected to certain of the transponders by a single input line, a plurality of means each coupled to said input line and each passing at least to a substantial extent a different one of said output signals, a plurality of stores, the output of each of said passing means being coupled to at least one set of said recording means.

38. A system as in claim 37, wherein each coupling between a store and a passing means includes gating means for precluding passage to its store from its passing means of any output signal at least initially passed thereby to an insubstantial extent.

39. A system as in claim 20, wherein the means for modulating the interrogation tones onto a carrier in a third frequency channel includes a first modulator of one type, the system further including a second modulator of another type having two inputs respectively receiving said carrier and a third set of program signals, one of said modulators coupling the other to said mixing means so that the input thereto is a carrier modulated in one manner by the third set of program signals and modulated in another manner by said interrogation tones, at least one of said transponders further including means for detecting one of the different sets of interrogation tones and means for detecting said third set of program signals, there being means coupled to the third program signal detection means for presenting the third signals set as a program.

40. A system as in claim 39, wherein the second modulator causes frequency modulation of a third program signal onto said carrier and wherein the first modulator causes amplitude modulation of the interrogation tones onto the carrier.

41. A system as in claim 20, wherein at least one of said receivers is a television receiver and said first and second sets of program signals each include video signals and horizontal and vertical synchronizing signals, and wherein the interrogation tones in a set thereof are timed, by virtue of said synchronizing means being coupled to the temporary storing means via the means for reading out the stored signals, to occur respectively between the times of occurrence of given horizontal synchronizing pulses following the post equalizing pulses in the vertical retrace period of said television receiver.

42. A system as in claim 20, wherein at least one of said receivers is a television receiver and wherein at least one of said first and second sets of program signals includes video signals and at least horizontal synchronizing signals, and wherein the tone generators are respectively tuned to different frequencies each of which is an odd multiple of one-half the frequency of said horizontal synchronizing signals.

43. A system as in claim 42, wherein the tone generators are further tuned to cause tones each adjacent two of which are separated by twice the horizontal synchronizing signal frequency with the overall tone frequency range being less than one octave.

44. A system as in claim 20 wherein each set of interrogation tones is supposed to include $k$ and only $k$ number of tones which are supposed to occur serially without any overlap, and further including parity checking means coupled to the output of said tone generators for providing an indicative signal if any set of tones is not as it is supposed to be.

45. A system as in claim 44, and further including means responsive to said indicative signal for inhibiting recording by any of said recording means onto any of said record means of any transponder output signal generated in response to a set of interrogation tones which causes an indicative signal.

46. A transponder comprising an output line, oscillation means coupled to said output line for supplying thereto an output signal under given conditions including the receipt of a gating signal, and means including a plurality of tone detectors for respectively detecting a plurality of different tones, for producing said gating signal only when all of said tone detectors receive their respective tones within a predetermined time.

47. A transponder as in claim 46 wherein each of said tone detectors includes a tuned circuit tuned only to a frequency which is different from that for any of the other tone detectors, the means for producing said gating signal further including an AND circuit coupled to the output of each said tuned circuits and providing said gating signal only when a set of tones received by the tone detectors correspond in frequency respectively to the frequencies of said tuned circuits.

48. A transponder as in claim 47 wherein the tones in said set thereof are received by said tone detectors serially, said tuned circuits being in series with one another, said means for producing a gating signal further including means between each of the tuned circuits and said AND circuit for holding the output level of a detected tone above a given level at least until the remainder of the tones in a set thereof have been received by all of the tone detectors.

49. A transponder as in claim 48 wherein at least one of said last mentioned means includes neon bulb means paralleled by capacitor means coupled to said AND circuit as one input thereof, said neon bulb means being coupled to one of said tuned circuits.

50. A transponder as in claim 47 wherein said AND circuit is a diode-resistance coincidence circuit.

51. A transponder as in claim 46 wherein said output signal is coupled to the output line by relay means.

52. A transponder as in claim 51 including an interrogation tone input line coupled to said tone detectors which is the same line as said output line.

53. A transponder as in claim 51 wherein said relay means is enabled by said gating signals.

54. A transponder as in claim 46 and further including frequency changing means coupled to said oscillation means for determining the frequency of said output signal if any.

55. A transponder as in claim 46 including an input for receiving a carrier modulated in one manner by said tones and modulated in another manner by other given signals, and further including a first demodulator coupled to said input for demodulating said carrier and producing said other given signals, and a second demodulator coupled between said input and tone detectors for providing demodulated tones to the latter.

56. A transponder as in claim 55 wherein said given signals are frequency modulated on said carrier and said tones are amplitude modulated thereon, said first and second demodulators being respectively of the FM and AM type.

57. A transponder as in claim 46 wherein said gating signal is coupled to the oscillation means by means for maintaining the gating signal for a predetermined length of time.

58. A transponder comprising an output line, relay means coupled to said output line, an oscillator settable to a plurality of conditions for respectively producing when gated "on" an output signal of one frequency or another or no output signal at all, the output of said oscillator being coupled to said relay means, a plurality of tone detectors each including a tuned circuit responsive to a frequency different from that for another of the tuned circuits, and AND circuit having a plurality of inputs, a pulse stretcher for each of said tuned circuits for coupling the outputs thereof respectively to said AND circuit, and means coupling the output of said AND circuit to said relay means and to the oscillator for gating the latter "on" for a predetermined duration, the arrangement being such that a set of tones received by the tone detectors causes gating of the oscillator if the respective frequencies of the tones corresponded respectively to the frequencies of said tuned circuits.

59. A network comprising a plurality transponding means each responsive to one of a plurality of different input signals for generating an output signal, there being variations among the transponding means as to which of said different input signals makes them responsive, a plurality of line lengths each receiving said input signals, means for each transponding means connecting some of said transponding means to one of said line lengths, each length having at least one transponding means connected thereto, and a plurality of output lines each coupled to at least one transponding means, each transponding means coupled to any given output line being responsive to a different one of said input signals.

60. A transponder distribution network comprising an input line for serially receiving a plurality of different input signals, a plurality of branches each coupled to said input line, a plurality of transponders each responsive to only one of said different input signals for providing at least a given output signal, there being variations among the transponders as to which of said different input signals makes them responsive, each transponder being connected at its input to one of said branches, each branch having at least one transponder so connected thereto, and a plurality of output lines each coupled to the output of at least one transponder, each transponder so coupled to any given output line being responsive to a different one of said input signals.

61. A network as in claim 60 wherein at least one of said output lines is coupled to the same transponders as a given one of said branches.

62. A network as in claim 60 wherein at least one of said output lines is coupled to the outputs of transponders whose inputs are coupled to different ones of said branches.

63. A network as in claim 60 wherein at least one of said output lines is coupled to one of said branches, and wherein at least one of said transponders which is connected at its input to said one branch has a common input-output terminal.

64. A network as in claim 60 wherein said transponders are divided into groups and each transponder has a common input-output terminal, each group of input-output terminals being coupled to a different one of said branches, each branch including a different unidirectional current conducting device between said main line and the transponder coupled to the branch closest to said main line, each output line being coupled to a different one of said branches at a point betwen the unidirectional device in the branch and the end of the branch furthest from the unidirectional device.

65. A network as in claim 64 wherein each of said unidirectional devices is a distribution amplifier.

66. A network as in claim 65 wherein said main line and each of said branches is a coaxial cable and each output line is a two-wire unbalanced line inductively coupled to its respective coaxial branch.

67. A network as in claim 60 wherein at least said main line is a coaxial line and wherein at least one of said output lines is a two-wire unbalanced line.

68. A circuit for detecting the receipt of at least a given input signal and for storing an indication of such receipt comprising an input line carrying said given input signal at a predetermined time and subject to having at least one other input signal thereon at another time, means coupled to said input line for substantially passing only said given input at least following an initial period during the occurrence thereof but subject to insubstantially passing said other input signal substantially only during the like initial period thereof, storage means, and gating means coupling the passing means to the storage means for gating the passing means output to the storage means only after said initial period, thereby at least substantially precluding storage of any input signal insubstantially passed by said passing means but allowing storage of said given input signal.

69. A circuit for detecting the receipt of any one of a plurality of different given input signals which occur one at a time and for storing an indication of which of the input signals was received during a given time comprising an input terminal for receiving said given signals, a plurality of means each coupled to said terminal for respectively passing substantially only one of said given signals, a plurality of storage means and a respective number of associated gating means, each of said storage means being coupled to one of said passing means by the associated one of said gating means, there being at least one storage means so coupled to each of said passing means, each of said passing means being subject to producing an insubstantial output signal to any gating means coupled thereto during the initial period of the receipt of an input signal other than the one which it substantially passes, any given gating means being inoperable during the initial period of any of said input signals to preclude passing of any insubstantial output signal to a storage means, but being operative for a predetermined time after the initial period of an input signal substantially passed by the passing means coupled to said given gating means to gate such substantially passed signal to the storage means coupled to said given gating means.

70. A circuit as in claim 69 wherein at least one of said passing means is a tuned circuit at least substantially tuned only to the frequency of one of said different input signals.

71. A circuit as in claim 69 wherein there is only one storage means coupled to any of said passing means.

72. A circuit as in claim 69 wherein said plurality of storage means and associated gating means is divided into a given number of sets thereof, each set of storage means and associated gating means including one storage means and one gating means for each of said passing means.

73. A circuit as in claim 69 wherein at least one of said storage means is a bistable store.

74. A circuit as in claim 73 wherein said bistable store is a relay.

75. A circuit as in claim 73 wherein said bistable store is a latching relay which includes at least a part of its associated gating means.

76. A circuit as in claim 69 wherein each of said gating means is coupled to a passing means by means for limiting the lowest amplitude level of any given input signal to a predetermined value different than zero.

77. A circuit as in claim 69 wherein each of said passing means is coupled to said input terminal by means for making each input signal as received by the passing means have a predetermined amplitude level substantially regardless of its input level as received by said terminal.

78. A circuit as in claim 77 wherein each of said gating means is coupled to a passing means by means for limiting the lowest amplitude level of any given input signal to a predetermined value different than zero.

79. A circuit as in claim 78 wherein each of said storage means is a resettable latching relay which includes at least a part of its associated gating means.

80. A circuit for checking the parity of a received set of $k$ number of serially occurring input signals supposedly timed by $k$ timing pulses comprising means having at least $k$ inputs for receiving said input signals and providing a given output signal when two or more of said input signals overlap in time, means coupled to the last mentioned means for providing a second output signal when the number of input signals in a set thereof is less than $k$ or when said input signals do not coincide at all with their respective timing pulses, and means coupled at least to the first mentioned means for providing a third output signal when any input signal is longer in duration than its respective timing pulse or is timewise displaced therefrom.

81. In a circuit for checking the parity of a received set of $k$ number of serially occurring input signals respectively generated in response to $k$ gating signals, the improvement comprising at least $k$ AND circuits respectively for receiving said gating signals at their first inputs, at least $k$ input signal detectors for respectively detecting said input signals and respectively connected at their outputs to the second inputs of said AND circuits, and a mixing circuit having at least $k$ inputs respectively coupled to the outputs of said AND circuits, the arrangement being such that said mixing circuit provides a given output signal only when two or more of said inputs signals overlap in time.

82. In a circuit for checking the parity of a received set of $k$ number of serially occurring input signals respectively generated in response to $k$ gating signals respectively timed by $k$ timing pulses, the improvement comprising at least $k$ first AND circuits for respectively receiving said gating signals at their first inputs, at least $k$ input signal detectors for respectively detecting said input signals and respectively connected at their outputs to the second inputs of said AND circuits, $k$ second AND circuits for respectively receiving said timing pulses at their first inputs with their second inputs being all coupled to the outputs of each of said first AND circuits, $k$ temporary pulse holding circuits respectively coupled to the outputs of said second AND circuits, a third AND circuit having $k$ inputs respectively coupled to the outputs of said holding circuits, and a gate having an inhibit input coupled to the output of said third AND circuit and another input for receiving the $k$th timing pulse, the arrangement being such that said gate passes said $k$th timing pulse only when uninhibited by lack of an output from the third AND circuit which occurs when the number of input signals in a set thereof is less than $k$ or when said input signals do not coincide at all with their respective timing pulses.

83. A circuit as in claim 82 and further including means coupled to said first AND circuits for providing an output when two or more of said input signals overlap in time.

84. A circuit as in claim 83 wherein said last mentioned means includes a mixing circuit having at least $k$ inputs respectively coupled to the outputs of said first AND circuits.

85. A circuit as in claim 82 and further including means coupled to receive each of said timing pulses and the outputs of said first AND circuits for providing an output signal when any first AND circuit output is longer in duration than its respective timing pulse, or when any first AND circuit output is time displaced from its respective timing pulse.

86. A circuit as in claim 85 wherein said last mentioned means includes a second gate having an inhibit input coupled to receive each of said timing pulses and another input coupled to receive the outputs of each of said first AND circuits.

87. In a circuit for checking the parity of a received set of $k$ number of serially occurring input signals respectively generated in response to $k$ gating signals respectively timed by $k$ timing pulses, the improvement comprising at least $k$ first AND circuits for respectively receiving said gating signals at their first inputs, at least $k$ input signal detectors for respectively detecting said input signals and respectively connected at their outputs to the second inputs of said AND circuits, a gate having an inhibit input and another input, the outputs of each each of said AND circuits being coupled to said another input, and means for coupling each of said timing pulses to said inhibit input, the arrangement being such that said gates provide an output signal only in response to an AND circuit output at least part of which occurs anti-coincident with a timing pulse thereby indicating when an input signal is longer in duration than its corresponding timing pulse or is displaced timewise therefrom.

88. A circuit as in claim 87 and further including means coupled to each of said AND circuits for providing an output signal only when two or more of said input signals overlap in time.

89. A circuit as in claim 88 wherein the last mentioned means includes a mixing circuit having at least $k$ inputs respectively coupled to the outputs of said AND circuits.

90. A circuit as in claim 88 and further including means coupled to said AND circuits for providing an output when the number of input signals in a set thereof is less than $k$ or when said input signals do not coincide at all with their respective timing pulses.

91. A circuit as in claim 90 wherein the last mentioned means include $k$ second AND circuits for respectively receiving said timing pulses at their first inputs with their second inputs being all coupled to the outputs of each of said first AND circuits, $k$ temporary pulse holding circuits respectively coupled to the outputs of said second AND circuits, a third AND circuit having $k$ inputs respectively coupled to the outputs of said holdings circuits, and a second gate having an inhibit input coupled to the output of said third AND circuit and another input for receiving the $k$th timing pulse, the arrangement being such that said second gate passes said $k$th timing pulse only when uninhibited by lack of an output from the third AND circuit.

92. A circuit for determining the priority of a plurality of input signals regardless of the order in which same are received and regardless of the time between the receipt of the input pulses, and for providing respective output signals displaced in time at least by a predetermined length of time with the output signals being in the same order as the input signals, comprising means for temporarily storing each of the input signals, a plurality of output circuits, and means coupled between said storage means and the output circuits for gating the stored input signals in the order in which same are received, one after another, to the output circuits respectively at intervals of at least said predetermined length of time.

93. A priority determining circuit comprising a plurality of bistable storage elements each having first and second inputs and outputs with the first input of each being coupled to a different input line for receiving input pulses in any order, a first gate of the single inhibit type coupled to the first outputs of each of the bistable elements, a plurality of AND circuits each coupled at one input to the output of said gate and at another input respectively to the first outputs of said bistable elements, the second output of each of said bistable elements except the $n$th one thereof being coupled as an input to each succeeding one of said AND circuits, a plurality of second gates each of the multi-inhibit type with each having a plurality of inputs respectively coupled to the outputs of said AND circuits, one input of each second gate being a passing input with the remaining inputs being inhibits, and means including a timing circuit for coupling the outputs of said AND circuits together as an inhibit input for said first gate, the arrangement being such that a firstly received input signal causes an output from the associated one of said AND circuits to inhibit said first gate from passing any later received input signal stored in its respective bistable element for a predetermined length of time but causes an output from only the associated second gate, while after said predetermined time the secondly received and stored input pulse does likewise, etc., the order of the second gate outputs being the same as the input signal order regardless of the irregularity of the latter.

94. A priority determining circuit comprising a plurality of bistable storage elements each having first and second inputs and outputs with the first input of each being coupled to a different input line for receiving input pulses in any order, a gate of the inhibit type coupled to the first outputs of each of the bistable elements, a plurality of AND circuits each coupled at one input to the output of said gate and at another input respectively to the first outputs of said bistable elements, the second output of said bistable elements being coupled as an input to each succeeding one of said AND circuits, and means including a timing circuit for coupling the outputs of said AND circuits together as an inhibit input for each gate.

References Cited in the file of this patent

UNITED STATES PATENTS

| | | |
|---|---|---|
| 2,476,639 | Thomas | July 19, 1949 |
| 2,488,508 | Goldsmith | Nov. 15, 1949 |
| 2,573,349 | Miller | Oct. 30, 1951 |
| 2,577,520 | Hare | Dec. 4, 1951 |
| 2,664,554 | Doremus | Dec. 29, 1953 |
| 2,674,512 | Bogert | Apr. 6, 1954 |
| 2,678,382 | Horn | May 11, 1954 |
| 2,852,598 | Roschke | Sept. 16, 1958 |
| 2,864,943 | Schultz | Dec. 16, 1958 |

OTHER REFERENCES

"An Instantaneous Audience Measurement System," Tele-Tech., May 1949, pp. 38, 39, 64 and 65.

Disclaimer 3,078,337.—*William J. Shanahan*, New York, *Vincent R. Zopf*, Floral Park, and *Albert M. Loshin*, Brooklyn, N.Y. METERING SYSTEMS. Patent dated Feb. 19, 1963. Disclaimer filed July 11, 1973, by the assignee, *Skiatron Electronics & Television Corporation.*

Hereby enters this disclaimer to claims 46, 47, 50 and 57 of said patent.

[*Official Gazette December 11, 1973.*]